US007693790B2

(12) United States Patent
Lawlor et al.

(10) Patent No.: US 7,693,790 B2
(45) Date of Patent: Apr. 6, 2010

(54) METHOD AND SYSTEM FOR REMOTE DELIVERY OF RETAIL BANKING SERVICES

(75) Inventors: Matthew P. Lawlor, Washington, DC (US); Timothy E. Carmody, McLean, VA (US)

(73) Assignee: Online Resources Corporation, McLean, VA (US)

( * ) Notice: Subject to any disclaimer, the term of this patent is extended or adjusted under 35 U.S.C. 154(b) by 1640 days.

(21) Appl. No.: 10/849,369

(22) Filed: May 20, 2004

(65) Prior Publication Data

US 2004/0215564 A1 Oct. 28, 2004

Related U.S. Application Data

(60) Continuation of application No. 09/789,534, filed on Feb. 22, 2001, now Pat. No. 7,076,458, which is a continuation of application No. 09/020,109, filed on Feb. 6, 1998, now Pat. No. 6,202,054, which is a division of application No. 08/469,354, filed on Jun. 6, 1995, now Pat. No. 5,870,724, which is a continuation of application No. 07/975,334, filed on Nov. 16, 1992, now abandoned, and a continuation-in-part of application No. 07/448,170, filed on Dec. 8, 1989, now Pat. No. 5,220,501.

(51) Int. Cl.
*G06Q 40/00* (2006.01)
(52) U.S. Cl. .............................. 705/40; 705/35; 705/39
(58) Field of Classification Search .................. 705/35, 705/39, 40

See application file for complete search history.

(56) References Cited

U.S. PATENT DOCUMENTS 3,375,500 A 3/1968 Fowler et al.
3,573,749 A 4/1971 Southard et al.
3,639,686 A 2/1972 Walker et al. ............... 380/10

(Continued)

FOREIGN PATENT DOCUMENTS

DE 2632106 1/1978

(Continued)

OTHER PUBLICATIONS

Consumer Bill Payments: Still an Electronic Dinosaur? Manelski, Denis, Nahnybida, Simon. United States Banker. New York: Aug. 1992. vol. 102, Iss. 8; p. 52, 4 pgs.*

(Continued)

*Primary Examiner*—Lalita M Hamilton
(74) *Attorney, Agent, or Firm*—Nixon & Vanderhye P.C.

(57) ABSTRACT

A practical system and method for the remote distribution of financial services (e.g., home banking and bill-paying) involves distributing portable terminals to a user base. The terminals include a multi-line display, keys "pointing to" lines on the display, and additional keys. Contact is established between the terminals and a central computer operated by a service provider, preferably over a dial-up telephone line and a packet data network. Information exchange between the central computer and the terminal solicits information from the terminal user related to requested financial services (e.g., for billpaying, the user provides payee selection and amount and his bank account PIN number). The central computer then transmits a message over a conventional ATM network debiting the user's bank account in real time, and may pay the specified payees the specified amount electronically or in other ways as appropriate. Payments and transfers may be scheduled in advance or on a periodic basis. Because the central computer interacts with the user's bank as a standard POS or ATM network node, no significant software changes are required at the banks' computers. The terminal interface is extremely user-friendly and incorporates some features of standard ATM user interfaces so as to reduce new user anxiety.

32 Claims, 44 Drawing Sheets

U.S. PATENT DOCUMENTS

| | | | |
|---|---|---|---|
| 3,643,219 A | 2/1972 | Heimann | |
| 3,648,020 A | 3/1972 | Tateisi et al. | |
| 3,652,795 A | 3/1972 | Wolf et al. | |
| D224,110 S | 7/1972 | Heimann | |
| 3,699,531 A | 10/1972 | Heimann | |
| 3,760,375 A | 9/1973 | Irwin et al. | |
| 3,769,579 A | 10/1973 | Harney | 348/4 |
| 3,833,885 A | 9/1974 | Gentile et al. | |
| 3,845,277 A | 10/1974 | Voss et al. | |
| 3,852,571 A | 12/1974 | Hall et al. | |
| 3,865,994 A | 2/1975 | Bender | |
| 3,876,864 A | 4/1975 | Clark et al. | |
| 3,920,926 A | 11/1975 | Lenaerts et al. | |
| 3,931,497 A | 1/1976 | Gentile et al. | |
| 3,932,709 A | 1/1976 | Hoff et al. | |
| 3,938,090 A | 2/1976 | Borison et al. | |
| 3,941,977 A | 3/1976 | Voss et al. | |
| 3,943,335 A | 3/1976 | Kinker et al. | |
| 3,956,615 A | 5/1976 | Anderson et al. | |
| 3,970,992 A | 7/1976 | Boothroyd et al. | |
| 3,987,259 A | 10/1976 | Larson | |
| 3,995,123 A | 11/1976 | Wilson | |
| 3,996,448 A | 12/1976 | Anderson et al. | |
| 4,017,835 A | 4/1977 | Randolph | |
| 4,023,013 A | 5/1977 | Kinker | |
| 4,025,760 A | 5/1977 | Trenkamp | |
| 4,032,931 A | 6/1977 | Haker | |
| 4,071,697 A | 1/1978 | Bushnell et al. | |
| 4,091,448 A | 5/1978 | Clausing | |
| 4,114,027 A | 9/1978 | Slater et al. | |
| 4,115,870 A | 9/1978 | Lowell | |
| D250,260 S | 11/1978 | Inatomi | |
| 4,134,537 A | 1/1979 | Glaser et al. | |
| D253,315 S | 10/1979 | Berman et al. | |
| 4,186,438 A | 1/1980 | Benson et al. | |
| 4,224,478 A | 9/1980 | Fahey et al. | |
| 4,232,199 A | 11/1980 | Boatwright et al. | |
| 4,277,837 A | 7/1981 | Stuckert | |
| 4,291,198 A | 9/1981 | Anderson et al. | |
| 4,291,199 A | 9/1981 | Densmore et al. | |
| RE30,773 E | 10/1981 | Glaser et al. | |
| 4,301,337 A | 11/1981 | Eventoff | |
| 4,305,059 A | 12/1981 | Benton | |
| 4,306,116 A | 12/1981 | McClure et al. | |
| 4,313,176 A | 1/1982 | Cecil | |
| 4,321,429 A | 3/1982 | Takatsuki et al. | |
| 4,321,672 A | 3/1982 | Braun et al. | |
| 4,331,973 A | 5/1982 | Eskin et al. | 348/13 |
| 4,334,126 A | 6/1982 | Slingsby | |
| 4,341,951 A | 7/1982 | Benton | |
| 4,381,427 A | 4/1983 | Cheal et al. | |
| 4,390,968 A | 6/1983 | Hennessy et al. | |
| 4,392,023 A | 7/1983 | Sears | |
| 4,409,450 A | 10/1983 | Blades | |
| 4,423,294 A | 12/1983 | Walser et al. | |
| 4,425,627 A | 1/1984 | Eibner | |
| 4,427,848 A | 1/1984 | Tsakanikas | |
| 4,431,870 A | 2/1984 | May et al. | |
| 4,454,414 A | 6/1984 | Benton | |
| 4,468,529 A | 8/1984 | Samuel et al. | |
| 4,476,349 A | 10/1984 | Cottrell et al. | |
| 4,481,574 A | 11/1984 | DeFino et al. | |
| 4,493,021 A | 1/1985 | Agrawal et al. | |
| 4,494,194 A | 1/1985 | Harris et al. | |
| 4,503,288 A | 3/1985 | Kessler | |
| 4,510,351 A | 4/1985 | Costello et al. | |
| 4,525,712 A | 6/1985 | Okano et al. | |
| 4,532,378 A | 7/1985 | Nakayama | |
| 4,533,791 A | 8/1985 | Read et al. | |
| 4,536,647 A | 8/1985 | Atalla et al. | |
| 4,545,023 A | 10/1985 | Mizzi | |
| 4,546,382 A | 10/1985 | McKenna et al. | 348/13 |
| 4,562,340 A | 12/1985 | Tateisi et al. | |
| 4,575,621 A | 3/1986 | Dreifus | |
| 4,578,174 A | 3/1986 | Kato et al. | |
| 4,578,530 A | 3/1986 | Zeidler | |
| 4,578,535 A | 3/1986 | Simmons | |
| 4,578,537 A | 3/1986 | Faggin et al. | |
| 4,580,011 A | 4/1986 | Glaser | |
| 4,585,908 A | 4/1986 | Smith | |
| 4,594,663 A | 6/1986 | Nagata | |
| 4,598,174 A | 7/1986 | Pommer | |
| 4,602,279 A | 7/1986 | Freeman | 348/10 |
| 4,604,686 A | 8/1986 | Reiter et al. | |
| 4,607,144 A | 8/1986 | Carmon et al. | |
| 4,625,276 A | 11/1986 | Benton et al. | |
| 4,629,832 A | 12/1986 | Carson et al. | |
| 4,630,108 A | 12/1986 | Gomersall | 348/13 |
| 4,630,201 A | 12/1986 | White | |
| 4,634,845 A | 1/1987 | Hale et al. | |
| 4,639,917 A | 1/1987 | Furuta | |
| 4,646,145 A | 2/1987 | Percy et al. | 348/13 |
| 4,652,704 A | 3/1987 | Franklin | |
| 4,653,086 A | 3/1987 | Laube | |
| 4,654,482 A | 3/1987 | DeAngelis | |
| 4,658,290 A | 4/1987 | McKenna et al. | 348/1 |
| 4,659,876 A | 4/1987 | Sullivan | |
| 4,659,879 A | 4/1987 | Hasegawa | |
| 4,663,766 A | 5/1987 | Bremer | |
| 4,674,044 A | 6/1987 | Kalmus et al. | |
| 4,674,115 A | 6/1987 | Kaleita et al. | |
| 4,678,895 A | 7/1987 | Tateisi et al. | |
| 4,682,014 A | 7/1987 | Iwama | |
| 4,683,360 A | 7/1987 | Maser | |
| 4,683,536 A | 7/1987 | Yamamoto | |
| 4,688,170 A | 8/1987 | Waite et al. | |
| 4,689,478 A | 8/1987 | Hale et al. | |
| 4,694,397 A | 9/1987 | Grant et al. | |
| 4,701,845 A | 10/1987 | Andreason et al. | |
| 4,709,387 A | 11/1987 | Masuda | |
| 4,710,955 A | 12/1987 | Kaufmann | |
| 4,713,761 A | 12/1987 | Sharpe et al. | |
| 4,724,521 A | 2/1988 | Carron et al. | |
| 4,727,243 A | 2/1988 | Savar | |
| 4,734,858 A | 3/1988 | Schlafly | |
| 4,737,980 A | 4/1988 | Curtin et al. | |
| 4,744,103 A | 5/1988 | Dahlquist et al. | |
| 4,745,468 A | 5/1988 | Von Kohorn | 348/13 |
| 4,748,656 A | 5/1988 | Gibbs | |
| 4,788,657 A | 11/1988 | Douglas et al. | |
| 4,791,281 A | 12/1988 | Johnsen et al. | 705/14 |
| 4,799,156 A | 1/1989 | Shavit et al. | 705/26 |
| 4,803,347 A | 2/1989 | Sugahara et al. | |
| 4,805,020 A | 2/1989 | Greenberg | 348/460 |
| 4,815,741 A | 3/1989 | Small | |
| 4,823,264 A | 4/1989 | Deming | |
| 4,839,919 A | 6/1989 | Borges et al. | |
| 4,850,007 A | 7/1989 | Marino et al. | |
| 4,851,994 A | 7/1989 | Toda et al. | |
| 4,852,151 A | 7/1989 | Dittakavi et al. | |
| 4,858,114 A | 8/1989 | Heath et al. | |
| 4,860,342 A | 8/1989 | Danner | |
| 4,870,677 A | 9/1989 | DiSanto et al. | |
| 4,872,113 A | 10/1989 | Dinerstein | 705/10 |
| 4,876,592 A | 10/1989 | Von Kohorn | 348/13 |
| 4,885,580 A | 12/1989 | Noto et al. | |
| 4,885,764 A | 12/1989 | Miwa | |
| 4,885,765 A | 12/1989 | Shirakawa | |
| 4,926,255 A | 5/1990 | Von Kohorn | 348/13 |
| 4,926,325 A | 5/1990 | Benton et al. | |
| 4,933,971 A | 6/1990 | Bestock et al. | |
| 4,935,870 A | 6/1990 | Burk, Jr. et al. | |
| 4,947,028 A | 8/1990 | Gorog | |
| 4,956,852 A | 9/1990 | Hodge | |

| | | | |
|---|---|---|---|
| 4,967,273 A | 10/1990 | Greenberg | 348/460 |
| D312,457 S | 11/1990 | Inatomi | |
| 4,970,681 A | 11/1990 | Bennett | 707/3 |
| 4,972,504 A | 11/1990 | Daniel, Jr. et al. | 705/10 |
| 4,982,346 A | 1/1991 | Girouard et al. | 705/14 |
| 4,991,199 A | 2/1991 | Parekh | |
| 4,995,074 A | 2/1991 | Goldman et al. | |
| 5,008,927 A | 4/1991 | Weiss et al. | |
| 5,014,190 A | 5/1991 | Johnson | |
| 5,018,189 A | 5/1991 | Kurosawa et al. | |
| 5,020,100 A | 5/1991 | Gardiner | |
| 5,025,372 A | 6/1991 | Burton et al. | 705/14 |
| 5,025,373 A | 6/1991 | Keyser, Jr. et al. | |
| 5,027,315 A | 6/1991 | Agrawal et al. | |
| 5,034,807 A | 7/1991 | Von Kohorn | 348/13 |
| 5,036,314 A | 7/1991 | Barillari et al. | |
| 5,038,372 A | 8/1991 | Elms et al. | |
| 5,050,207 A | 9/1991 | Hitchcock | |
| 5,057,915 A | 10/1991 | Von Kohorn | 463/9 |
| 5,114,128 A | 5/1992 | Harris, Jr et al. | 270/1.03 |
| 5,121,945 A | 6/1992 | Thomson et al. | |
| 5,126,936 A | 6/1992 | Champion et al. | |
| 5,127,040 A | 6/1992 | D'Auello et al. | |
| 5,128,752 A | 7/1992 | Von Kohorn | 705/10 |
| 5,155,591 A | 10/1992 | Wachob | 348/9 |
| 5,157,717 A | 10/1992 | Hitchcock | |
| 5,191,410 A | 3/1993 | McCalley et al. | 348/13 |
| 5,201,010 A | 4/1993 | Deaton et al. | 382/139 |
| 5,220,501 A | 6/1993 | Lawlor et al. | |
| D337,570 S | 7/1993 | Bevilacqua et al. | |
| 5,227,874 A | 7/1993 | Von Kohorn | 705/10 |
| D341,583 S | 11/1993 | Bevilacqua et al. | |
| 5,265,033 A | 11/1993 | Vajk et al. | |
| 5,283,734 A | 2/1994 | Von Kohorn | 463/17 |
| 5,283,829 A | 2/1994 | Anderson | |
| 5,285,382 A | 2/1994 | Muehlberger et al. | |
| 5,287,181 A | 2/1994 | Holman | 348/473 |
| 5,305,195 A | 4/1994 | Murphy | 705/1 |
| 5,321,840 A | 6/1994 | Ahlin et al. | |
| 5,347,632 A | 9/1994 | Filepp et al. | 709/202 |
| 5,383,113 A | 1/1995 | Kight et al. | |
| 5,446,919 A | 8/1995 | Wilkins | 455/6.2 |
| 5,502,636 A | 3/1996 | Clarke | |
| 5,652,786 A | 7/1997 | Rogers | |
| 5,715,298 A | 2/1998 | Rogers | |

FOREIGN PATENT DOCUMENTS

| | | |
|---|---|---|
| DE | 2709461 | 9/1978 |
| DE | 3212554 C1 | 10/1983 |
| DE | 3423090 A1 | 1/1985 |
| DE | 3405448 C2 | 8/1985 |
| EP | 0014313 | 5/1983 |
| EP | 0085482 A1 | 8/1983 |
| EP | 0181438 A2 | 5/1986 |
| EP | 0 265 232 | 4/1988 |
| FR | 2309915 | 11/1976 |
| GB | 1324616 | 9/1970 |
| GB | 1523691 | 4/1975 |
| GB | 1528691 | 5/1977 |
| GB | 2128447 A | 4/1984 |
| GB | 2149946 A | 6/1985 |
| JP | 54-15606 | 5/1979 |
| JP | 55-110368 | 8/1980 |
| JP | 57-41723 | 3/1982 |
| JP | 63-136758 | 7/1988 |
| WO | WO87/01256 | 2/1987 |
| WO | WO88/00371 | 1/1988 |
| WO | WO89/11195 | 11/1989 |

OTHER PUBLICATIONS

How to Put PC to Work Paying Bills; [Home Edition] Lawrence J. Magid. Los Angeles Times (pre-1997 Fulltext). Los Angeles, Calif.: Jul. 25, 1991. p. 3.*

Bodi, A. and Zeleznikow, J., "ATMs and electronic banking: current issues and future trends," *Proceedings of Information Technology: Emerging Opportunities and Challenges*, pp. 471-483, Proceedings of the Second Pan Pacific Conference, Singapore Computer Society, Singapore (Aug. 26 to 29, 1987).

Hebsgaard, Poul, "Breakthroughs in Card Security in Denmark", *The World of Banking*, pp. 19-22 (Mar.-Apr. 1987).

Customer marketing literature, Lloyds Bank Plc, Lloyds Bank Fundsflow: Same-day, Electronic, Sterling Payments Service, 7 pages (undated —but see Rowley statement).

Customer marketing literature, Nationwide Building Society, "Flexaccount Update, the Flexible Way of Paying Bills," (Oct. 1986); Making the most of your FlexAccount (Jan. 1987).

Foerster, Gerhard, "Electronic Cash and Chip Cards: Thoughts On Payment Transactions Effected By Private Households", *Bank Und Markt* No. 2, pp. 19-22 (Apr. 1983).

Bates, Albert E., "Is the ATM Obsolete?" *The Magazine of Bank Administration*, pp. 24-32 (Apr. 1986).

Statement of John Michael Rowley with Exhibits JMR1, JMR2, JMR3.

Second Statement of Nigel Douglas Wright (Apr. 4, 2003).

Statement of Kevin Bruce Hardern (Apr. 7, 2003).

Statement of Nigel Douglas Wright with attached exhibits.

Memorandum and Articles of Association of Link Interchange Network Limited (Incorporated Apr. 21, 1986), London England.

Memorandum and Articles of Association of Link Interchange Network Limited (Incorporated Apr. 21, 1986), (Articles of Association amended by special resolution passed on Aug. 3, 1989) London England.

Diagram illustrating the steps for processing a withdrawal.

Lucky, R.W., "Guest Editorial, Experimental Telecommunicaitons Services and Terminals," *IEEE Journal on Selected Areas in Communications*, vol. SAC-1, No. 2, p. 309, Feb. 1983.

Hagelbarger, David W. et al., "Experiments with Teleterminals," *IEEE Journal on Selected Areas in Communications*, vol. SAC-1, No. 2, pp. 310-315. Feb. 1983.

Thompson, Richard A., "Accessing Experimental Telecommunications Services," *IEEE Journal on Selected Areas in Communications*, vol. SAC-1, No. 2, pp. 316-321, Feb. 1983.

Bergland, G.D., "An Experimental Telecommunications Test Bed," *IEEE Journal on Selected Areas in Communications*, vol. SAC-1, No. 2, pp. 322-326, Feb. 1983.

Klapman, Richard N., "Enhanced Communications in an Executive Office," *IEEE Journal on Selected Areas in Communications*, vol. SAC-1, No. 2, pp. 327-332, Feb. 1983.

Allen, Robert B., "Cognitive Factors in the Use of Menus and Trees: An Experiment," *IEEE Journal on Selected Areas in Communications*, vol. SAC-1, No. 2, pp. 333-336, Feb. 1983.

Thompson, Richard A., "Users' Perceptions with Experimental Services and Terminals," *IEEE Journal on Selected Areas in Communications*, vol. SAC-1, No. 2, pp. 337-342, Feb. 1983.

Caswell, Deborah L. et al., "An Editor for Hierarchically Organized Menus," *IEEE Journal on Selected Areas in Communicaitons*, vol. SAC-1, No. 2, pp. 343-345, Feb. 1983.

Schell, William M., "Control Software for an Experimental Teleterminal," *IEEE Journal on Selected Areas in Communicaitons*, vol. SAC-1. No. 2. pp. 346-349. Feb. 1983.

PCT/US90/07153, PCT Abstract.

"Getting Started," Prodigy booklet, 2 pages (undated).

"Enhanced Telephone Fact Sheet" 2 pages (undated).

Sales Literature, "NCR 770 Self Service Financial Terminal," NCR #.

Sales Literature, "FDS/i Automated Modular Teller/875 System," FDS/i identification 035012-010, FDS/i Financial Data Sciences, Inc.

Sales Literature, "NCR 770 Self Service Financial Terminal," NCR #SP-13800774; SP-13810474.

Rod Adkins et al., "Displayphone: telephone and terminal combine in a compact desk-top unit," *Telesis*. pp. 207.
"Getting Around," Prodigy booklet, 2 pages.
Martin, James, *Design of Man-Computer Dialogues*, pp. 380-384 (Prentice Hall 1973).
NCR 770 Self Service Financial Terminal (Datapro Research Corp. Dec. 1978).
Subhash Bal, "New Generation Microprocessor for Telecommunication Applications," *Proceedings of the IEEE International Conference on Communications*, pp. 11.5.1-4, Jun. 1980, Seattle, WA.
C. H. Sederholm et al., "Intelligent Telephone," *IBM Technical Disclosure Bulletin*, vol. 23 No. 9., pp. 4006-4008 (Feb. 1981).
Plessey Publication No. 79521/1, Sep. 1982, "Plessey Integrated Business Information System".
Plessey Publication No. 7871/6, "Plessey Vutel," 4 pages, Jun. 1983.
G.M. Durkin, "QWERTYphone—A low-Cost Integrated Voice/Data Terminal," *British Telecommunications Engineering*, vol. 5, Jan. 1987.
Plessey Publication No. 8232, "Plessey MICROphone, Linking the World," 6 pages, Apr. 1987.
Cermetek, A *New* Generation of Information Terminals, Apr. 23, 1987.
Shohei Nishida, "The Telephone Becomes an Informaiton Terminal," *COMPUTOPIA*, May 1987 (p. 41).
Bellcore Technical Reference TR-TSY-000031, Issue 2, Jun. 1988, "CLASS™ Feature: Calling Number Delivery".
Bellcore Technical Reference TR-TSY-000030, Issue 1, Nov. 1988, "SPCS Customer Premises Equipment Data Interface".
Richard B.Ravel, Programmable Gate Arrays and Self-Diagnosing Hardware, *XILINX*, (1989) pp. 6-38 to 6-40.
John L. Fike,et al., "A Microcomputer in the Telephone," *Understanding Telephone Electronics*, pp. 119-150, 1989, Howard W. Sams & Company, Indiana.
Megatel Computer Corporation Publicaiton, "The Megatel Quark/PC+, V-40-Based Single-Board Computer Technical Manual," Ontario Canada, Aug. 1, 1989.
Richard B.Ravel, Programmable Gate Arrays and Self-Diagnosing Hardware, *XILINX*, (1989) pp. 6-54 to 6-56.
Subrata N. Chakravarty et al., "This thing has to change pepple's habits," *Forbes*, 2 pages, Jun. 26, 1989.
U.S. Appl. No. 07/433,825, filed Nov. 9, 1989 entitled "Method for Providing Financial and Informational Services in a Home Environment".
Data Sheets, A. Pargh Co., Inc., Telephone Acessories, Dialers, 2 pages.
Northern Telecon Model NT6K90AB Display Phone.
Programmable Terminal Model DC2.0 (National Data Computer, ??? MA.
Telephone With Graphics Capabilities Model LU-1000-01 (Luma Telecom Inc., Santa Clara CA).
*American Banker*, Aug. 12, 1985, p. 6, Tyson, "Viewtron Entering Pittsburgh in Deal with Dollar Bank".
*Economist*, Mar. 27, 1982, pp. 83 and 841, "Over 100 shared automatic teller machines (ATM network) are operating in the US," abstract.
*American Banker*, Jun. 28, 1984, pp. 2 and 181, Home Banking: MCI communications venture to be Delayed Until Next Year, abstract.
*American Banker*, May 15, 1985, "Airline Credit Uion Ready for Takeoff With Electronic and Telephone Banking," abstract.
*American Banker*, Jun. 9, 1987, "8 Banks and Thrifts in 3 States Launch video Banking Service," abstract.
*American Banker*, Apr. 4, 1984, pp. 8 and 17, "Low Cost Computer Terminal Designed for Home Banking".
*EFT Report*, Dec. 5, 1984, p. 8, "Australia gets its first home banking system".
*Marketing Communications*, Dec. 1984, pp. 32-34, "The Electronic Wizard of Wall Street".
*Its Current*, Mar. 1988, pp. 3-4, "ITS Develops SHAZAM Bill Payer for Customer and Merchant Convenience".
Information Disclosure Statement of U.S. 214,263 to Keyser, Jr. et al.
Microsoft—Version 2.11, thrid ed. Apr. 1985, p. 3.
Panasonic, Pocket size transactional terminal specifications.
Hayes Microcomputer Products, 1984, p. 1.3, "Introduction".

Teleservices Report, Nov. 1986, pp. 1-8.
Trading Systems Technology, Midwest Clearing Corp. Exports Software, Jun. 5, 1989, p. N/A ISSA: 0892-5542.
*EFT Sourcebook*, 1988, pp. 717-775, Egner, "Not Quite Ready for Home Banking".
*American Banker*, Mar. 16, 1989, Tyson, "Survival Kit: Pens and Stamps Instead of Video".
*American Banker*, 1989, pp. 73-6, Kutler, "Marketing Effort is Needed to Swell Ranks of ATM Users," consumer survey.
*The Nilson Report*, 1987 Ed., "Survey of ATM Networks and Debit Card Users".
*Bank Systems and Equipment*, Sep. 1987, p. 38, "Three Quarters of Households to Use ATMs by Year 2000".
*International Banker*, Jul. 28, 1982, p. 32, Anderson, "Electronic funds transfer is reaching the point-of-sale; banks, retailers look to EFT transactions to lessen processing costs".
*American Banker*, Mar. 19, 1982, p. 2, "Electronic networks springing up all over: systems linking automated teller machines, point-of-sale devices are established or contemplated in several areas of tl country".
*EFT Today*, Jun. 1988, pp. 19-22, Golden, "An electronic delivery system tanslating design and philosophy into benefits".
*New Products & Services*, 1988, "New developments in automated teller machines," product fucus, "DIEBOLD Portable ATM".
*Service Description*, 1989, "Bell Atlantic's Public Data Network (PDN) offering is overviewed".
*EFT Sourcebook*, 1988, pp. 35-38, Levy, "The delicate balance of ATM industry standards".
*National Directory of Shared ATM/POS Networks*, 1987 Ed.
*Interregional Sharing Model of the Shared Network Executives Association*, 1988, pp. 467-470, TransData Corp.
*American Banker*, Dec. 1, 1987, p. 13, vol. 152, No. 234, Zimmer, "A leading analyst investiages whether the ATM market has reached its saturation point or is poised for expansion".
*American Banker*. Aug. 24, 1983, p. 10, Garsson, "NCR universal credit union claims a first with home banking services".
ESCOM Executive/Secretary Communication System sales brochure, Itoh Communication Systems Inc., Elmsford, NY, May 1987.
News Release, May 28, 1987, "NCR's new universal financial system designed to accommodae change".
Abstracts of Japan, group No. F151, vol. 7, No. 4, Ogawa, abstract No. 57-162867.
Abstracts of Japan, group No. P274, vol. 8, No. 105, Ogawa, abstract No. 59-16068.
Abstracts of Japan, group No. P358, vol. 9, No. 120, Sakamoto, abstract No. 60-5377.
Abstracts of Japan, group No. E330, vol. 9, No. 178, Satou, abstract No. 60-47545.
*American Banker*, pp. 2 and 25, Jun. 9, 1987, 8 Banks and Thrifts in 3 States Launch Video Banking Service, Newman Jr.
*American Banker*, Apr. 4, 1984, pp. 8 and 17, Tyson, "Low-Cost Computer Terminal Designed for Home Banking".
*Economist*, Mar. 27, 1984, pp. 83-84, "Banking on the Inhuman Factor".
*American Banker*, Dec. 29, 1983, pp. 1 and 16 (abstract only) Chase Manhattan Bank will develop home banking services with Cox Cable . . . .
*Bank Network News*, "Dialing Up Networks: BILL's New Growth Plan," p. 6.
John J. Keller, "Technology—AT&T Calls Smart Phone The Future," *The Wall Street Journal*, pp. B1, B4.
Yvette D. Kantrow, "Visa to Test Home Device For Instant Bill Paying," pp. 1 and 5.
Product Data Sheet, "Teleprocessing, Digital Information Display Systems, Rapid Data Entry and Recall Data-Select Display Terminal DIDS-401-M16," Raytheon Company, U.S., no date.
Ad, "If we asked a banker to invent a telephone, this would be it," Transaction Telephone from the Bell System, Supplement to *American Banker*, no date.
"Docutel Corporation Automated Tellers and Cash Dispensers," B21-297-101 Automated Tellers, Datapro Research Corporation, Feb. 1975, New Jersey.

"User Ratings of Automated Teller Machines," Tellers, Datapro Research Corporation, Feb. 1976.

"A Special Datapro Report, A Buyer's Guide to Automated Tellers and Cash Dispensers," B21-010-101 Automated Tellers, Datapro Research Corporation, Apr. 1976, Delran, NJ.

Janice Castro, TIME. "Economy & Business,"Telephones Get Smart, pp. 50-51.

Plessey Company plc Publication, Plessey ibis, Integrated Business. Information System, 6 pages, 1982, England.

Ad, Forval Super Displayphone FP5, "A Telephone System That Allows You to See Your Information," 1 page.

PTT Telemix 300, "De compacte informatie-terminal voor de manager," 7 pages.

Keller, John J., *The Wall Street Journal*, AT&T Calls SmartPhone The Future.

Tyson, David, *American Banker*, "Home Bank Customers Grow to About 44,000," 2 pages, Jan. 22, 1985.

Friedman, Kenneth, *PC Magazine*, "Banking on Your Computer," pp. 277-279, May 14, 1985.

Sullivan, Michael P., *Unites States Banker*, "The HBI Role in the Home Banking Revolution," pp. 46-48, Sep. 1983.

*Savings Institutions*, "A Small British Institution Succeeds in Home Banking," pp. 96-97, Jan. 1984.

Seitz, Rob, Phone Companies Join Their Rivals in the Facts, 1 page.

"Shopping Via Light Pen," 1 page.

Quittner, Joshua, *Newsday*, "Telephones Get Smart," 1 page.

Harbatkin, Lisa, *PC Magazine*, "Home Based Banking," pp. 301-302, 308, 309, Nov. 1983.

Canon Info Sheet, "Navigator, Multiform Integration," printed in Japan, 1989.

*Teleservices Report*, published by Arien Communications, Inc., "Chase Offers "Bank by Television" to Non-PC Owners Using RCA Terminal," No. 49, Jul. 1986.

Ad, "Luma: The Phone That's Not All Talk," Luma telecom, Inc. 1986.

"Minitel 10, Mode D'Emploi," PTT Telecommunications, Paris France.

"Teletel, Le service annuaire electronique, Mode d'emploi," PTT Telecommunications, Paris, France.

Myers, Edith, *Datamation*, "In Focus, Banking on PCs," 6 pages.

Burck, Charles, *Fortune*, "Getting to Know the Smart Phone," 6 pages, Feb. 25, 1980.

Quittner, Joshua, "Telephones Get smart, New technologies, new capabilities on way," 2 pages.

Ramirez, Anthony, "Teller in a Telephone, Bank to Help Customers Keep Fingers on Dollars," 1 page.

*United States Banker*, "AT&T Copying Citicorp," p. 54.

Wilke, John R., *The Wall Street Journal*, "Lotus, Philips Plan to Develop Hybrid Phones," p. B6.

Info Sheet, "Now Your Touch Tone Phone has all the Answers," Dime Savings Bank, New York, 2 pages.

Gullo, Karen, *American Banker*, "Banc One Revives PC Home Banking".

"Rumor Central," 1 page, Aug. 12, 1986.

*Consumer Reports*, "Untangling the Phone," pp. 289-301, May 1986.

Manual, "Welcome to Direct Access, Direct Access" 1987.

Ramirez, Anthony, *The New York Times*, "For the 90's, Screen-Based Phones," 1 page.

Carnevale, Mary L. and John J. Keller, "Nynex, Philips Join to Develop Screen Phones," 1 page.

*Bank Network News*, "Dialing Up Networks: BILL's New Growth Plan," p. 6.

Kantrow, Yvette, "Home Device For Instant Bill Paying," 1 page.

"Makes Paying Your Bills Less of a Chore" 1 page.

Two (2) Pictures of data terminals.

*The Wall Street Journal*, "Citicorp Skips Computer in New Home Banking Plan," Feb. 28, 1990.

Citibank home-banking sales brochure ("In 1977 Citibank introduced . . . ", received Apr. 1990.

Citibank home-banking user's manual, Apr. 1990.

*Washington Post*, Maryland National BGank/American Security Bank home-banking sales brochure, May 27, 1992.

*Business Journal*, "Citicorp test-markets device that simplifies home banking," abstract, p. 16, Oct. 29, 1990.

* cited by examiner

METHOD AND SYSTEM FOR REMOTE DELIVERY OF RETAIL BANKING SERVICES

CROSS-REFERENCES TO RELATED APPLICATIONS

This is a continuing application of application Ser. No. 09/789,534, filed 22 Feb. 2001 now U.S. Pat. No. 7,076,458; which is a continuing application of application Ser. No. 09/020,109, filed 6 Feb. 1998, now U.S. Pat. No. 6,202,054; which is a divisional application of application Ser. No. 08/469,354, filed 06 Jun. 1995, now U.S. Pat. No. 5,870,724; which is a continuation of application Ser. No. 07/975,334, filed 16 Nov. 1992, abandoned; which is a continuation-in-part of application Ser. No. 07/448,170, filed 08 Dec. 1989, now U.S. Pat. No. 5,220,501.

FIELD OF THE INVENTION

The present invention relates to a method and system for distributing financial and other services to remote locations, and more specifically, provides banking type financial transaction handling via remote data terminals located in users' homes, offices or other locations (i.e., "home banking" or "remote banking"). Still more specifically, one aspect of the present invention involves using the ATM (automatic teller machine) network (interchange) as a data communications network for conducting banking financial transactions from homes and offices.

BACKGROUND AND SUMMARY OF THE INVENTION

Not long ago, "home banking" was thought to be just around the corner. With the advent of relatively inexpensive, powerful personal computers, the computer industry hoped (and predicted) that a personal computer with communications capability (e.g., modem) would soon find its way into every home.

It was generally believed by many that the home computer would become a central, integrated part of everyday life and would proliferate as have radio and television receivers in past decades. It was expected that people would prepare and file their income tax returns by computer, conduct most or all financial transactions (including billpaying) through software interfacing their personal computer and telecommunications lines with banks and other financial institutions, etc. The home personal computer was expected to largely replace the U.S. Postal Service as a means of communicating with and contacting the outside world. People would draft personal letters using word processing software on the personal computer and telecommunicate the letters electronically to the intended recipient over telecommunications networks. It was expected that shopping would be done electronically by perusing electronic merchandise and grocery catalogs "online" and placing orders electronically over a telecommunications data network; and that even newspapers would be read electronically "online" (thus obviating the need for delivery of hard copy).

A few banks and other financial institutions actually developed "home banking" systems designed to interface with home personal computers expected to soon be found in most households.

Ordinary people are generally not used to computers and many avoid them whenever possible. While the next generation may be highly computer literate, many of their parents and grandparents have little or no computer experience and would much rather continue doing things "the old way". Even computer literates who own home personal computers find use of the computer to be relatively limited. As one example, it continues to be relatively expensive and impractical to send "mail" electronically. Telecommunicating over telephone lines is relatively expensive, and only just recently have regional telephone companies entered the public data network (PDN) business thereby increasing capacity and reducing user costs. Moreover, most intended electronical mail recipients do not even have computers, the necessary communications equipment and the knowledge and experience.

Perhaps more importantly, the "learning curve" associated with familiarizing oneself with new software is often so steep that even computer literate people look upon learning a new software package with great disdain and apprehension. Thousands upon thousands of different software packages are on the market, but the top sellers are typically the first packages to be introduced. This is because users tend to continue to use software they already know and resist learning new packages unless they are convinced the effort will be worthwhile. Even "user friendly" software may be very time consuming to learn. Many users would probably prefer to continue their banking transactions in "the old way" rather than spending even only a few hours learning a completely new home banking software package.

In addition, the cost of providing home banking services have been enormous. Service providers incur very high communications costs in linking their central processors with PC users, banks, and payees (merchants). Many payees also do not accept electronic payments (for lack of substantial volume), forcing service providers to make costly paper-based payments. Settlements processing can also be costly, as banks must install special purpose software and operating procedures. These and other costs have been passed along to consumers, thereby dampening the demand for home banking services.

Thus, although a small percentage of people have effectively come to utilize and rely upon some of the vast variety of services accessible through a home computer as an integral part of their daily lives, the vast majority continue to communicate by post and telephone, shop by visiting retail stores or leafing through hard copy catalogs received in the mail, and pay their bills by writing checks and sending them through the mails.

In part because of the problems discussed above, PC-based home banking is not yet a practical reality for most consumers. In fact, many home banking programs launched in the past have been declared failures and discontinued. See, for example, Egner, "Not Quite Ready for Home Banking", *The EFT Sourcebook*, pp 171-175 (1988); and Tyson, "'Survival' Kit: Pens and Stamps Instead of Video", *American Banker* (Mar. 16, 1989).

Few corporations continue to market cumbersome, hard-to-use, PC and modem-based home banking systems developed a few years ago. Covidea, a joint venture between Chemical Bank and AT&T, was the earliest, most notable PC-based home banking enterprise. After $70 million in investment and nearly 10 years of development and marketing, Covidea recently terminated its operations. Chemical and AT&T cited obsolete technology as the principal reason for closing operations. Knight-Ridder, AMR and others have ceased operating their PC-based home banking services. The following institutions, however, continue to operate home banking systems:

Major Home Banking Operators

| Operator | Name of Service | Est. Users |
|---|---|---|
| Bank of America | Homebanking | 37,000 |
| Manufacturers Hanover | Excel | 7,000 |
| Citibank | Direct Access | 15,000 |
| Chase Manhattan | Spectrum | 5,000 |
| Madison Bank | Home Teller | 2,000 |
| Princeton Telecom | licensed to banks | 2,000 |
| Harbinger Computer | licensed to banks | 2,000 |
| Prodigy | licensed to banks | 10,000 |

Source: Teleservices Report, Arlen Communications, 1987 Videotext Industry Association, 1988

Prodigy (a joint venture between IBM and Sears) is the primary major operator actively pursuing the national market. Much like the banks, Prodigy targets personal computer users (with modems) with extensive videotext service (e.g. airline reservations, and home shopping). Unlike the banks, however, bank services are secondary and Prodigy hopes to offset some of its high costs with advertising revenues. Even if Prodigy succeeds, its services are aimed at a high-end, technology-user—not the broader market comprising the majority of bank customers.

Telephone banking operators have recently begun to allow customers to pay bills from home. Some such telephone billpaying systems involve voice response technology to provide automatic handling of limited customer financial transactions (thus eliminating the requirement for human operators to answer and handle customer calls). Several independent telephone billpaying services have emerged (e.g. Checkfree and Merchants Network), but most billpaying services are offered by individual banks. Recent voice-response technology advances have enabled telephone banking and billpaying to become the banking industry's fastest growing retail product. Payments Systems, Inc., a leading electronic funds transfer consulting firm, estimates that 5-7 million U.S. households use telephone banking in 1988 versus approximately 2 million in 1985.

Nonetheless, telephone billpaying has serious limitations because of its lack of a visual interface (i.e., display). Telephone voice response systems only permit the presentation of very limited, simple alternatives. Sophisticated service offerings are not practical because of their reliance on complex branching alternatives which can not be easily remembered by users. As a consequence, telephone billpaying users easily lose track of their place; confirmation and review of payments is limited; users need to keep track of payee code numbers on separate paper lists; and user options such as scheduling payments become exceedingly complex and thus virtually impractical. Telephone billpaying service providers have high cost structures and, despite advances in voice-response technology, telephone billpaying has serious inherent service limitations.

Telephone banking is convenient but has inherent limitations which make billpaying and other complex financial services very hard-to-use. ATMs, on the other hand, are very easy-to-use, but lack the convenience of a telephone.

ATM usage has grown dramatically in the past decade. There are now approximately 140 million cardholders in the U.S. Japan has over 135 million ATM cardholders, and Europe has 122 million cardholders. Approximately 25% of U.S. households use ATM cards or more times per month. These cardholders have demonstrated a high degree of comfort with electronic banking. These customers tend to be under 40, upwardly mobile, and convenience-oriented. See, for example, Kutler, "Marketing Effort is Needed to Swell Ranks of ATM Users", Consumer Survey, *American Banker* pp 73-76;

"Survey of ATM Networks and Debit Card Users", *The Nilson Report* (1987 Ed.); and "Three-Quarters of Households to Use ATMs by Year 2,000", *Bank Systems and Equipment* p 38 (September 1987).

While ATMs are very easy-to-use, they currently allow users to access only a limited number of bank teller services. A bank's own ATMs are typically connected by direct line to the bank's data processing system. The bank's data processing system, in turn, communicates with a regional (or national) "ATM Network"—a specialized digital packet network which communicates ATM and POS (point of sale) transactions among banks using standardized message protocols. These ATM networks and associated digital switches permit someone using the ATM of one bank to access an account in another bank, for example.

ANSI and others have established standards on ATM digital message protocols and other features of ATMs. A more-or-less standard, generic ATM interface has developed in the banking industry, making it relatively easy for a user to use any ATM on the ATM network once has he learned how to interact with this more-or-less standard interface. Of course, ATMs produced by different manufacturers may differ in key placement, number of keys, key legends, screen size, etc. However, there has been a trend toward standardization so as to minimize user discomfort with using a "foreign bank" ATM.

Of course, a bank customer wishing to use the ATM network to conduct a financial transaction typically has to travel to a nearby ATM (e.g., at a local bank branch). Moreover, most ATMs generally do not permit customers to pay bills or conduct other complex financial transactions—typically limiting the user to withdrawals, account inquiries, account transfers, and, if the ATM the user accesses is that of his own bank, deposits.

It is known to utilize the ATM network to conduct financial transactions other than in the manner discussed above. The following references are generally relevant to use of an ATM network/switch for processing various types of financial transactions:

ITS Develops SHAZAM Bill Payer For Consumer and Merchant Convenience", *ITS Current*, pp 3-5 (March 1988);

Levy, J., 'The Delicate Balance of ATM Industry Standards", *The EFT Sourcebook*, pp 35-38 (1988)

*National Directory of Shared ATM/POS Networks* 1987 Edition, TransData Corp.;

*Interregional Sharing Model of the Shared Network Executives Association*, pp 467-70;

Zimmer, "A Leading Analyst Investigates Whether the ATM Market Has Reached Its Saturation Point or is Poised for Expansion", *American Banker*, p 13, Vol. 152, No. 234 (Dec. 1, 1987);

Garsson, "NCR Universal Credit Union Claims A First with Home Banking Services", *American Banker*, p 10 (Aug. 24, 1983);

Anderson, "Electronic Funds Transfer is Reaching the Point-of-Sale;

Banks, Retailers Look to EFT Transactions to Lessen Processing Costs, Increase Market Share", *American Banker*, p 32 (Jul. 28, 1982); and "Electronic Networks Springing Up All Over: Systems Linking Automated Teller Machines, Point of Sale Devices are Established or Contemplated in Several Areas of the Country", *American Banker*, p 2 (Mar. 19, 1982).

It appears from the articles referenced above that others in the past have explored the use of an ATM network/switch to route point-of-sale and/or billpaying data requests and transactions. For example, the *National Directory* reference (see above) claims that four ATM networks provide participants with home banking services (although this claim may actually be false). The "Shazam" system, under development in Iowa, permits a consumer to pay bills to prespecified accounts using a bank ATM or special purpose ATM type "billpaying terminal" located in a branch bank and communicating directly over the ITS ATM network. The MAC system permits a PC-based home banking service provider to use the network to perform limited functions such as balance inquiry and funds transfers. Aggregated bill payments are transmitted to banks using the MAC network as a simple data carrier at the close of the banking day in batch mode.

Some point-of-sale (POS) systems do exist which are capable of automatically generating debit requests and applying such debit requests to an ATM network (e.g., to result in immediately debiting a purchaser's account). Specifically, it appears that some such POS systems include a "concentrator" central computer connected to local modems. The local modems receive incoming calls over dialup telephone lines from remote POS stations located at retail sites. When a purchaser makes a purchase, he provides a magnetic stripe card which is encoded with identity and account information readable by the remote POS terminal. The purchaser also is required to input his PIN (personal identification number) for security reasons. The POS station automatically dials the central computer and transmits an identification of the retailer; purchaser bank and account information; and a dollar amount to be debited. The central computer reformats the POS request into a standardized POS debit request message which it transmits over the ATM network. The transmitted debit request causes the purchaser's bank account to be immediately debited, and may also provide a feedback message to the remote POS terminal indicating that the purchaser had an account balance exceeding the purchase amount and that the purchase amount has been successfully debited from the purchaser's bank account. Additional mechanisms cause the debited funds to eventually be paid to the retailer.

The following patents are generally relevant to prior dedicated home banking terminals and associated systems/networks:

U.S. Pat. No. 4,634,845 to Hale et al
U.S. Pat. No. 4,689,478 to Hale at al
U.S. Pat. No. 4,694,397 to Grant et al
U.S. Pat. No. 4,305,059 to Benton
U.S. Pat. No. 4,341,951 to Benton
U.S. Pat. No. 4,625,276 to Benton et al
U.S. Pat. No. 4,536,647 to Atalla et al The two Hale patents relate to a specific dedicated home banking terminal and associated system. Grant et al broadly teaches a system which integrates banking and brokerage services via a data communications gateway between the two systems. The three Benton patents relate to details concerning personal banking/financial transaction terminals. Atalla et al teaches a portable banking terminal including data encryption capabilities and discusses communicating over data communications lines with a data switch (see FIG. 1 and associated text).

The following patents relate to banking terminal security considerations:

U.S. Pat. No. 4,390,968 to Hennessy et al
U.S. Pat. No. 4,525,712 to Okano et al The following additional patents are of general interest as representing the state of the art:

U.S. Pat. No. 4,454,414 to Benton
U.S. Pat. No. 4,578,535 to Simmons
U.S. Pat. No. 3,920,926 to Lenaerts et al
U.S. Pat. No. 3,652,795 to Wolf et al
U.S. Pat. No. 4,713,761 to Sharpe et al
U.S. Pat. No. 4,683,536 to Yamamoto
U.S. Pat. No. 4,678,895 to Tateisi et al
U.S. Pat. No. 4,594,663 to Nagata et al
U.S. Pat. No. 3,375,500 to Fowler et al
U.S. Pat. No. 3,970,992 to Boothroyd et al
U.S. Pat. No. 3,648,020 to Tateisi et al
U.S. Pat. No. 4,654,482 to DeAngelis Most banks believe that remote banking is a good idea waiting for an acceptable, cost-efficient, easy-to-use delivery system. Most bank customers dislike the time consuming drudgery they devote every month to paying bills and conducting other banking transactions, and wish a low cost, easier way existed to perform these transactions. Unfortunately, the prior art discussed above does not provide any practical architecture for providing comprehensive banking services (including paying plural bills to user selected payees) in the home or office over standard dialup telephone lines via an ATM network.

The present invention provides a solution to many of the problems discussed above. In particular, the present invention provides a practical, cost-effective, workable system and method for delivering banking and other financial services (including billpaying capabilities) to remote sites such as customer homes and offices while avoiding the pitfalls encountered by home banking experiments of the past.

The present invention capitalizes on the convenience of the telephone and the widespread familiarity with automatic teller machines. Previous "home banking" applications required a personal computer (PC), a modem, complicated software procedures and considerable training and/or computer knowledge. Home banking was thereby confined to the extremely small niche of sophisticated PC users. Now, with new technology and an established base of 140 million ATM cardholders, the present invention can reach a large market with low cost services:

The present invention serves this market by providing a low cost (possibly free) ATM-like terminal, which preferably uses low-cost Applications Specific Integrated Circuit (ASIC) and surface mount technology for low cost and high reliability;

The present invention targets remote banking service to 50 million U.S. households owning ATM cards, 21 million of whom show a high degree of comfort with electronic banking;

The present invention preferably utilizes ATM and telephone company digital communications networks, thus avoiding a large upfront fixed investment and ensuring low operating costs;

The present invention system costs are supported by sharing processing savings with banks, payees and advertisers (who target ads to users based on spending patterns).

Briefly, the present invention provides dedicated telephone-based banking terminals to users for home or office use ("home banking"). An asynchronous communications link is connected to a telephone company public data network (or other digital packet network) between the remote terminal and a central computer system operated by the service provider. A central computer system analyzes and processes the user payment instructions—typically processing a user's request for many discrete financial transactions at one time. The central computer stores information about these transactions in a database it maintains, and then generates electronic funds transfer (EFT) requests which it communicates to the user's bank via an ATM network/switch. For example, the central computer system may debit the user's account at his bank (e.g., via a POS debit message passed over the ATM network) and electronically transfer the funds to a holding account or bank. The central computer then distributes the funds (bill payments) to the payees requested by the user.

ATM networks have been used for ATM use and more recently for point-of-sale (POS) uses. When combined with new PDN service as in the preferred embodiment of the present invention, ATM networks permit development of a market at minimal upfront, fixed cost and very low variable operating costs. The system provided by the preferred embodiment of the present invention basically acts as a conduit connecting bank depositors with their bank through telephone company gateways and ATM networks. The service provider need not build its own network, and banks need not install new communication lines or software.

Since ATM networks have in the past usually provided only limited services (e.g., withdrawal, deposit and account inquiry, and more recently, point-of-sale transaction handling), the present invention offers a new use of the existing ATM networks to provide transactions not previously supported by the networks and also provides a new central computer/communications system performing new functions—in addition to providing a linkage never before existing between two networks (i.e., a digital packet network accessible through dialup telephone gateway, and an ATM network) for the purpose of home banking.

Payments can be processed immediately and made using EFT means (automated clearinghouse, direct deposit in concentrator accounts, point-to-point, etc.) through payment network. Certain EFTs are processed through the originating ATM network (or though another ATM network). Payments not made electronically are sent by post in the form of a check and payor invoice information list ("check and list"). In addition, the central computer system can transmit to the user's bank the names of payees and other Federal Reserve Regulation E information through the ATM network using POS formats. This permits the customer's bank to print a unified statement listing for billpaying transactions as well as normal bank transactions (e.g., deposits, debits, and ATM withdrawals).

Thus, once entered into the system a user terminal is linked in the preferred embodiment through a gateway to a public data network (PDN) service of a regional telephone company. Telenet and other PDN services have been available for years, and these services remain competitive to the regional telephone companies on an interstate basis. However, the data packet price of local PDN services is usually lower for regional telephone companies (because the cost of their networks is amortized over many users and alternative uses.)

The preferred embodiment preferably includes compact inexpensive remote user terminals capable of interfacing with standard dial-up telephone lines. One version of the preferred embodiment terminal is compact in size (3.75"×8"×1.75"), portable and simply connects to the user's telephone jack. A second version of the terminal has a telephone handset and associated electronics permitting the consumer to use the device as a terminal or as a conventional telephone. No hardware or installation expense is required. Users operate the terminal intuitively, and users need not have prior computer experience. Since the present invention targets ATM users, the terminal is designed to interact with users in a manner similar to ATM user interaction.

Users preferably activate the preferred embodiment terminal by simply turning it on. The terminal automatically dials a central processor system over dialup telephone lines. Users are preferably welcomed in the name of their own bank. They may gain access to services by identifying their account from a menu of authorized household users, then entering their bank ATM personal identification number (PIN). A built-in security device is preferably provided to afford high level security to the user, and the terminal has the capability to transmit encrypted data.

Users preferably receive and view messages through a four line (e.g., by 24 or 30 character) liquid crystal display (LCD). Instructions are communicated through a backlit display adjacent to the LCD. Messages are communicated at high speed (e.g., 1200 baud) over dialup lines. The terminal takes advantage of significant human factors research and development performed by the U.S. Department of Defense and adopted by major ATM producers. By positioning selection ("soft") keys next to options displayed on the screen, users can more easily understand and quickly respond to instructions. Users thereby communicate by single-stroke responses to choices displayed, and the service provider has much greater system flexibility with which to format screens and expand services.

Moreover, the preferred embodiment terminal and associated user interface to some extent mimics the terminal/interface provided by standard ATMs already in use by millions of bank customers. The preferred embodiment thus eliminates or reduces the level of apprehension may users might harbor toward learning a new terminal and interface. When a typical new user first uses the terminal provided by the present invention, he intuitively knows how to navigate through the user interface/menu structure because the user interface is (at least superficially) similar to that of ATMs he has used in the past. Of course, the user interface and terminal provided by the present invention offer far more functionality than is available through a standard ATM, and in fact are extremely different from the standard ATM terminal/interface. However, the user's initial impression is perhaps the most important and the typical user's first impression to the terminal provided by the present invention is that it is "like" an ATM and can be operated intuitively without reading a user manual and without any steep learning curve. The primary market for the services provided by the present invention is 21 million highly active ATM users who will view the invention as a convenient, comfortable extension of current ATM services. The services may also appeal to certain non-ATM users, who will be attracted to the expanded services (e.g., billpaying) provided by the present invention.

The major emphasis in designing the terminal and its support system is service and ease-of-use. This has been achieved by adopting a number of features contained in the popular ATM machines employed by banks, such as for example:

1) Keyboard and Screens: The latest ATM machines contain simple uncluttered keyboards usually consisting of an alpha/numeric keypad, a cancel key, enter key and a number of "soft" (i.e., programmable) selection keys adjacent to the screen which have no fixed function. The function of these soft keys is described on the screen and is related to service that is being provided. Older machines tend to have multiple dedicated function keys that perform one specific function. The user must push the proper function keys in the correct sequence to complete the transaction in which he is interested. These keyboards tend to be cluttered and confusing. The displays associated with this type of keyboard are usually limited to several lines of text. The dedicated key keyboard design approach is necessary because the limited size of the display precludes the presentation of multiple alternatives among which a user may select. Newer machines have larger video displays consisting of from four to eight lines and "soft" keys that fulfill different functions depending on information provided on the screen. Users are presented with multiple choices and asked to select the desired alternative. The user pushes the "soft" key that corresponds to the selection he wishes to make. Similar to the newer ATM machines, the terminal provided by the present invention contains a four line by, for example, 24-character LCD display (many ATMs use video displays), four "soft" keys, a cancel and a numeric keypad. In addition, the terminal provided by the present invention contains a HELP key and two screen control keys labeled PRIOR and NEXT. Unlike ATM machines a user who needs assistance can obtain it regardless of "where he is" in the transaction process by pushing the HELP key. Contact sensitive help provides explanations regarding the transaction in which he is involved. The screen control keys permit the user to scroll forward and backward when reviewing lists. Using the NEXT key also permits movement from one screen to the next at the user's pace. The CANCEL key permits the user to correct erroneous input or back out of certain transactions when he has mistakenly chosen an alternative.

2) Security: The ATM establishes a user's identity by requiring a card and the use of a personal identification number (PIN). The terminal provided by the present invention uses a slightly different approach in that no card is required (although in at least one configuration a card may be used if desired). The terminal is generally in a more secure location than is an ATM machine. At SIGNON the terminal transmits a unique number that identifies a particular household. The individual selects his name from the authorized household list. He is then requested to enter his PIN in much the same manner as with an ATM machine. The data transmitted from the terminal is encrypted, providing security against line tapping or theft of the line. An ATM uses a bank card to determine who is signing on the machine; in contrast, in accordance with one aspect of the present invention, terminal possession is used as an indication of one of several users in a household.

3) Look and Feel: The newer ATM machines are menu driven, the user is presented with a number of alternatives and he selects the one he wishes by using "soft" keys. This is preferable to the user having to follow a list of steps coordinating screen instructions with different dedicated function keys on a nearby keyboard. There is less distraction and confusion when the user is provided alternatives on the screen. He can be given assistance upon request when he is uncertain. There is no limited reading of keycaps or coordination of key colors or reading of sequential instruction lists posted on the machine. In a similar fashion the terminal provided by the present invention is menu oriented. The user can get to his desired service quickly (generally with selections from 1-2 levels of menus). The combination of "soft" keys and menu branching provides a look and feel very similar to an ATM with which he is comfortable and experienced although the terminal provided by the present invention also provides several additional important features which provide increased functionality.

4) Services: The ATM primarily provides balance inquiry, cash withdrawal and check deposit accompanied by a receipt. Some ATMs permit limited bill payment and last date of deposit and withdrawal. Instead of printing out a receipt like an ATM, user of the terminal provided by the present invention receives a statement from his bank at the end of the month. In addition, it is unlike an ATM in that you generally cannot receive money or make deposits through the terminal (unless an additional interface to a debit card or "smart card" is provided). The terminal user is, however, able to pay all bills (present and future or pay periodically), transfer funds (today and in future), obtain balance information, look forward and backward at statement activity (payments, deposits and transfers) transfer funds among accounts and banks, obtain information on bank services and rates anywhere there is a standard telephone RJ-11 jack. With the addition of an alpha keyboard (which may be an expansion feature) the terminal can provide E-mail and other alpha-dominated services.

5) Personal Service: The terminal provided by the preferred embodiment of the present invention is compact and portable and is available for use twenty-four hours a day. The list of payees the user selects can be anyone, not a preselected list as with the few cases where users pay bills from an ATM. The services are available when the user wants, where the user wants. His billpaying time is reduced and he need not contend with stamps, check printing fees, envelopes, and postal delivery.

6) Network Configuration: The ATM machine is usually connected to a bank's computer via telephone or hard line. Accounting information is provided by the bank's computer. Transactions that must be passed to other banks are transmitted through the ATM network. Those ATMs that permit bill-paying inventory the bills that are to be paid during the day at the ATM machine and are then posted after the close of the banking day by the bank. The ORL system passes bill payments directly through the ATM interchange (in the form of point-of-sale transactions) for debit and credit of accounts on a real-time basis.

To use billpaying features, customers provide the service provider in advance with a list of payees (names, account numbers, addresses). A typical household (owning an ATM card) writes 26 checks per month and the list might, for example include payments for:

| | |
|---|---|
| utilities | telephone, gas, water, electricity, cable TV; |
| residential | rent, mortgage, home, insurance; |
| automotive | gas credit card, auto insurance, auto loan; |
| credit card | AMEX, Visa, Master Charge and others; |
| retail | major department stores; |
| financial | installment loan, taxes, stock broker fees; |
| medical | physician, dentist, health insurance; |
| business | office parking fee, newspapers, magazines; and |
| miscellaneous | child care, tuition, church, vacation home, domestic employees, etc. |

Users may review past payments and schedule future payments (e.g., timed to meet anticipated funds availability such as paycheck or check deposit). Users may also have the system provided by the present invention automatically pay fixed, recurring payments, such as rent, mortgages, and installment loans.

The preferred embodiment of the present invention processes information transmitted through the PDN using a fault-tolerant central processor to ensure system integrity. Once the system provided by the present invention processes user payment instructions, it communicates with the user's bank through a regional or national ATM network. Regional ATM networks (which are usually shared banking cooperatives) have been developed to permit bank customers to access any ATM in their local area. Users are no longer tied to their own bank's ATMs. The Cirrus and Plus ATM networks offer the same service on a national basis by linking required ATM networks. The ATM network application provided by the present invention preferably requires no new hardware or software modifications to ATM communication systems. And, very importantly, unlike other home banking systems (which require specialized software in automated clearing house capability), the present invention requires little or no new software or operating procedural changes at a user's bank.

Using an ATM network, the service provider pays customer bills by first debiting the user's account at his network bank—preferably by sending a POS debit message over the ATM network. Such standard POS messages not only permit the service provider to pass payee or other information over the network to the user's bank for use by the bank in generating a unified monthly statement, but also provide an automatic account inquiry/balance check function (so that the user does not overdraw his bank account inadvertently). Funds are transferred through the ATM network to the service provider's holding bank (or a clearing account maintained by the service provider in the user's bank). Payments are preferably processed immediately electronically, where feasible, either immediately or "warehoused" for a short time for transmittal with other user payments to a single payee. Otherwise bills are paid by paper check.

Electronic payments can be processed through an Automated Clearing House (ACH) system, (e.g., Federal Reserve) directly to a payee (point-to-point), or to the payee's bank (directly or indirectly through an ATM network or other remittance channel). In recent years, payees have become more receptive to working with electronic payments processors. Aside from minimizing a payee's processing costs and float, the present invention offers payees more predictable cash flow, lower returns (bad checks), and accounting and bookkeeping advantages related to consolidated payments.

The invention provides more additional benefits to payees. By processing customer bills as POS debits, liability for payment immediately shifts from the service provider to the ATM network (or bank). Thus, the service provider can advance funds to payees immediately with the comfort that the advance will be covered on the next business day by the customer's bank or the ATM network. This reduces the payee's float by 1-2 days versus electronic billpaying systems. Secondly, payees may hold remittance accounts at banks who are members of the ATM network. Debited funds and billing information may be sent directly to these accounts. Payees who may not otherwise have the capability to accept electronic payments may gain that capability. This reduces the payee's remittance processing costs and permits the bill paying service provider to make fewer, costly paper-based payments.

The cost of processing payments is relatively low in terms of equipment and communication costs. Most costs are incurred in responding to user inquiries, correcting payee posting errors, maintenance of payee databases, and coordination between users, payees, and their banks. Higher costs are incurred by payments made by paper check, although these costs are mitigated by interest earned on float due to postal delivery time.

Other innovative features provided by the present invention include:

A new type of inexpensive ergonomically designed user-friendly dedicated home banking terminal including for example a four line LCD display with associated control buttons "pointing to" the display lines for selection of displayed options and auxiliary "Select One", "Or", "Change Screen", "Enter Number" LED illuminated command prompts that are turned on and off by the central computer system as needed.

Advanced "ATM-like" terminal layout:
  Four line by 24 character liquid crystal display;
  Four adjacent selection (i.e., "soft", programmable) keys directly referencing the display to be used for selecting alternatives;
  Two function keys to provide on demand help and cancel functions;
  Twelve alpha/numeric telephone-type keypad for numeric input and later for limited alpha input plus the "#" and "*" for later communications applications and compliant with present telephone equipment standards; and
  Two screen control keys that permit scrolling of the screen forward and backward when permitting by system software.

Two level access security consisting of a unique terminal identification ("signature") automatically transmitted upon establishment of the asynchronous communications link and an ATM type PIN number entered by the user for system verification.

Onboard PIN and data encryption (DES or other standard) provided by ROM resident random number generation algorithm activated by a seed maintained in RAM and a real-time clock.

LED backlit instruction panel adjacent to and working in conjunction with the active LCD display controlled main system software.

Dual purpose terminal operating as a data entry and display device and alternatively, as a push button (tone/pulse) telephone communications set—including a common keypad used for tone generation for telephone communications and for data entry.

A dual isolated circuit keypad containing a double contact low cost switch to activate two unrelated circuits as input to the microprocessor and the telephone tone generator.

Data terminal that automatically transmits tone blocking signal to prevent intervention by call interrupt service.

The visual interface, flexibility and ability to recall information that permits the present invention to enjoy significant demand for automated billpaying without a telephone's limitations.

Look and feel of the software-user interface in coordination with a 4×24 LCD display and selection and control keys to provide rapid communications of financial transaction information to main computer system.

A terminal device that can act as a pass-through of analog voice signal to an externally attached on internally provided telephone or alternately transmit data (asynchronously).

A terminal device operating at low power levels permitting the trickle charge of internal storage batteries from a telephone line source.

A terminal device that can store numerical data and transmit from a memory buffer upon command from an internal microprocessor.

A terminal device employing a 96 (up to 120) character LCD displaying the amount of information capable of being contained in a single common 128 byte packet data network packet.

The terminal is able to transmit a periodic randomly generated code to the main system. The main system is able to verify that this numeric code is correct and assure that terminal communication link security is maintained.

The terminal is compact, 8 inches wide by 5.75 inches and 1.75 inches high with the telephone handset. The compact non-telephone model is 8 inches wide by 3.75 inches deep by 1.75 inches high. The compact model can easily slip into a pocket or briefcase, and is approximately 53 cubic inches and weighs less than one pound.

The compact portable terminal contains two RJ-11 jacks so that a telephone line can be connected to one and a telephone to the other thereby permitting use alternatively as a terminal or telephone.

A terminal with an internal data bus that will permit direct edge connect retrofitting of an alphabetic keyboard and/or card swipe device.

A system architecture connecting asynchronous, remotely located (home or office) dedicated purpose terminals (telephone and/or data) passing through asynchronous gateway onto a packet data network to a fault-tolerant computer which is in turn linked to a single bank or group of banks using the bank's ATM interchange network for the purpose of bill payment and funds transfer and balance inquiry and activity statement.

A system architecture connected to a network of electronic switches and/or payees.

Use of an online computer which processes customer bill payments and passes payee names and account information through the ATM interchange network to a user's bank for posting to his monthly statement;

A system architecture that permits immediate credit of funds to the service provider (upon debit authorization against the user's account, liability for payment of funds passes immediately to bank and interchange network).

A system architecture that permits a combination of information access (account balances, account transactions) plus settlements (posting, reconciliation and clearing of funds).

Extraction of bill payer and payee information for demographic and marketing analysis and retention in a database.

Maintaining such a database of billpaying information and extracting demographic information from this database for use in targeting advertisements or messages (the advertisements can be sent electronically to each home banking user each time he "signs on" his terminal and/or distributed in other ways such as mass mailings which do not violate user confidentiality).

Analysis of bill payer payment patterns for the purpose of directing online advertisements or messages targeted to differentiated groups of users.

A terminal screen which permits targeted advertising (or messages) without disclosing the user's name or other confidential information to the advertiser (until the user requests disclosure or permits it).

A terminal oriented system that permits an immediate customer response to targeted, displayed advertisements (or messages), whose responses are then transmitted online or in batch mode to the advertisement sponsor.

A methodology of debits and credits for transferring of funds between banks using online remote terminals communicated through the ATM interchange network.

A methodology for debit of bill payments using online, remote terminals communicated through the ATM interchange network.

A methodology for use of an ATM interchange network for payee credits on bills.

A remote terminal oriented system directed at the ATM user population for home, office or other remote location bill payment, funds transfer and account review.

Deposit oriented financing for a remote terminal based system for bill payment, funds transfer and account review; and A cash incentive program for bills paid through a remote terminal based system for bill payment, funds transfer and account review.

The present invention extends the convenience of popular automated teller machine (ATM) type service to user (alternatively referred to as customers or consumers) homes, offices and other locations. The present invention provides a highly efficient payments system that offers consumers the following advantages and features:

a low cost (possibly free), easy-to-use ATM-like communication terminal which is portable and simply connects to a telephone;

an incentive for every bill payment made through the terminal;

additional savings from postage, check printing, envelopes, and other costs for each payment made through the terminal;

convenience, privacy and estimated time savings of 75% from the drudgery of billpaying.

The added benefit of electronic funds transfer, banks and others gain as much as 40% processing cost savings and a new vehicle for remote distribution of services.

To attract volume, the service provider may price services to allow users to save money. The present invention provides the possibility of broad market distribution by providing users with a low cost (possibly free), familiar ATM-like terminal. In addition to being provided with a low cost or free terminal, users may save $0.30 in postage, check and others costs for each payment made electronically via the system. This totals to $7.30 per month savings for the average ATM household writing 26 checks a month. A service provider may therefore charge up to $7.80 per month and still permit the user to save money.

More important than cost savings, however, is the vast amount of time the invention saves its users. Unlike PC's, telephones and prior terminals, the design of the present invention enables the users to intuitively master the terminal without relying on written instructions. Furthermore, the operations and coordination of system components in the form of modems, communications protocols, new security codes, and operating software is obviated. The present invention relieves a common financial headache—the time-intensive drudgery of billpaying. The system provided by the present invention is a quick, extremely easy-to-use alternative to conventional payments. Initial testing indicates that users can pay bills in 25% of the time needed to pay bills conventionally. Users may preferably receive a unified monthly statement (from their bank) which consolidates and lists terminal-based transactions with conventional banking transactions (e.g., checks, ATM cash withdrawals, deposits, etc.).

Early home banking efforts discovered that users liked using the systems to pay bills. They had only limited interest in other bank and videotext services, so the present invention has reduced its delivery costs by specializing in billpaying. While the present invention provides billpaying services, customers may also use the system to better manage their money. More sophisticated active users may better manage their money by, for example, checking their account balances, viewing payment records, transferring funds between accounts, future dating of bills and funds transfers, and requesting other bank services. Future dating of bills minimizes users float, and users may future date funds transfer to maximize interest bearing balances. Transferring funds between banks is possible with immediate debit or credit within one day (depending upon the ATM network clearing procedures). The present invention thus provides a terminal designed to accommodate additional financial services in the event that users or banks demand (and are willing to pay for) more services. These may include comparative mortgage and CD quotes, tax deduction summaries, loan applications, electronic billing, third party billing, family budgeting tools, tax planning, and insurance services. Limited alphabet-based services (e.g. telephone directory) are also feasible with the terminal of the preferred embodiment and the terminal has the facility to add on an alphabetic keyboard.

By displacing paper checks and employing payee information for marketing purposes, the present invention offers significant benefits to the major participants in the payments system:

Banks (and other financial institutions) avoid the cost of processing and returning checks and funds transfers. Fully absorbed processing costs range from $0.50 to $1.00 per check (marginal costs vary with volume). The present invention can save banks a substantial amount per paper check displaced.

Payees (such as utilities, mortgagors, etc.) avoid paper processing costs and improve cash flow. Typical remittances take 5-8 days to arrive by mail and cost from $0.15 to $0.75 per payment. The present invention can provide a small charge to payees for each electronic payment and deliver payments in 2-3 days. This saves payees money per payment and compares favorably in cost to bank lockbox services.

Marketers (such as retailers and banks) can better advertise (or message) through the terminal. By analyzing users' payments, the present invention can target advertising or messages to users for 5-7 seconds after they SIGNON. Users may then respond if they want more information. Targeted (but low readership) direct mail costs advertisers $0.45-$1.00 per piece. Pricing for confirmed leads starts at $5 and increases with the products value. This aspect of the present invention will offer advertisers significant benefits in terms of flexibility and cost savings. The terminal's screen for advertisements permits the service provider to target advertisements to groups of users without disclosing the user's name (and confidential payment data) until the user so indicates his permission (by requesting more information from the advertiser).

Payments processors earn interest on user payment float. The present invention debits a user's bank account on the date of payment. The payment is processed immediately, but interest is earned on the funds (float) until cleared. When the system of the present invention cannot pay electronically, it earns interest on float for 5-8 days. A service provider will prefer to process payments by low-cost electronic means, however, providing better money management services for customers.

A major obstacle in building any volume-oriented business is the upfront investment required to reach a critical mass of customers. The present invention minimizes this investment by capitalizing on existing systems and customer bases. The present invention piggybacks on the evolving ATM and regional telephone company communications networks.

Most ATM networks are bank-owned cooperatives and have excess capacity. These networks are likely to welcome the additional business provided by a system in accordance with the present invention. By working with ATM networks, the system provided by present invention becomes a utility for banks—not a threat to banks. For example, once admitted on to the system, users can be welcomed in the name of their bank. Users also receive a single account statement from their bank, unifying terminal-based activity with conventional banking transactions and check payments. Back-office check processing and funds transfer economies can also be priced to provide costs savings to banks. Participating banks can be encouraged to advertise over the system provided by the present invention system at sharply reduced rates while back-office savings from reduced paper check volume develops. The advertising medium provided by the present invention offers banks an extremely powerful "cross-selling" tool (a critical key to success in retail banking which involves increasing profitability by increasing the number of services sold to a single customer).

The present invention thus provides a highly advantageous system which offers an attractive proposition to a variety of participants in the payments system. Users of the invention save time and money and can pay their bills and obtain other banking services wherever there is a telephone jack. Banks save back-office expense and an efficient means to service their customs. Bank owned ATM networks generate volume and earn fees. Payees improve cash float and save on costly processing of paper checks. Advertisers gain a powerful, lost-cost marketing tool.

BRIEF DESCRIPTION OF THE DRAWINGS

These and other features and advantages will become better understood by studying the following detailed description of presently preferred exemplary embodiments in conjunction with the attached APPENDIX (which is incorporated by reference herein) and the sheets of drawings, of which.

DETAILED DESCRIPTION OF THE PREFERRED EMBODIMENT

Figure 1:
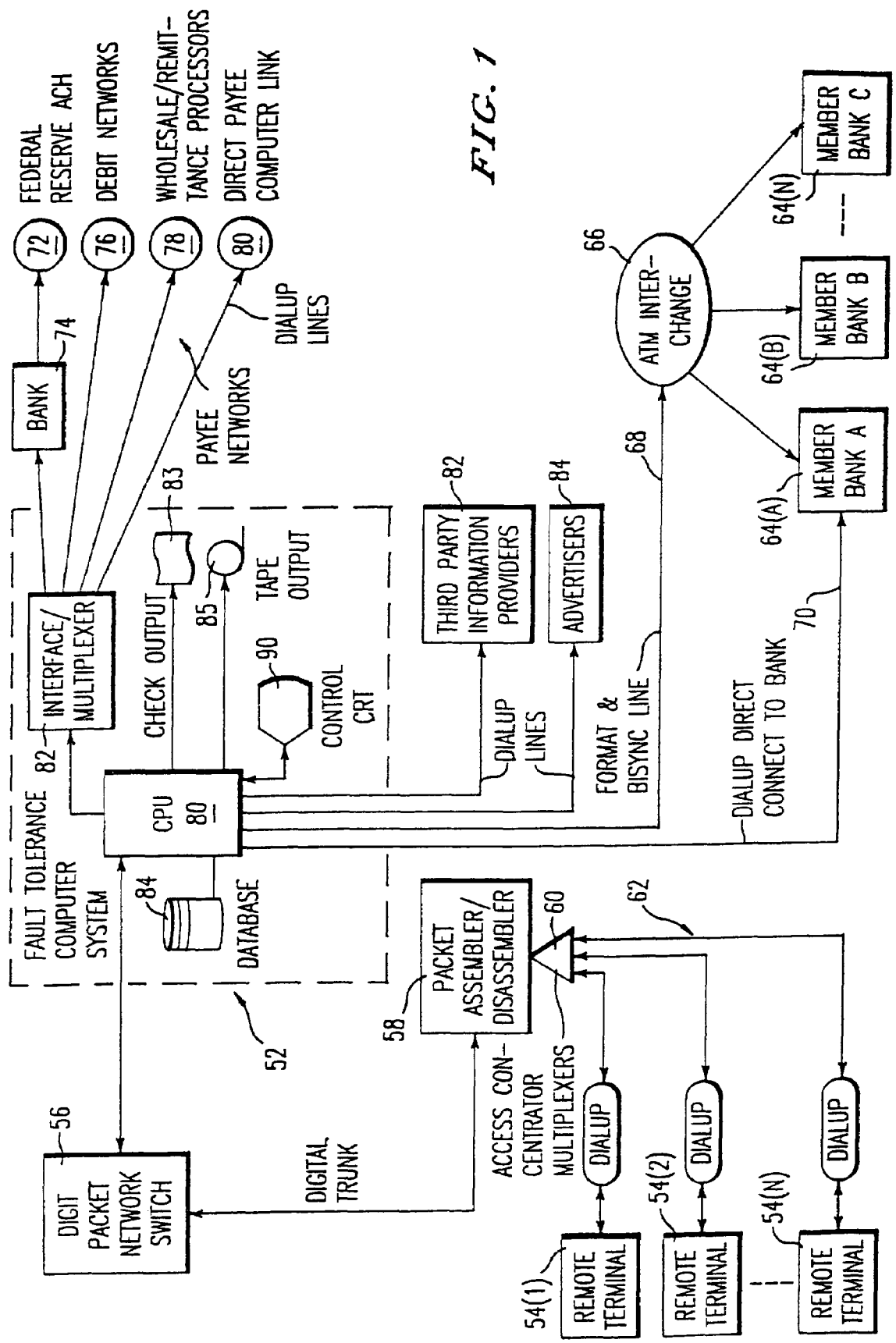
FIG. 1 is a block diagram of a presently preferred exemplary embodiment of a financial services distribution system in accordance with the present invention.

FIG. 1 is a schematic block diagram of a presently preferred exemplary embodiment of a financial services distribution system 50 in accordance with the present invention. System 50 includes a fault-tolerant central computer system 52 (hereafter referred to as "central computer"), a plurality of remote terminals 54, a digital packet network (e.g., "public data network") switch 56 ("PDN switch"), packet assembler/disassembler 58 and associated asynchronous communications interface 60, and a dialup telephone network 62 selectively connecting remote terminal 54 to the communications interface.

Data is communicated between remote terminal 54 and central computer 52 through the PDN switch 56, the packet assembler/disassembler 58, the communications interface 60, and dialup telephone lines 62.

In the preferred embodiment, PDN switch 56, packet assembler/disassembler 58, asynchronous communications interface 60 and dialup telephone network 62 are entirely conventional and are preferably operated and maintained by a local or regional telephone company. Switch 56 may comprise, for example, a conventional public data network of the type which communicates packets in CCITT X.25 protocol between central computer 52 and packet assembler/disassembler 58. Similarly, packet assembler/disassembler 58 and asynchronous communications interface 60 may comprise conventional telephone company operated subsystems which convert the X.25 packet protocol existing on the PDN network into conventional asynchronous data format (e.g., with seven or eight data bits, a start bit, a stop bit and conventional error checking fields).

Asynchronous communications interface 60 initiates and answers dialup telephone communications with remote terminals 54. Thus, remote terminals 54 interface with the remainder of system 50 using standard asynchronous protocol, central computer 52 interfaces with the remote terminals using standard X.25 protocol, and conversions between the two protocols (as well as distribution of the signals generated by the central computer to specific remote terminals) is handled by the conventional PDN switch 56, packet assembler/disassembler 58 and communications interface 60 provided by the telephone company in the preferred embodiment.

Central computer 52 also interfaces with banking institutions and with other financial institutions 64 through the existing conventional automatic teller machine (ATM) interchange switch 66 (referred to herein as the "ATM network"). The ATM network is capable of communicating ATM transaction messages as well as point-of-sale (POS) messages in a conventional manner using standard message formats. As explained above, ATM switches 66 communicate data in a specific, conventional interchange format between member banks or between automatic teller machines (ATMs) and member banks 64. In the preferred embodiment, central computer 52 is connected to ATM switch 66 (e.g., via one or more bisynchronous 9600 baud communications lines) and communicates digital signals to ATM switch using standard bisynchronous (e.g., point-to-point, SNA, etc.) communications protocol. Thus, in the preferred embodiment, central computer 52 "looks like" an ATM or POS node connected to the ATM network and associated switch. Central computer 52 may generate account inquiry commands, commands to debit and credit accounts, and the like—just as would a bank's computer serving its ATMs or as would a stand-alone ATM or POS terminal. The ATM interchange switch 66 processes such ATM commands generated by central computer 52 in the same way that they process commands generated by ATMs. Although the ATM interchange is ATM oriented, it is able to serve other terminal devices. For example, the ATM interchange communicates with retail POS terminals which can directly debit and credit a customer's bank account in payment for purchases.

It is also possible to provide direct dialup lines for communicating data between member banks 64 and central computer 52 (e.g., using standard communications protocols agreed upon by the bank's data processing system and by central computer 52). Use of the ATM switch 66 and associated network to carry ATM/POS commands generated by central computer 52 avoids the need to provide any software modifications or other overheads within the member banks' data processing systems. Furthermore, use of the ATM switch 66 permits use of the network funds clearing process.

Central computer 52 also electronically communicates with additional remote data processing systems such as the Federal Reserve ACH 72 (e.g., via a Federal Reserve Bank data processing system 74), debit networks 76, wholesalers/remittance processors 78, direct payee computer systems 80, third party information providers 82 and advertisers 84. Such additional communications may be over dialup telephone lines if desired—or other special communications arrangements/protocols (e.g., magnetic tape transfer or the like) may be used depending upon particular applications. The link between central computer 52 and the Federal Reserve ACH 72 permits payee commands to be electronically transferred to other banks using the existing Federal Reserve electronic funds transfer system. The link with wholesalers and remittance processors 78 permits the payment of bills to a remittance center who in turn pays payees. The direct computer payee link 80 allows central computer 52 to contact individual desired payee computer systems and directly effect download of payment related data (e.g., pursuant to a daily "clearing" process). The link to advertisers 84 may be used to transfer advertiser copy between the advertiser and the central computer system and to pass back to the advertiser the names of those customers who request information in response to advertisements.

Figure 1A:
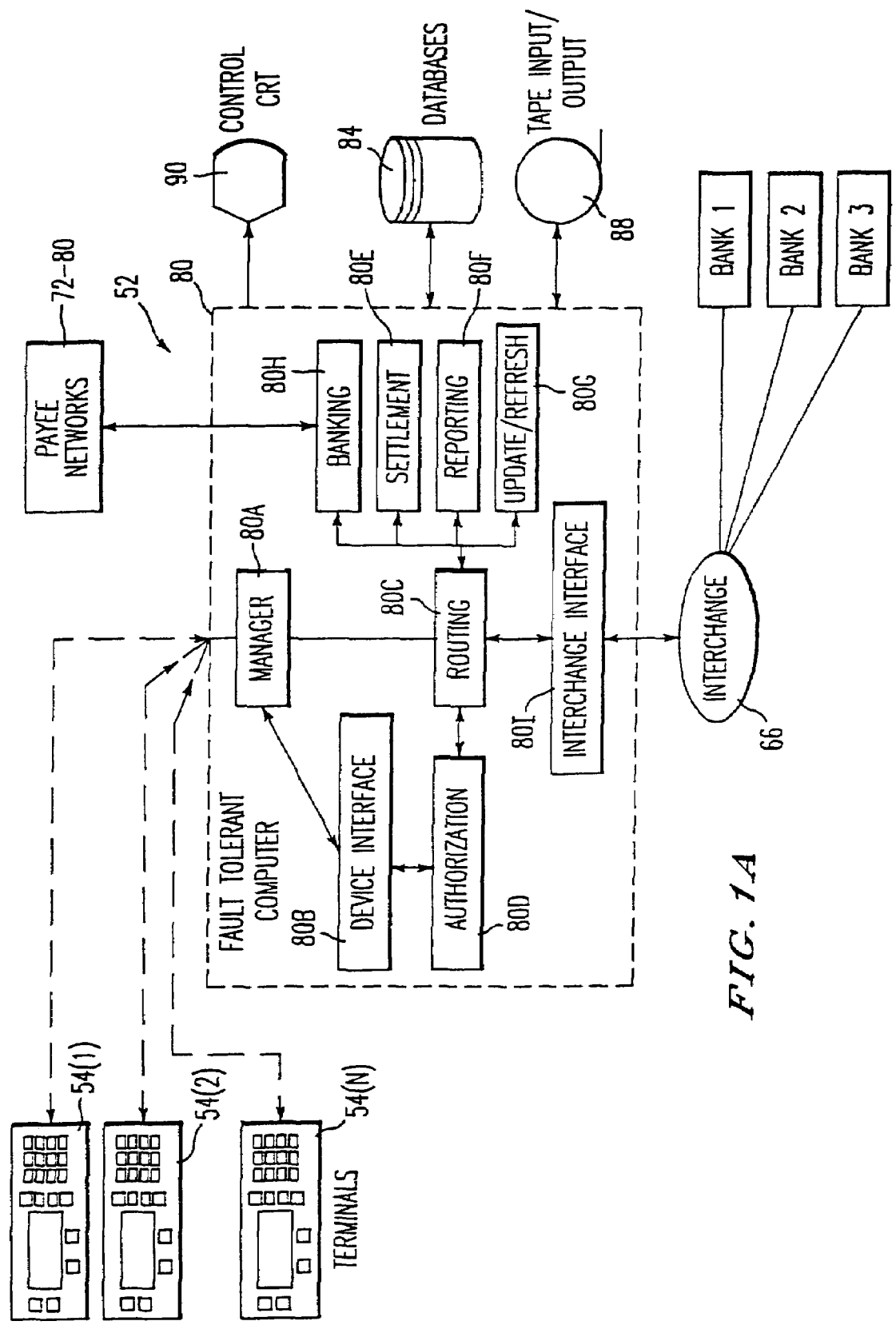
FIG. 1A is a detailed schematic block diagram of the FIG. 1 CPU.

FIG. 1A is a schematic block diagram showing central computer 52 in somewhat more detail and also schematically depicting exemplary software modules used by the central computer to perform financial transaction functions. Central processor 52 in the preferred embodiment is a fault-tolerant mainframe computer of conventional design including, for example, multiple redundant processors, a dual interprocessor interbus, a dual-ported controller, and multiple redundant power supplies to ensure against data loss. Through use of this conventional fault-tolerant architecture, the failure of one processor or component does not stop processing but rather merely decreases system throughput. Additional peripheral equipment (e.g., tape drive 88, check printer 86, conventional mass storage device 84, and conventional communications interface/multiplexer 82) facilitate communications and bill-paying transactions.

Central computer 52 is programmed (i.e., with software modules stored on mass storage device 84) to perform various billpaying and other financial functions and to distribute bill-paying and other services to remote terminals 54 on demand. In the preferred embodiment, the software modules executed by CPU 80 are in large part entirely conventional (within new linkages between them) and perform, among other operations, conventional banking, ATM network communications network interfacing, database maintenance, etc. However, certain new software controlled functions (e.g., the terminal handling and associated functions, and the interfaces between the terminal handling and other, conventional software controlled functions) have been provided in the preferred embodiment to provide home banking and billpaying functions not previously available.

As mentioned above, many or most of the software-controlled operations performed by CPU 80 in the preferred embodiment are conventional and well-known in the banking industry. For example, it is conventional and well known to communicate standard ATM and POS messages between central computer and an ATM network using conventional off-the shelf ATM and POS software, and central computer 52 in the preferred embodiment utilizes such conventional software to generate and communicate appropriate messages over the ATM network 66. Conventional banking software packages exist which perform a variety of exceeding complex but entirely conventional functions (e.g., maintaining audit trails to ensure transaction reliability, maintaining user account and vender files, provide clearing information at night, etc.) and the preferred embodiment central computer 52 executes such conventional banking software modules to perform such standard functions. Conventional database handling functions are also typically integrated into banking and POS software modules to maintain customer information.

The following is a brief description of exemplary general functions performed by the various software control modules provided within CPU 80 shown in FIG. 1A.

The manager 80A schedules and coordinates the flow of transactions through the various system modules. As flow control it sends the transactions to the appropriate modules for processing and control of interactions with the external environment.

The device (terminal) interface 80B enables the system to communicate with user terminals and the system CRTs. The device interface 80B formats terminal-bound messages for transmission to the terminals 54. In addition, the device interface 80B is responsible for error processing, starting and stopping transaction response timers, updating any fields which are maintained in the user terminal, decrypting and logging of transactions. A detailed description of the terminal interface 80B will be provided shortly.

The routing module 80C permits efficient routing of transactions to the appropriate module for servicing.

The authorization module 80D is the means by which the system determines the customer identity (through the PIN and other values transmitted by the terminal). User account number and PIN values are transmitted to the user's bank (over the ATM network 66 in the preferred embodiment) for verification. When the authorization module 80D receives verification from the bank the user is cleared for transactions.

The settlement module 80E (part of a conventional banking or POS software system) is responsible for closing the current processing day and starting the next. The settlement module 80E provides for flexible cutover times for the network and payee institutions. In addition, this module updates databases files and initiates daily reports by the reporting module.

Reporting involves the calculation and reporting of debits and credits and adjustments for the transactions performed on a daily and periodic basis. In addition, system and network activity, reconciliation, interchange settlement and disputed transaction reports are generated. The reporting module 80F in the preferred embodiment is conventional and operates in conjunction with a conventional database query program which permits analysis and specialized report generation concerning customer transaction profiles.

The update/refresh module 80G updates databases files following batch processing for a day in a conventional manner. Backup files are generated by this module. A sub-module also permits extracts of database files to be generated and output to tape 88 or disk.

The banking module 80H is conventional and permits customers to pay bills without writing and mailing checks, obtain account balances and conduct funds transfer between accounts. For bill payment the customer's account is debited for the amount of the payment, the payment medium is created (check, ACH tapes, internal transfers) and exception items are segregated for review. The module 80H maintains customer database files, vendor files and transaction files. The banking module 80H provides facilities for marketing information analysis, accounting/audit trails, and customer service reports.

The interchange interface module 80I in the preferred embodiment enables the fault-tolerant computer system 52 to interface with the interchange network in a conventional manner. This module 80I converts internal system transaction information to a format that is compatible with that of the network. In addition, a log is conventionally maintained of all transaction communicated between the system and the network.

An important feature of the present invention is the use of a conventional ATM network and associated standard ATM and POS message format to facilitate financial transactions not typically supported by the ATM network. As mentioned above, conventional ATM networks typically connect bank mainframe computers and POS (point-of-sale) concentrator computers together.

For example, a user having a bank account in bank A (the "on us" bank) connected to the Internet ATM network may use the ATM machine of bank B (a "foreign" bank) to withdraw from his bank A account. The mainframe computer of bank B generates, in response to the user's request via the ATM message specifying the user's PIN (personal identification number), the user's account number, the user's bank and the amount to be withdrawn. This ATM withdrawal message is then sent over the ATM network and is received by the computer of bank A. Bank A checks the message for validity (i.e., to make sure the PIN is correct), determines whether the user has a sufficient account balance to honor the withdrawal request (the message processing thus provide an automatic account balance check), and then processes the request by posting a debit memo against the user's bank account (the bank A computer does not actually withdraw funds from the user's account at this time, but will process the memo during the posting and settlement process later that day). The bank A computer then sends a confirmation message back over the ATM network to the bank B computer confirming that the user's account has been debited and that at clearing time bank A will pay the funds to bank B. Based on receipt of the confirmation message over the ATM network, the bank B computer controls the bank B ATM machine to dispense the requested funds to the ATM user.

An ATM "account inquiry" message also exists to permit the user to determine the balance of his bank account(s). Similarly, an ATM "account transfer" message allows a user to transfer funds from one account to another in the same bank (but typically does not permit the user to transfer funds between banks).

Similarly, a chain of retail stores may permit processing of so-called "debit cards" (like credit cards, but rather than credit being extended by a lending institution to cover purchases, a debit card results in an immediate electronic debit of the user's bank account). A customer provides the retailer with his debit card which the retailer magnetically reads (e.g., using a "swipe" type magnetic card reader). The customer is then asked by the retailer to secretly key in his PIN into a keyboard, and the retailer keys in the amount of the purchase. A POS debit request digital message is then transmitted either directly over an ATM network (or indirectly via a dialup or dedicated telephone line and a central concentrator computer) for receipt by the user's bank. The POS debit request digital message typically contains the user's bank designation and bank account designation; the user's PIN (which is typically encrypted); the name or other designation of the retailer; and the amount of the purchase. The user's bank computer receives the POS debit request message from the ATM network, processes it for validity (i.e., valid PIN, valid account), ensures the user's account balance is in excess of the debit request, and then debits the user's account (i.e., by posting a debit memo) and credits the retailer's account electronically (this typically requires the retailer to have worked out an arrangement with the particular user's bank beforehand). The bank transmits a confirmation message to the POS terminal over the ATM network which, when received, assures the retailer that the funds are available and have been transferred to his account.

POS credits are also possible using standard ATM network messages. If a customer returns merchandise to a retailer that was paid for using a POS debit, the retailer may initiate a POS credit transaction (essentially the same as the POS debit except that funds are credited to rather than debited from the user's bank account).

Technically, some ATM networks handle POS debit messages and ATM withdrawal messages differently in that the ATM withdrawal message is not finalized until the end of day settlement process (that is, debits are held in a pending status during a business day until final reconciliation, settlement, and clearing and creating of funds occurs after the close of a business day). POS debit messages on the other hand result in immediate settlement in real-time (i.e., the payees account is created immediately and liability shifts to the bank/ATM network to clear/collect funds at a later time). For purposes of the arrangements disclosed herein, both types of processes are referred to as "real-time" transactions since the resulting confirmation message over the ATM is in effect a real-time electronic guarantee that the bank and/or the ATM network will pay. In addition, "POS" and "ATM" type messages are sometimes referred to herein generically as an "ATM network transaction message", and such term is defined to encompass both types of messages. Some ATM networks are not capable of handling POS type messages, but rather process only the standard ATM messages.

The preferred embodiment of the present invention uses the types of standard messages described above to facilitate electronic billpaying and other financial transactions. For example, a funds transfer from an account in bank A to an account in bank B may be accomplished by generating a POS debit message directed to the bank A account and a POS credit message directed to the bank B account and by then applying both of these messages to the ATM network. The service provider may pay bills by first determining the total amount of all of the bills to be paid at present, generating a POS debit message for application to the ATM network (so as to debit the user's account by that amount and credit the service provider's holding account by the same amount), and then disbursing the funds (electronically or by paper) based on receipt of the ATM confirmation message. Account inquiry may be handled as a standard balance inquiry ATM or POS message or possibly as a "null" POS debit message. One advantage of using POS debits/credits over ATM style messages is that the POS messages are longer and systems software is designed to provide sufficient space in the message to transmit the name of the retailer and other Federal Reserve Regulation E information. The user's bank thereby takes a POS debit (with accompanying payee information) and merges with the user's account file. User thereby receive their usual bank statement that unifies conventional banking activity with their home banking activity. The home banking service provided need not send users an additional statement. The same result can be accomplished with a non-POS ATM message with a payee identifier code located at the ATM switch or the user's bank.

Figure 2:
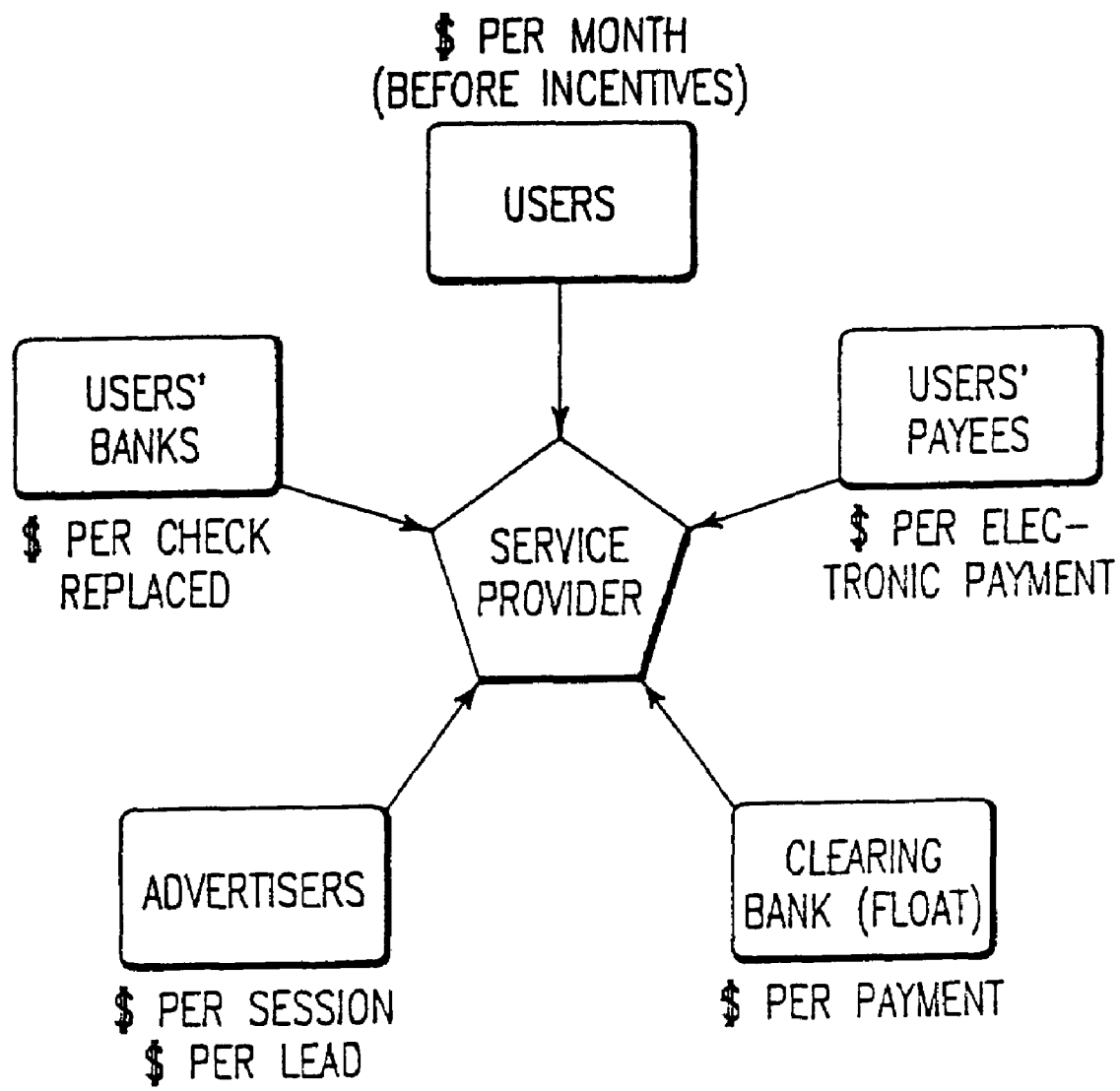
FIG. 2 is a block diagram of revenue sources provided to the operator of the FIG. 1 system.

Typically, an independent service provider may operate central computer 52 and distribute terminals 54 as part of an ongoing business independent from the banking business. FIG. 2 is a schematic block diagram of the sources of revenue provided to the service provider operating system 50. In order to make the operation of system 50 economically feasible, the operator of the system must be able to recover equipment and development costs and also make an additional profit. FIG. 2 shows some of the sources of revenues to the service provider operating system 50. First, users of remote terminals 54 may pay a relatively nominal charge (e.g., $4.00-$6.00 per month) for the capability of paying bills electronically from their home. Users may also be asked to pay a deposit charge for the terminal which may then be used by the service provider for finance system expansion. The users' banks also are willing to pay a charge for each check or funds transfer they do not have to process. As is well known, a relatively high charge is associated with processing each check (or funds transfer), and reduction in the number of debits/credits processed constitutes a substantial savings to banks. The user's payees similarly may pay a nominal charge for electronic payments and consolidated payments due to the costs saved because funds are received quicker and processed for less. The service provider will also earn some interest on its float for paper-based payments (i.e., funds debited immediately from users' accounts upon request for payment but not yet payed to the intended payee). Finally, system 50 may be used to distribute advertisements/messages to users via the remote terminals 54—and advertisers can be charged for each advertisement actually distributed. Furthermore, advertisers probably are willing to pay additional for the identity of those customers that request information in response to advertising. The present invention thus fills a marketing niche by providing services to banks, users, payees and advertisers simultaneously—and can generate revenue by charging each of these entities an appropriate fee the value of the services provided (while also in certain cases earning interest on the float on the funds used to pay bills). In addition to hardware, software and training limitations, conventional home banking systems have high cost structures. These costs may be passed along to users—further inhibiting their demand. The invention permits low-cost delivery and a variety of revenue sources beyond the user. User fees can be kept low—increasing demand.

Figure 3:
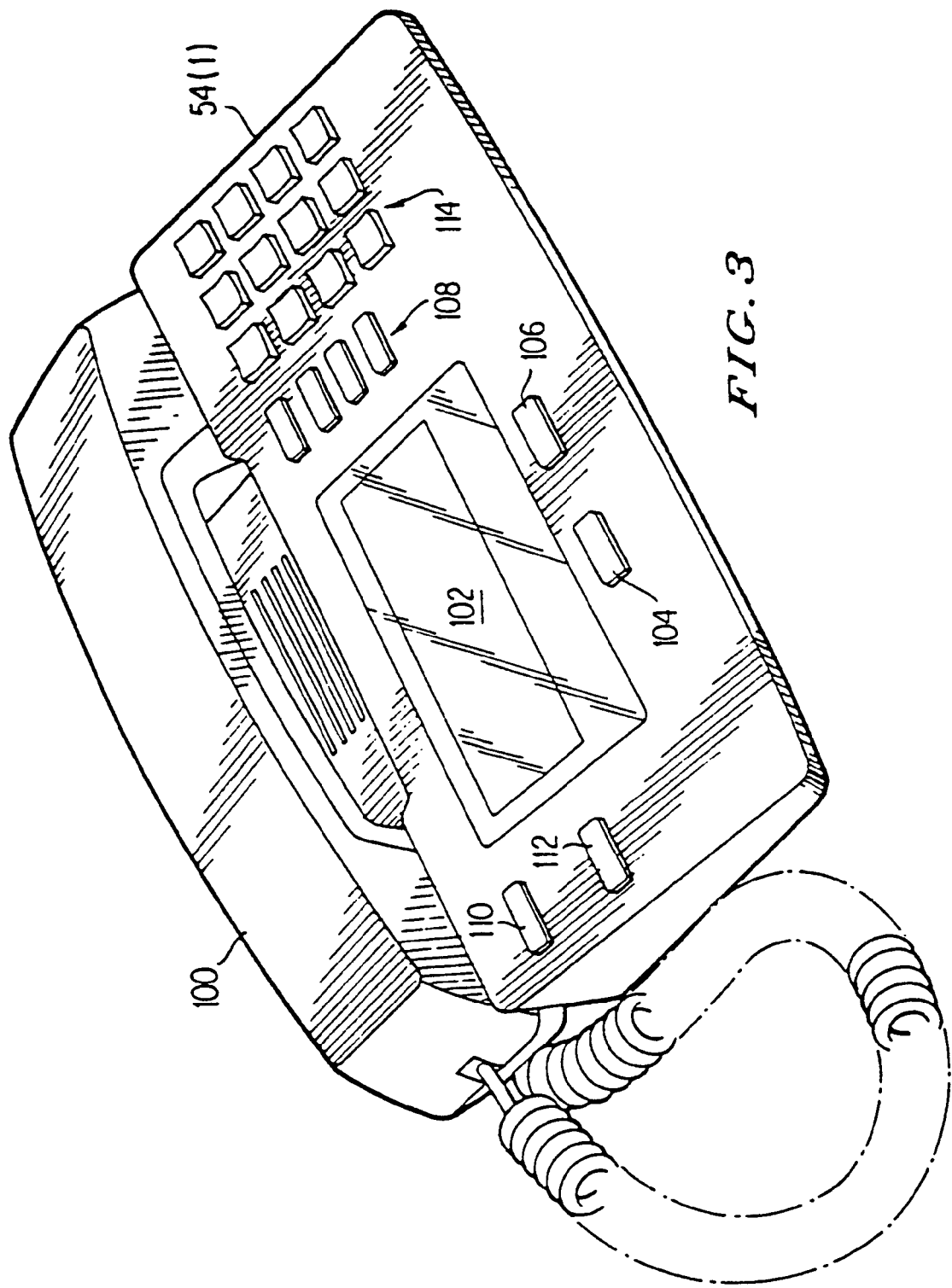
FIGS. 3 and 4 are elevated respective views of alternate embodiments of a presently preferred exemplary remote terminal in accordance with the present invention.
Figure 4:
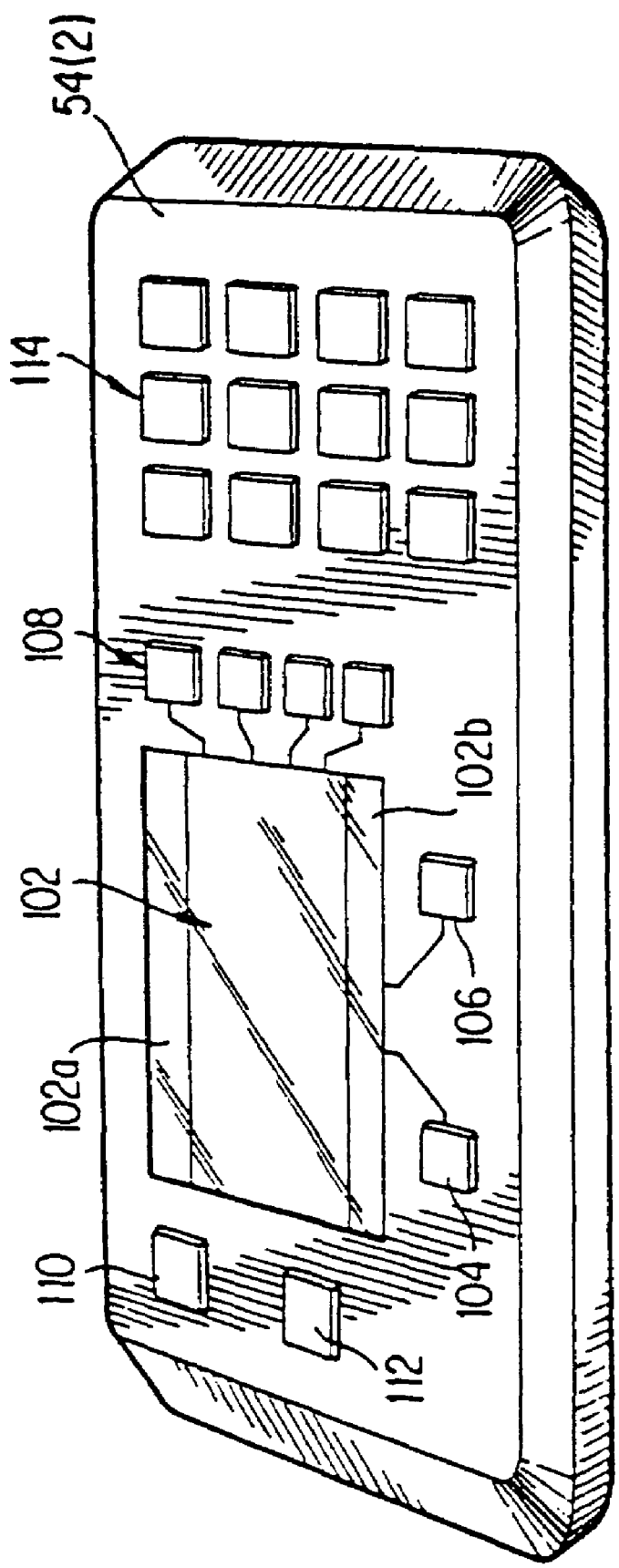

FIGS. 3 and 4 are elevated respective views of alternate embodiments of remote terminals 54 as shown in FIG. 1. As can be seen from FIGS. 3 and 4, in the preferred embodiment, the terminals 54 are available in two different types: a model which contains data entry and voice telephone capability (including a telephone handset 100 and associated telephone electronics); and a smaller, pocket-size version (shown in FIG. 4) that contains no telephone voice capability. In the preferred embodiment, the two models each include a telephone connector, but the connector configurations are slightly different between the two models. In the FIG. 3 version, an RJ-11 connector and associated wire is used to connect the terminal 54 to a telephone wall outlet. The FIG. 4 version includes two RJ-11 connectors, one connected the terminal to the wall outlet and the other RJ-11 permits "in-line" connection (if the user desires) to an exiting telephone device. In the preferred embodiment, the FIG. 3 and FIG. 4 terminals operate essentially identically and have similar or identical internal structures—and therefore, the following discussion applies equally to both terminal embodiments (except where indicated to the contrary).

In the preferred embodiment, terminal 54 is an asynchronous, portable data processing device operating over unsecured dialup non-dedicated telephone lines. Terminal 54 includes an LCD display 102, screen control keys (including a PRIOR key 104 and a NEXT key 106), an array of selection controls 108, a HELP key 110, a CANCEL key 112, and a standard alpha-numeric keypad 114. A power-ON switch (not shown) may also be provided if desired.

In the preferred embodiment, LCD display 102 comprises a standard 4-line by 24-character alpha-numeric liquid crystal matrix-type display device. Thus, in the preferred embodiment, four lines of text of 24 characters each may be displayed simultaneously. Select control array 108 in the preferred embodiment includes four momentary ON keys—each of which "points" to a different line of text currently displayed by display 102. Menu or option selections may thus be effected by displaying the different options on different lines of display 102 and permitting the user to select between the options by depressing the appropriate selection key within array 108 which points to the desired option.

An important feature of the present invention is the use of a multi-line alpha-numeric display of optimal site to allow a single standard sized data transmission packet (e.g., 128 bytes long) to completely define the content of the display. In the preferred embodiment display 102 displays only 4×24=96 characters—a sufficiently small (and optimal) number of characters to allow all of the characters to be specified within a single 128-byte packet carried by typical PDNs. (The preferred embodiment represents display characters in standard ASCII format so that each character is represented by a byte of data.) This not only minimizes communications costs, but also eliminates the need for a "packet assembler" or associated expensive buffer memory to be incorporated within terminal 54. In the preferred embodiment, terminal 54 is really "dumb" and need not provide any sophisticated processing of received display data but rather may simply display the data exactly as received—and central computer 52 may thus completely define the display state of terminal 54 each time it sends any data to the terminal. This feature provides additional flexibility in terms of display formats (since the central computer 52 completely determines and specifies each and every display format displayed by terminal 54) while keeping the costs of terminal 54 down and nevertheless providing sufficient information for a user-friendly interface.

In the preferred embodiment, the alphabetic letters Q and Z are found on the "1" key of keypad 114—thus providing a full alphabetic character selection when needed similar to an ATM). Keypad 114 may be a standard, conventional keypad or it may preferably be of a special design to be described in connection with FIGS. 6A-6C (for the FIG. 3 embodiment).

In the preferred embodiment, the significance of depressing the PRIOR and NEXT keys 104, 106 depends upon context (i.e., "where the user is" in the software interface at the time he depresses the key). For example, PRIOR key 104 may in some cases select the screen display which was displayed just prior to the display of the current screen display—and the NEXT key 106 may select display of the next screen display of sequence of predetermined screen displays (assuming there is a "next" screen to be displayed). In other contexts, depressing the NEXT key 106 may serve to confirm a transaction should be performed. In still other contexts, the PRIOR and NEXT keys 104, 106 act as scroll control keys (e.g., to permit the user to scroll through a list too long to be displayed all at once on four-line display 102). Controls 104, 106 may thus be termed user interface navigation keys since they generally allow the user to "navigate" through the user interface comprising one or more sequences of screen displays.

Figure 3A:
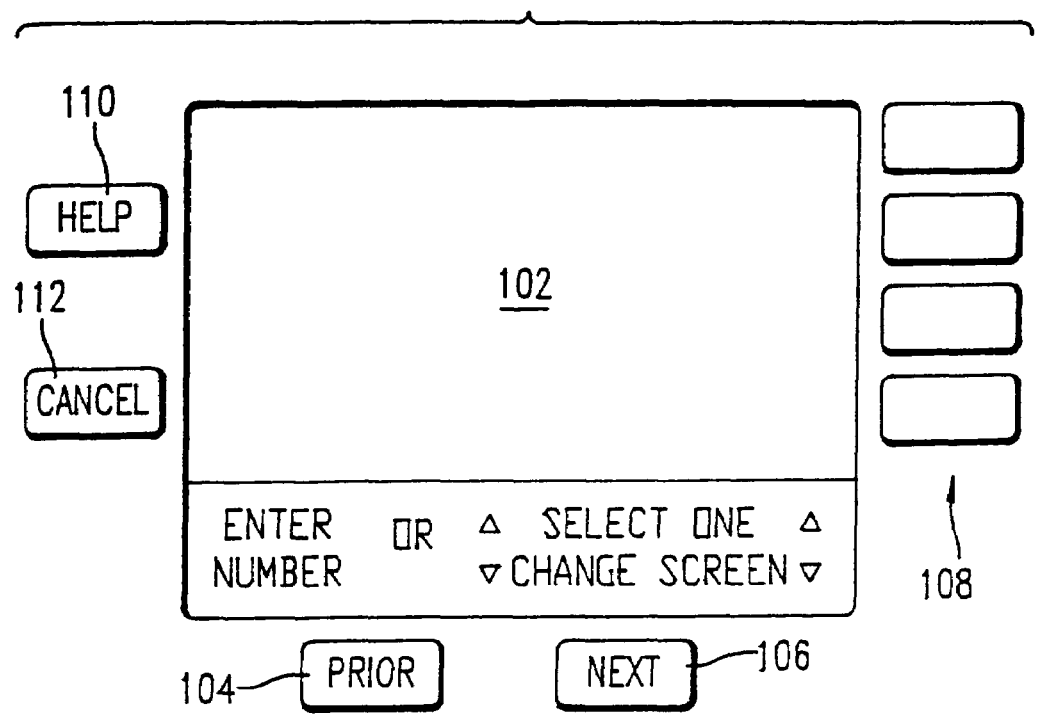
FIGS. 3A-3E schematically depict different prompt combinations provided by the FIG. 3 terminals.

Terminal 54 also includes light-prompt fields 102A-102D not shown in FIGS. 3 and 4 but shown in detail in FIGS. 3A-3E. In the preferred embodiment, these prompt fields are independently illuminated by light emitting diodes controlled by central computer 52, and provide the following four different legends: "Enter Number"; "Select One"; "Change Screen"; and "or" arranged as shown in FIG. 3A. In many instances, all four lines of display 102 will be displaying information but the user needs to be prompted as to what inputs he should next provide (e.g., numerical or alpha-numeric information; or selection from one of different display options). Rather than providing an additional line of relatively costly LCD display 102 to provide this prompt text form, the preferred embodiment includes "light-up" prompt indicators 102a-102d in the form of windows backlit by light-emitting diodes which may be illuminated to provide the desired prompt (or combination of prompts).

There are four different combinations of lighted prompts commonly used in the preferred embodiment: "Enter Number" alone (see FIG. 3B); "Select One" alone (see FIG. 3C); "Change Screen" alone (see FIG. 3D); and "Select One", "or" and "Change Screen" all being illuminated simultaneously (see FIG. 3E).

Figure 3B:
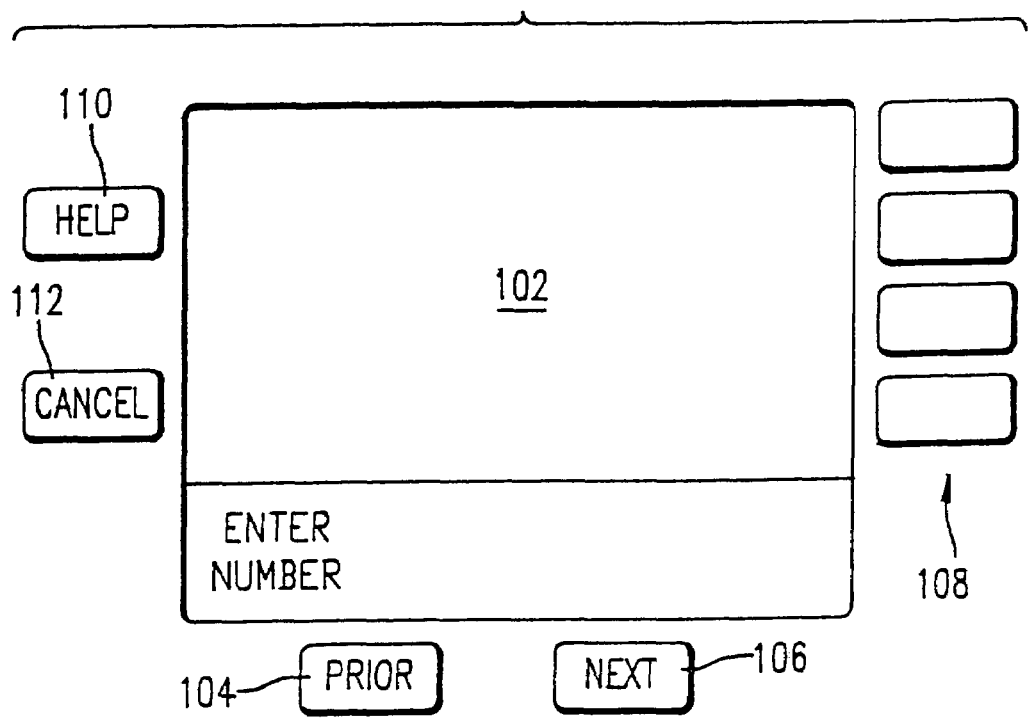

Illumination of the "Enter Number" prompts as shown in FIG. 3B would occur, for example, when central computer 52 request a numerical value from the user to be entered via keypad 114. This value might be a number (e.g., the user's PIN, or a dollar amount or a date which a scheduled payment is to be made). The numerical entry sequence is generally completed by entering a confirmation key (e.g., the lower-most of the "pointer" keys 108 or the NEXT key 106).

Figure 3C:
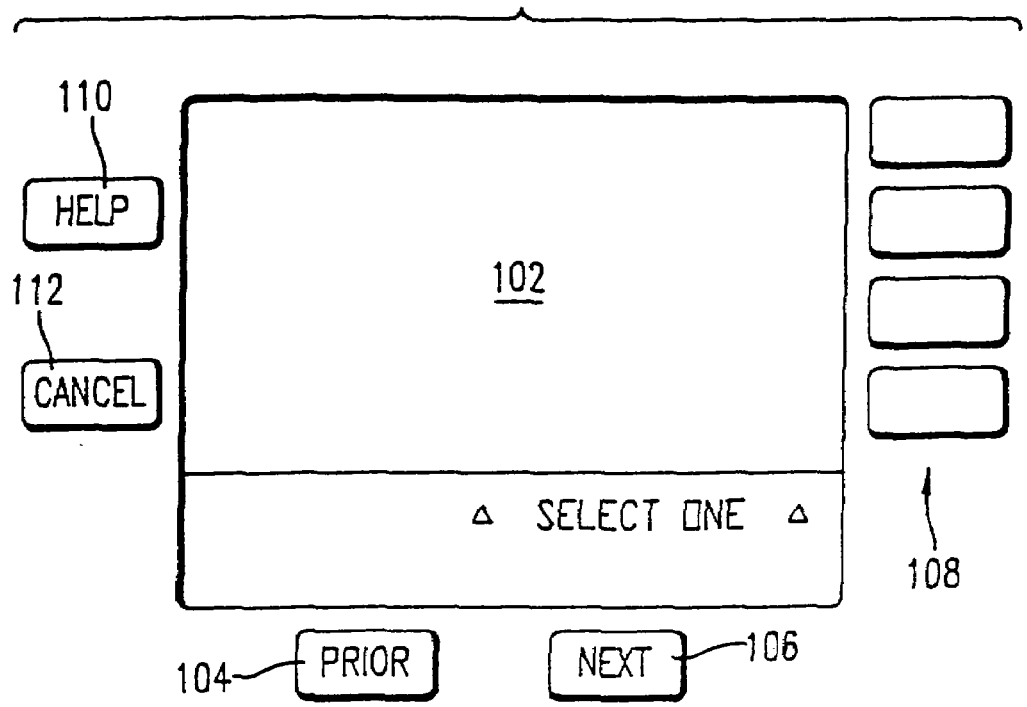
Figure 3D:
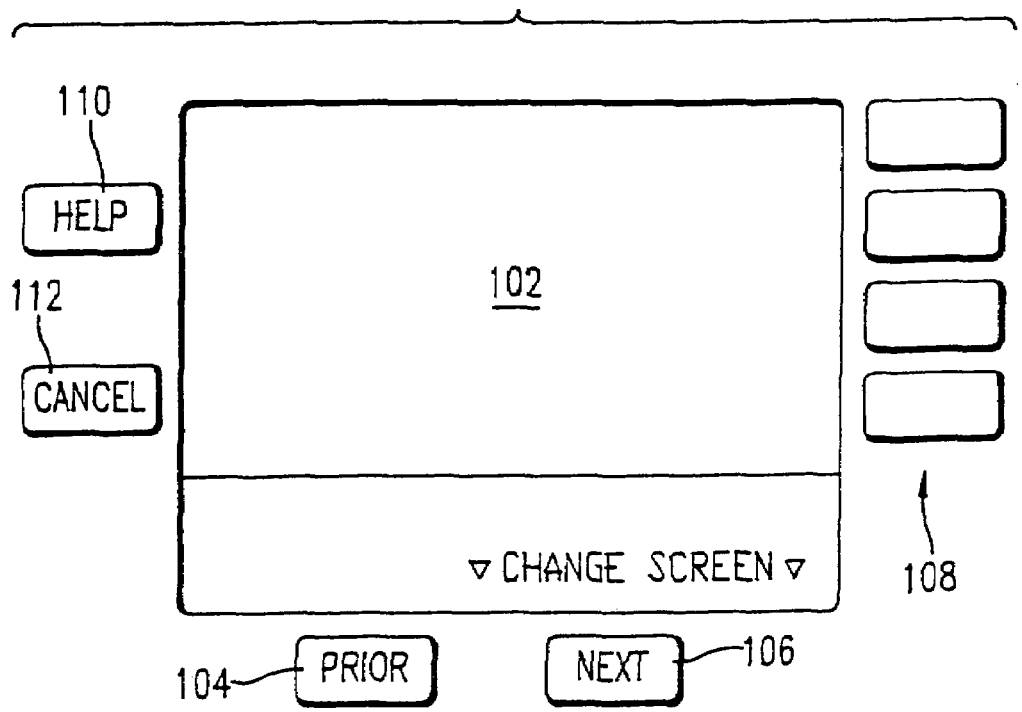

Central computer 52 would control the "Select One" prompt to be illuminated (as shown in FIG. 3C) when the user is to select one of several alternatives displayed on display 102. Typically, the user responds by making a selection—that is, by depressing the one of "soft" (i.e., programmable) keys 108 which points to the line of the display on which the option he desires is displayed.

The "Change Screen" prompt (see FIG. 3D) is typically illuminated when the NEXT key 106 is to be depressed (e.g., to confirm a previously entered request, and/or to move on to the next screen in a sequence of screens).

Figure 3E:
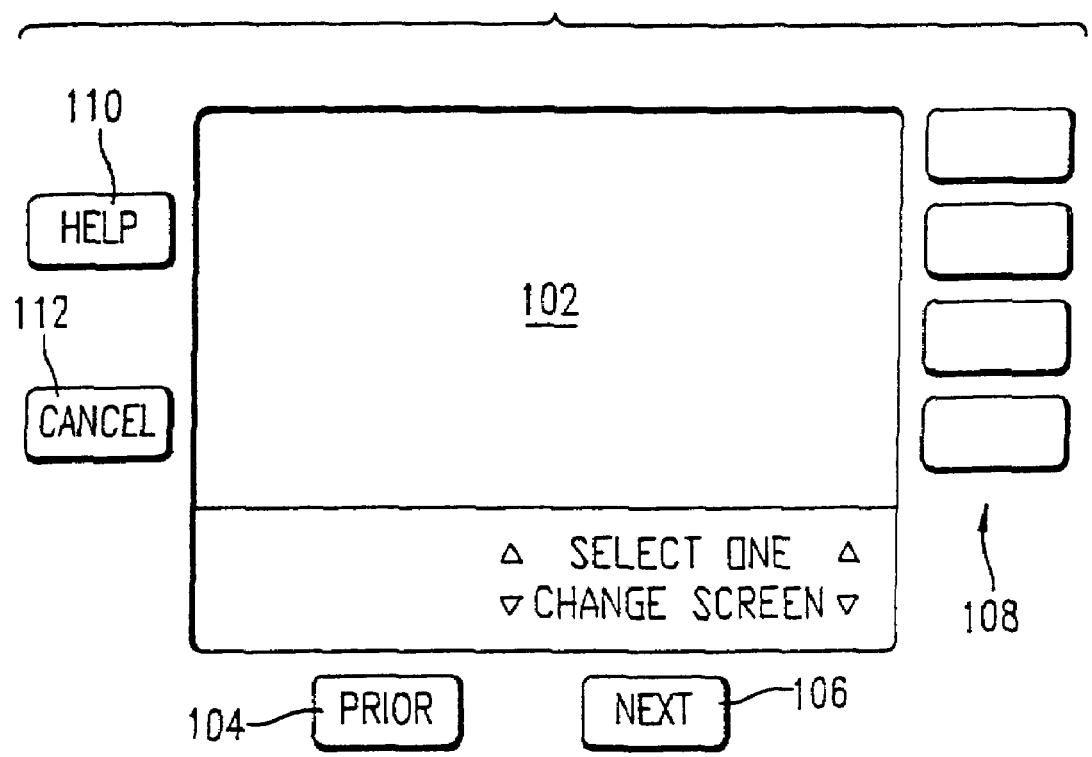

FIG. 3E depicts the situation when the prompts "Select One", "or" and "Change Screen" are all illuminated. These prompts would be presented to the user when the user is to either (a) select one of the options displayed on the display 102 (by pushing one of "soft" keys 108), or (b) move on to the next (or previous) screen (by manipulating navigation keys 104, 106).

To initiate the terminal session using terminal 54, the user need only depress the power-ON switch of the preferred embodiment. In response to this power-ON switch depression, terminal 54 automatically initializes display 102 and dials an appropriate internally-stored telephone number corresponding to PDN 56 and central computer 52. A modem (not shown in FIGS. 2 or 3) internal to terminal 54 establishes and maintains this communications link with central computer 52. To communicate through terminal 54, the user operates momentary ON keys 104-112 and/or depresses keys of keypad 114.

If an error occurs during data entry, the terminal user may push a CANCEL key 112 to correct the error. If he pushes CANCEL key 112 successively, he moves out of the function he has selected (e.g., to erase, one at a time, previously entered digits much as occurs when one depresses the CANCEL key on a standard ATM machine) and may eventually return to a main menu. Help key 110 may be pushed at any time to obtain contact sensitive help prompting. The PRIOR and NEXT keys 104, 106 may act as scroll up/scroll down keys in the appropriate context as already described.

If during a terminal session a period passes when there is no key activity for a certain time delay, terminal 54 times out and disconnects the telephone link with the PDN switch 56. In the preferred embodiment, transactions requested prior to such communications failure are not processed by central computer 52 unless the user has received a confirmation over terminal 54 that the requested transaction has been processed.

Figure 5A:
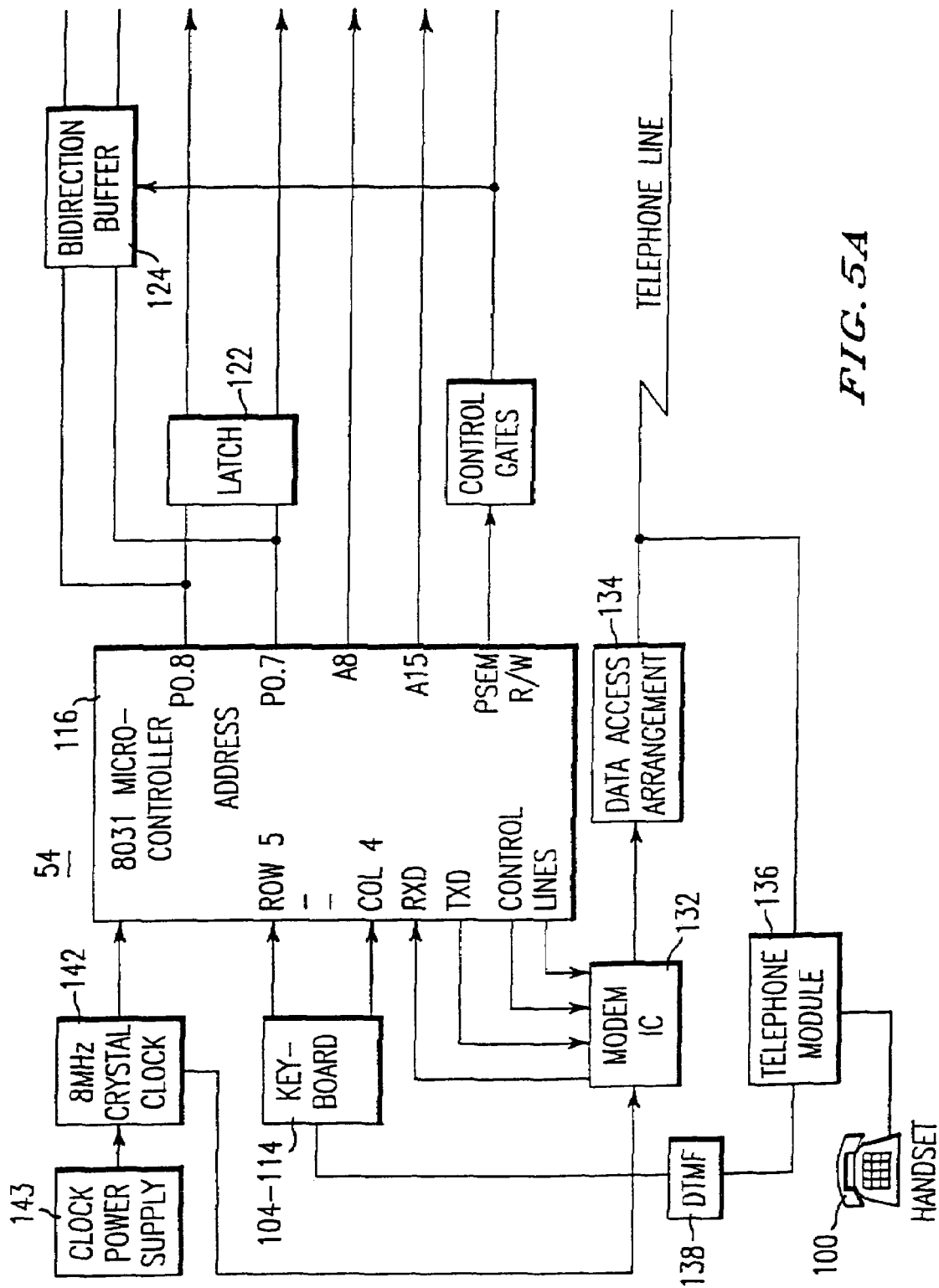
FIGS. 5A and 5B together are a schematic block diagram of the FIG. 3 terminal.
Figure 5B:
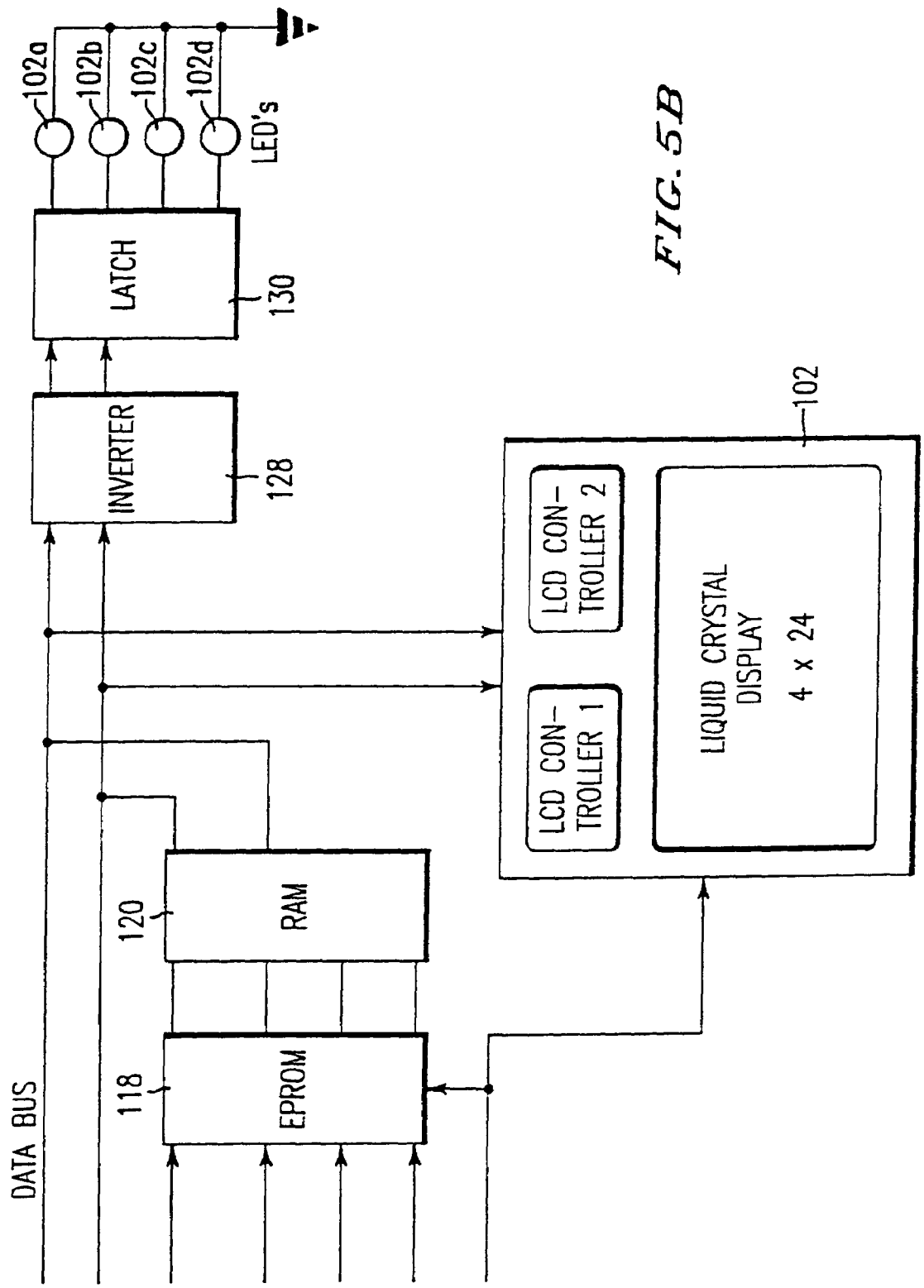

FIGS. 5A and 5B together are a schematic block diagram of terminal 54. Terminal 54 in the preferred embodiment includes display 102, independently controllable LED prompts 102a, 102b, 102c and 102d (corresponding to the four independent illuminated prompts described above), user controls 104-114, and microcontroller 116 with associated EPROM 118 and RAM 120, an address latch 122, a bidirectional buffer/driver 124, an encryption functional block 126, an LED driver inverter 128, an associated latch 130, an internal modem 132, and a data access arrangement/connector 134.

The FIG. 3 embodiment further includes a telephone module 136 and DTMF tone generator 138 connected to and associated with voice handset 100. The power supply 140 (e.g., a replaceable battery) is also provided to power the various components of terminal 54 (or a conventional trickle charger circuit may be used to charge a rechargeable battery from telephone line voltage).

Microcontroller 116 is the heart of terminal 54. Microcontroller 116 executes program control instructions stored in EPROM 118 in response to clock synchronization signals provided by the crystal clock 142—preferably by applying address information on address bus lines A8-A15 and on bidirectional address/data bus P0-P7 (latch 122 may be used to latch this portion of the address) and retrieving the resulting instructions in a conventional manner via bidirectional buffer 124 and the multiplexed address/data bus. Microcontroller 116 similarly accesses temporary storage locations in RAM 120 and is capable of reading from or writing to RAM in a conventional fashion (although EPROM 18 and RAM 120 are shown connected in series with one another in FIG. 5B, it will be understood that these components may actually reside in the same package, so that microcontroller 116 may independently access any storage location in either the EPROM or the RAM).

Terminal 54 if desired may further include a conventional read/write interface to a conventional "swipe" type magnetic card reader or a conventional "smart card". Such interface may be useful not only to input information to terminal 54 for transmission to central computer 52, but also to store information transmitted by the central computer to the terminal. In one application, for example, central computer 52 may download a credit order to a magnetic card or "smart card" via terminal 54—thus in effect providing electronic cash dispensing. Such downloaded debit cards or "smart cards" may then be used to purchase goods or the like.

In the preferred embodiment, microcontroller 116 controls display 102 by writing parallel information to the display (which in the preferred embodiment is an off-the-shelf LCD display module including a 4×24 character matrix LCD display and associated internal LCD controller) and by providing appropriate control signals to the display. A conventional encryption arrangement which preferably uses the conventional standard DES Data Encryption Standard (described in, for example, FIPS PUB 46, Federal Information Processing Standard Publication 1977 Jan. 15 U.S. Dept. of Commerce, National Bureau of Standards) may be used to encrypt and/or decrypt data in a conventional manner and provide encrypted/decrypted result to microcontroller or communications or further processing. The encryption arrangement may alternately comprise any other miniaturized encryption system (such as a system developed by Dr. Ronald Rivest of MIT, Cambridge, Mass. and others and described in U.S. Pat. No. 4,405,829).

In the preferred embodiment, secured terminal communications is provided by on-board encryption of the user's PIN (personal identification number) and financial data. The RSA (Rivest, Shamir and Alterman) encryption algorithm (somewhat similar to DES but not requiring passing of keys between the transmitter and the receiver) may be stored in EPROM 118 in the form of program control instructions. The RSA encryption algorithm is driven by a 64-bit seed stored in RAM 120 or other RAM (which should be powered on at all times by a lithium battery) at the time of terminal manufacture. A real-time clock 142 and associated clock power supply 143 are also provided in the preferred embodiment (the RAM storing the seed, the real-time clock, and the clock power supply may be contained within a single package to conserve power if desired). A copy of the seed is preferably also maintained for each terminal 54 by the central computer 52—and the seeds are permuted in the same ways by the algorithms to produce random numbers in response to real-time.

During communications with the central computer 52, the terminal 54 may use the seed to periodically generate a pseudo-random number for encryption. This same seed is used by central computer 52 to generate the same pseudo-random number. Because the seeds and the algorithms are the same (assuming the real-time clocks can be periodically resynchronized with one another), the generated random numbers are also identical to one another. The real-time clock 142 of terminal 54 may be periodically adjusted by the central computer 52 to ensure synchronization.

A user signing onto terminal 54 enters his PIN which is added to (or is otherwise transformed using a reversible process) the random number generated by the seed by microcontroller 116. This composite number is transmitted in encrypted form to central computer 52 where the same random number generated independently by the central computer is used to recover the original PIN. The PIN and central computer 52 (using standard encryption techniques compatible with those used on the ATM network 66) for transmission over the ATM network.

Preferably, the user's PIN, the unique terminal identification ("ID") stored within the terminal EPROM 118, and all financial (i.e., "amount") information passed between the terminal 54 and the central computer 52 is encrypted. However, it may not be necessary or desirable to encrypt other information passed between the terminal and the central computer (e.g., the screen display text information transmitted by the central computer 52 to the terminal 54) since such encryption adds to the time needed to process the information.

A very high level of security is provided by the techniques discussed above. No key or seed is passed between the terminal 54 and the central computer 52, thus preventing an eavesdropper from obtaining the key and "spooking" the line ("spooking" refers to the process by which an eavesdropper can listen into and follow the exchange between the terminal and the central computer long enough to synchronize his terminal with the real terminal 54 and then capturing the line to replace the real terminal with his terminal—thereby "taking over" the exchange). Preferably, the RAM storing the seed information within the terminal will lose its stored information if any attempt is made to "peel and read" the RAM and its contents. All sensitive information (PIN, terminal ID and financial information) is encrypted so that anyone "listening in" would receive in clear form only standard information available to all users—with all of the information needed to perform financial transactions (i.e., PIN, terminal ID, amounts, account numbers) being encrypted. Preferably, limits would be provided with respect to the real-time adjustment provided by clock 142 so that someone trying to "crack" the encryption algorithm could not derive the seed by supplying a series of known real-times. And, of course, someone stealing a terminal 54 is not provided with access to a user's bank account because the thief would also have to know the user's PIN.

Microcontroller 116 scans using input controls 104-114, and executes appropriate program control instructions in response to depression of such controls. In the embodiment shown in FIG. 3, the same keypad 114 preferably used to dial the telephone and to provide alpha-numeric inputs to the terminal microcontroller 116. While it is certainly possible to perform the various telephone functions (including DTMF tome generation) with an appropriately programmed microcontroller 116, in the presently preferred exemplary embodiment of the present invention the voice telephone functions are performed independently of microcontroller 116 and associated components—with the only overlap between the telephone functions and the terminal functions being that keypad 114 controls both the telephone and the terminal.

Figure 6A:
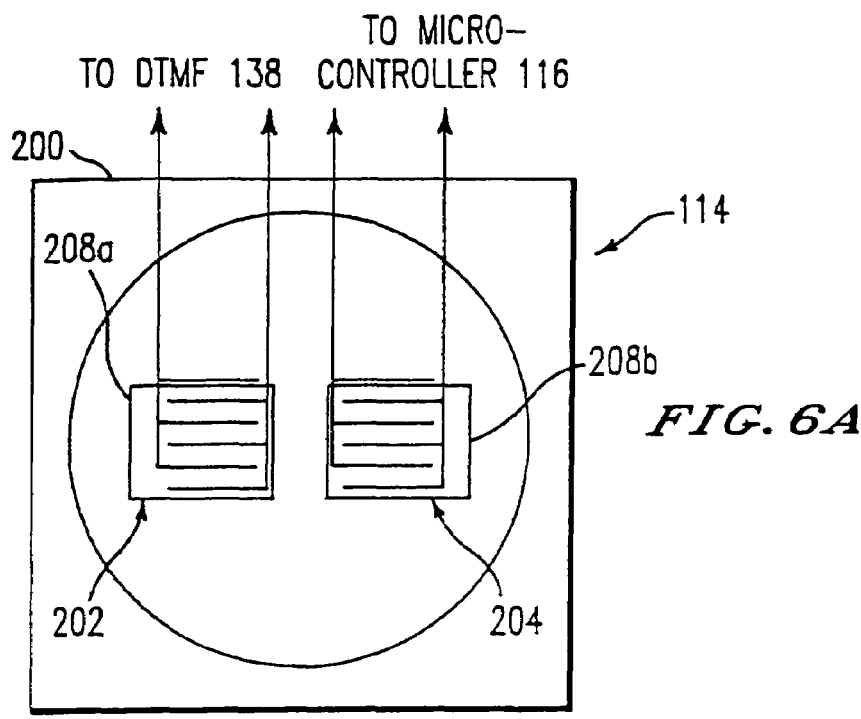
FIG. 6A-6C are different view of an exemplary keypad contact arrangement incorporated within the FIG. 3 terminal.
Figure 6B:
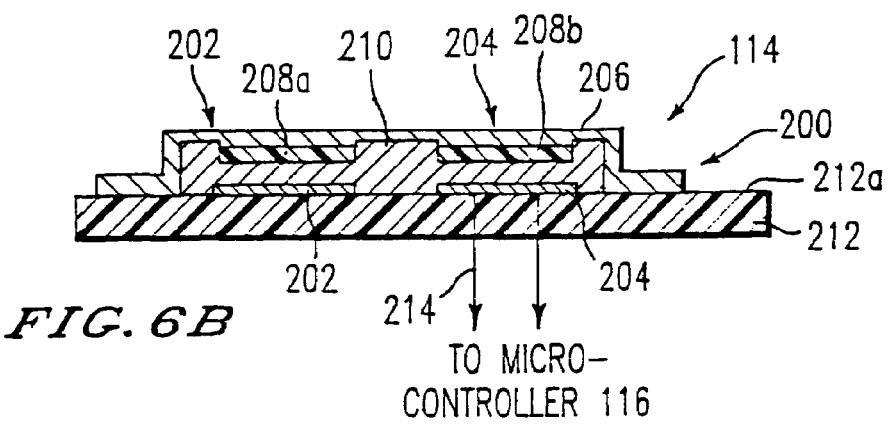
Figure 6C:
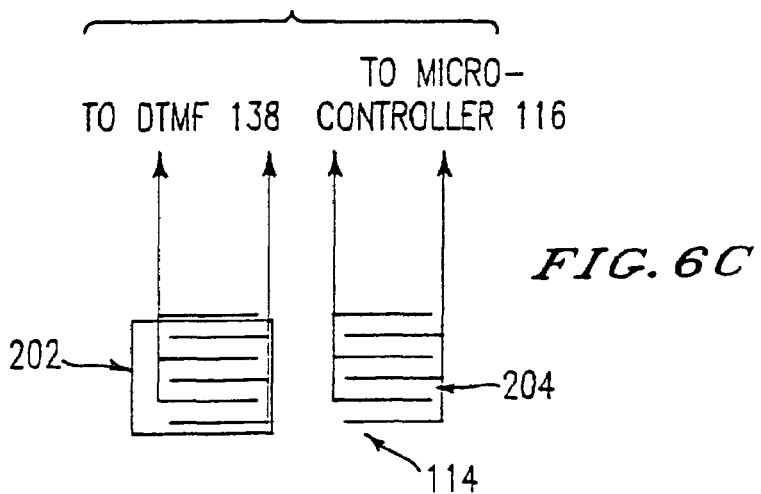

Thus, in the FIG. 3 terminal embodiment, DTMF tone generator 138, telephone module 136, and handset 100 are used solely for telephone functions—with terminal telephone dialing being performed independently by microcontroller 116 and modem 132. An inexpensive way to provide a dual function keypad 114 such that the keypad interfaces essentially independently with both terminal 54 and the telephone DTMF tome generator 138 is shown in FIGS. 6A-6C. FIG. 6A is a top view in plane of a single key 200 of keypad 114 including dual electrical contact portions 202, 204. Preferably, the dual contact portions 202, 204 are identical to one another—with the only difference being that one of the contact portions 202 is connected to telephone DTMF block 138 while the other contact portion 204 is connected to microcontroller 116. FIG. 6B is a side view and cross-section of a single key structure 200 of keypad 114 in the preferred embodiment. Key structure 200 includes a dome 206, a conductive rubber pad 208, a separator insulator layer 210, and contact portions 202, 204 mounted on a common printed circuit board 212. In the preferred embodiment, the DTMF block 138 is preferably implemented by circuitry provided on an upper surface 212*a* of printed circuit board 212 facing conductive rubber pad 208. As shown in FIG. 6A, contact portion 202 preferably comprises a conventional interdigitated pair of conductors with contact between the interdigitated conductors being established by conductive rubber pad 208 whenever dome 206 is depressed. Similarly, contact between interdigitated conductors of contact portion 204 is established by conductive rubber pad 208 whenever dome 206 is depressed—but in the preferred embodiment no circuitry associated with contact portion 204 is located on PC board upper surface 212 (and instead, pass through connections 214 are used to connect the contact portion to microcontroller 116). In the preferred embodiment, the distinct conductive rubber contact pads 208*a*, 208 provide electrical isolation between the circuitry of terminal 54 and circuitry of DTMF module 138.

In the preferred embodiment, dome 206 is preferably a flat type with a short stroke and tactile feedback. Conductive rubber pads 208*a*, 208*b* preferably have contact resistance of less than 50 ohms to provide good electrical contact between the interdigitated contact conductors. The switch shown in FIGS. 6A-6C provides a short stroke, limited tactile feedback, relative simple design, that is, contamination proof and long lasting in operation, provides a low profile and is relatively inexpensive to manufacture, and provides complete electrical isolation between microcomputer 116 and DTMF block 138.

Figure 7A:
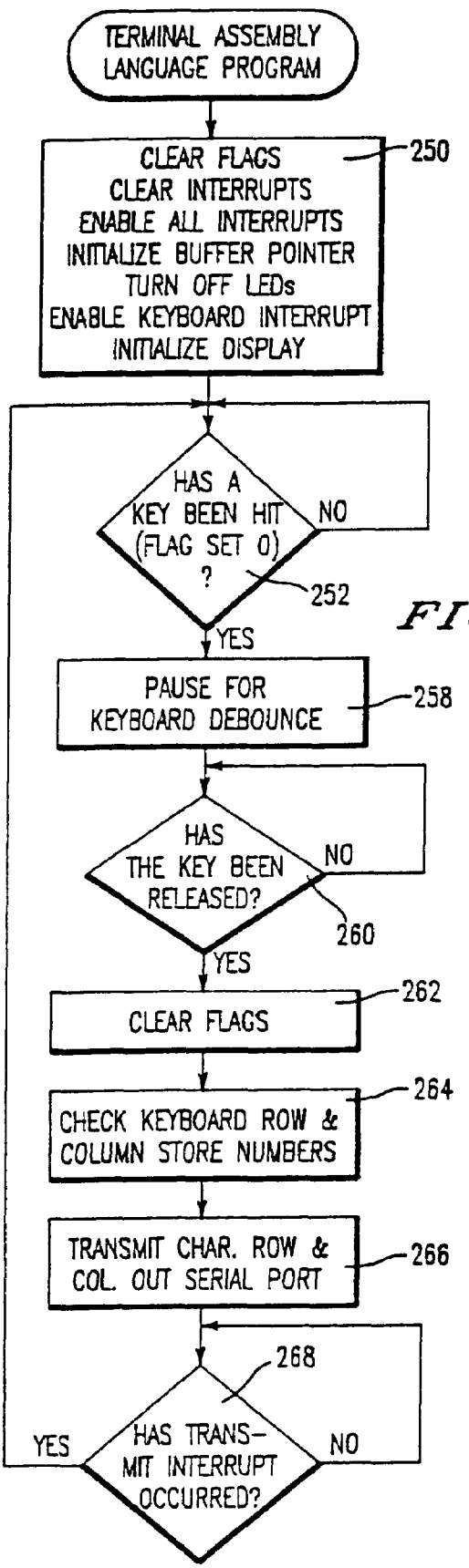
FIGS. 7A-8B are schematic flow charts of exemplary program control steps performed by the terminals shown in FIGS. 3 and 4.
Figure 7B:
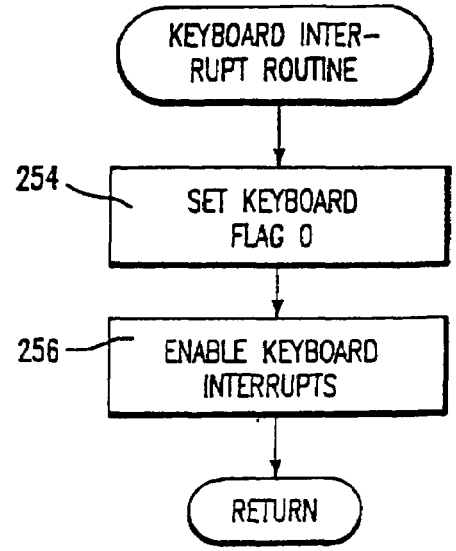
Figure 7C:
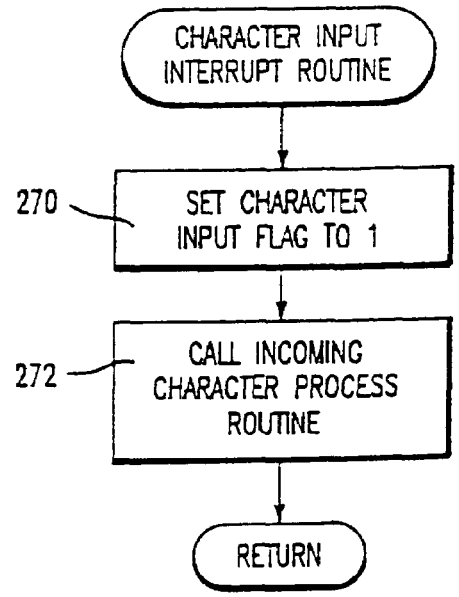

FIGS. 7A-7C are flow charts of exemplary program control steps performed by microcontroller 116 in the preferred embodiment terminal 54. Upon initially applying power to terminal 54, microcontroller 116 clears all flags and interrupts, enables all interrupts, initializes a buffer pointer, turns off LEDs 102*a*, 102*b*, 102*c* and 102*d* enables a keyboard interrupt, initializes display 102—all in a conventional manner (block 250). Microcontroller 116 then waits for a key 104-114 to be depressed (decision block 252). FIG. 7B is a flow chart of a keyboard interrupt routine performed by microcontroller 116 to detect when a key 104-114 has been depressed (and which key has been depressed). Whenever a key is depressed, microcontroller 116 sets a keyboard flag (block 254) and then reenables keyboard interrupts (block 256) before turning to the FIG. 7A routine.

Upon detection by FIG. 7A decision block 252 that the FIG. 7B keyboard interrupt routine has detected depression of a key, microcontroller 116 pauses a short time period (to provide for debounce of the key; block 258) and then waits for the key to be released (decision block 260). When the key has been released, all flags are cleared (block 262) and the microprocessor 116 decodes the scanned-in information to determine which key was depressed (block 264). Terminal 54 then transmits the key identity via modem 132 over the telephone line to the FIG. 1 central computer 52 (block 266) and waits for transmits to be completed (decision block 268). Once transmission is complete, control returns to decision block 252 to await depression of the next key.

Figure 8A:
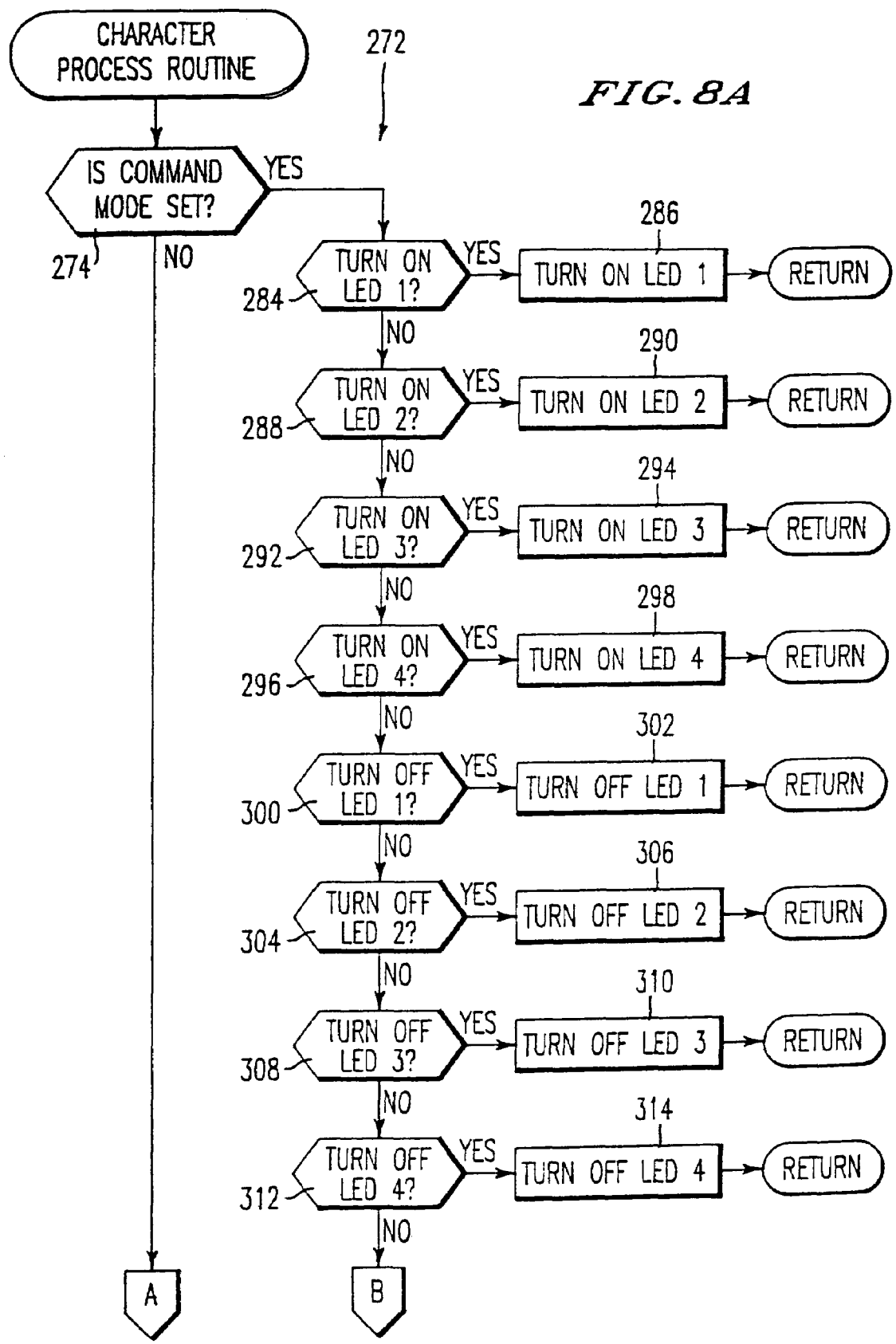
Figure 8B:
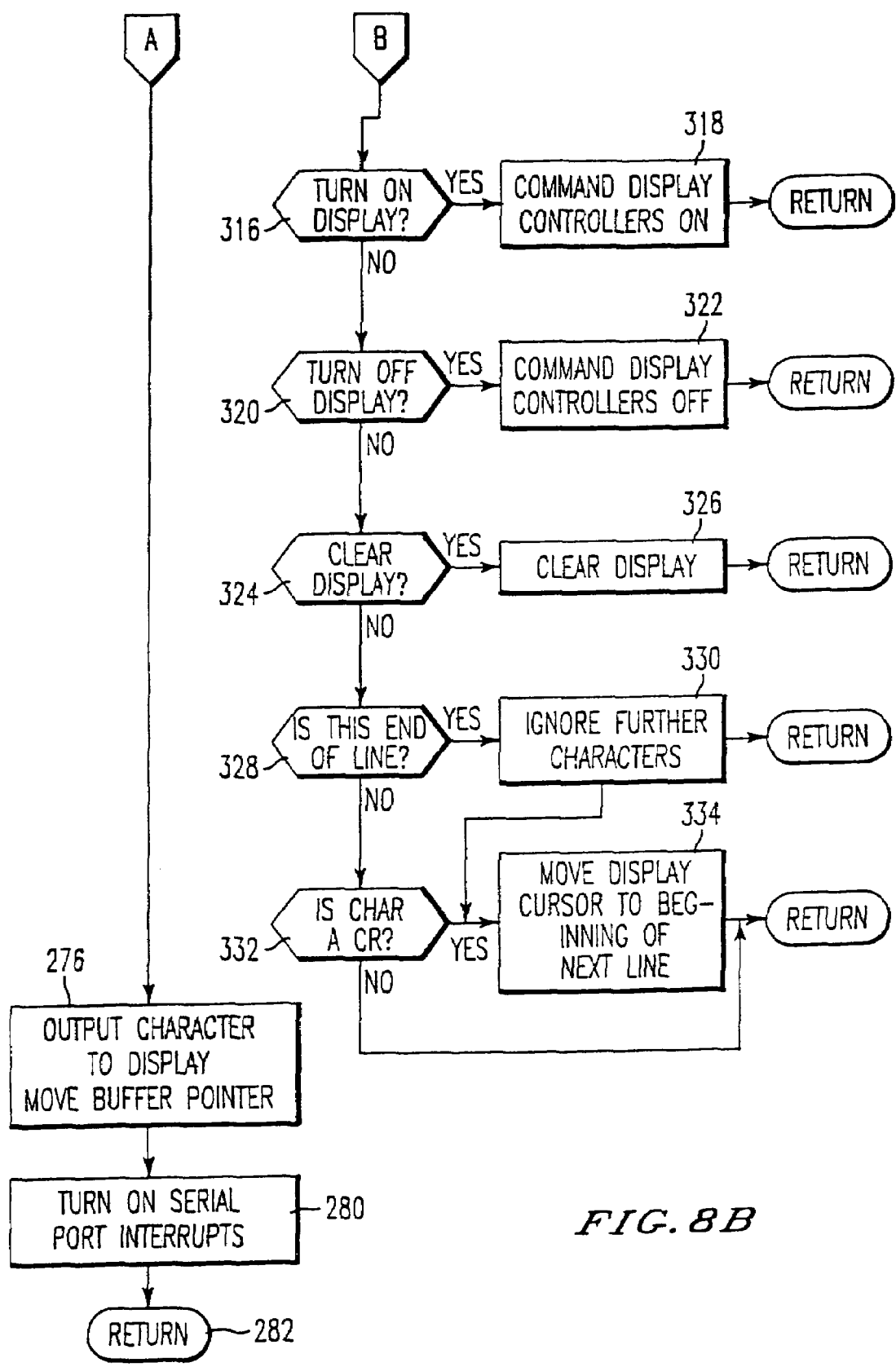

At any time during the FIG. 7A routine, it is possible for terminal 54 to receive data from central computer 52. FIG. 7C is a flow chart of an exemplary program control steps performed by microcontroller 116 when modem 132 receives a character from central computer 52. In the preferred embodiment, the character input interrupt routine shown in FIG. 7C simply sets a character input flag (block 270) and then calls an incoming character process routine (block 272), a detailed flow chart of exemplary program control steps of which is shown in FIGS. 8A and 8B. In the preferred embodiment, terminal 54 may operate in either the command mode or display mode. In the command mode, characters received by modem 132 are used to initiate various actions by the components of terminal 54. In the display mode, the received characters are simply displayed (i.e., communicated to the display controller for display 102). The terminal 54 in the preferred embodiment toggles between the command mode and the data mode in response to control signals embedded in the data stream it receives. Thus, for example, all ASCII characters may be displayed on display 102, but terminal 54 may interpret all characters preceded by "escape" characters as command characters and interpret such command characters rather than displaying them.

Decision block 274 tests whether the incoming character is a command or a character to be displayed (preferably based upon a bit or combination of bits preceding or otherwise contained within the incoming character, as mentioned above). The incoming character is merely to be displayed ("no" exit of decision block 274), microcontroller 116 outputs the character to display 102 (block 276), enables the serial port interrupts to permit receipt of the next character (block 280) and returns to the calling program (block 282) (the position at which characters are displayed in determined in the preferred embodiment based on the position of the last character to be displayed, with an entire replacement screen display being sent to the terminal 54 from the central computer 52 each time any data is transmitted to the terminal). If, on the other hand, the incoming character is a command, microcontroller 116 decodes the command and effects an appropriate response. For example, if the incoming command is to activate LED 102a (decision block 284), microcontroller 116 asserts the appropriate data on the address/databus to latch an appropriate control signal and to latch 130 so that LED 102 is illuminated (block 286). Similarly, if the incoming command indicates that LED 102a is to be turned off (decision block 300), microcontroller 116 causes latch 130 to latch appropriate data such that LED 102a is dark (block 302). LED 102b-102d are controlled independently in a similar manner by blocks 288-298 and blocks 304-314.

If the incoming command received by modem 132 indicates that display 102 is to be turned on (decision block 316), microcontroller 116 generates an appropriate command signal to activate the display (block 318). Similarly, central computer 52 can command the terminal 54 to turn off display 102 (blocks 320, 322) or to clear the display (blocks 324, 326). In the preferred embodiment, a string of characters to be displayed by block 276 is followed by an end of line command character and upon receipt of such end of line character (tested for by decision block 328), any characters in excess of the line length, 24, are ignored (block 330). If the received control character is a carriage return on the other hand (block 332), microcontroller 116 moves the display character to the beginning of the next line (block 334) so that the next character output for display by block 276 is displayed at the beginning of the following line of display 102.

Exemplary Program Steps Performed by Central Computer 52

First provided will be a brief overall description of an exemplary remote terminal 54 user session accessing the financial service functions performed by central computer 52. Subsequent to that discussion will be provided a detailed description of exemplary program control steps performed by central computer 52 under control of the steps shown in flowchart form in FIG. 9 et seq.

Briefly, the terminal is powered-up by activating an ON switch preferably on the side of the terminal. The onboard processor initializes the terminal program which resides in an EPROM, clears the display, clears the transmit buffer, commands the modem section to send a call block code and autodials the central processor's gateway number (via the PDN).

Coding in the terminal's EPROM contains SIGNON coding and messages. If a link is not established, the microprocessor displays a message questioning whether the radial number should be local or long access distance number. If the user responds indicating the number is local, the terminal modem redials the local access gateway number; otherwise it dials a long distance access number. Provision may also be made for manual dialup.

After an asynchronous communications link is established, a unique EPROM-based identification number is transmitted to the central processor, encrypted, indicating the terminal's unique security identification number. The central processor terminal handler searches an authorization file stored on database 84 for the terminal security identification number to determine access conditions, institutional associations, names of authorized users, etc.

After the terminal is identified and authorized, the central processor asks which user (in a particular household) is using the terminal. If only one user is authorized to use the terminal, the central processor defaults to the next menu. The central processor then requests the user to indicate which transaction bank account (i.e., checking, NOW or other debit account) he wishes to use. If the user has only one transaction account the central processor defaults to the next menu.

After the terminal user and the transaction account are identified, the user is requested to enter his ATM PIN (personal identification number). The PIN is transmitted (encrypted) to the central processor. The PIN is then combined with the user's ATM card offset and account number, which is kept on file in the central processor. This information is combined and reformatted (using the interface module) to conform with ATM interchange formats. The PIN (and other user identification data) is then transmitted through the ATM interchange to the terminal user that his terminal fully secured. Provisions can also be made to pass along the PIN "untouched" by the central processor.

If the bank does not authorize access to the account, indicating incorrect PIN, a message is passed to the terminal user through the terminal display indicating access has been denied. The user is then permitted several additional attempts to enter the correct PIN. With the correct PIN, access will be permitted and the customer will receive a greeting message from his bank and his available balance.

The system thereby has two levels of security—the unique signature of the terminal and the unique PIN; each linked to an authorized user.

A timed advertisement or message is then typically transmitted to the terminal user. This message may be directed to the user based on an analysis of the user's spending patterns (this information is extracted from user bill payments made through the terminal).

After receiving the advertisement, the user is presented (based on an analysis of his transactions history) with the opportunity to request further information on the advertisement. If he responds positively, that response indicating customer interests is communicated from the central processor to the advertiser (either online or in batch mode if preferred). The advertiser can then immediately direct a sales response at the interested customer.

The preferred embodiment, computer system 52 may thus target third party advertisements to users without disclosing user confidential information to the advertisers. An advertiser may, for example, pay to have an advertisement directed to all users having an average bank account balance in excess of a certain amount or who make average monthly credit card payments in excess of a certain amount. Central computer 52 may accumulate a long history of user's bill payments and bank account balances and use this accumulated information (in conjunction with preferred information provided by the user when he registers for the home bill paying service) to provide extremely sophisticated useful and valuable demographics analysis possibly never before available due to the lack of such detailed accumulated user information.

Needless to say, the results of such demographics analysis are extremely valuable to advertisers but are also extremely confidential; users would seriously object if any such information was ever related to third parties without their express permission. However, central computer 52 can (in accordance with an important feature of the present invention) target specific ads to users based on such detailed demographics analysis without ever disclosing any confidential user information to the advertiser. If the user requests further information in response to such received targeted ads, central computer 52 may then provide limited user information (e.g., name and telephone number) to the advertiser based upon the user's positive request for advertisers contact. An especially advantageous way to provide such limited user information is to pass it to the advertiser's telemarketing department immediately in real-time (while the user is still "on-line") since the user is then near his telephone and is receptive to the advertiser contact. The advertiser may then call the user as soon as the user disconnects his terminal to free up the telephone line.

The main menu of services is then presented on the terminal display, the user selects one of four major choices (bill paying, account transfer, account information or other services).

When bill payment is selected from the main menu of services the user's account balances is presented, his terminal 54 displays a unique list of payees (preferably specified beforehand by the user in response to a questionnaire or the like). After selecting one payee, the amount of payment is entered on the keypad 114 and the figures appear on display 102 (but are not transmitted until a buffer is ready for transmission). The amount (preferably encrypted) is transmitted to the central processor 52. The transmission is logged in on a log file, the transaction is entered in transaction files by the bill payer module, and account information is obtained from the appropriate payee (payee number, payment instructions/remittance method, payee address and deposit institution) and user account files (the user's name, address, user account number at payee, payment application) stored on mass storage device 84. A confirmation message is displayed to the terminal user indicating that his request for bill payment has been received and logged by the central processor.

If a bill is to be paid today (and sufficient available funds are in the user's account), the payee identification number, customer account number and PIN (unless operating in PIN-less mode of operation using authorization numbers returned by the customers bank at balance request), the amount and date, identification information account, destination bank descriptor information and transaction codes are obtained from database 84 files and reformatted by the interchange module for transmission to the customers bank through the ATM interchange preferably in the form of a POS debit message. At the bank, the customer's account identification information and PIN (or authorization number) permit access to his account for the purpose of debiting the amount of the bill to be paid. The user's bank account is debited, and the payee identification is passed to the bank for listing on the user's monthly bank statement (paper statements or payment verification are not sent to terminal users directly, but are combined with the terminal user's monthly bank checking account statement in the preferred embodiment). A message is then sent back through the interchange and ATM network 66 confirming the transaction (at this time using preferred POS debiting the bank and the network assume liability, i.e., guarantee the transaction, and the bank typically debits user account immediately and clears the funds to the source provider's account after close of business).

After payment authorization is received from the bank (through the ATM interchange), the bill payment enters the central processor 52 from the terminal, and a series of log and transaction files are updated by the POS and bill payer modules. The payee/vendor information file is accessed to determine his status, electronic or paper payment, the appropriate address is obtained from the address verification file and particular payment information is obtained from the payments descriptor file. If the payment is scheduled for today, it is routed to the appropriate exchange (ACH) or routed to other direct electronic transmitted or remittance tape for delivery to the payee. Provisions are also made to aggregate and time payments (from multiple terminal users) to a single payee. If the payment cannot be made by electronic means, a paper check must be cut and mailed. In cases where multiple payments can be made to a single payee, a (single) "check and list" (of payor information) is forwarded. A reference number is created for each electronic or paper payment (this reference number is used for terminal user and payee servicing).

If the payment is to be paid other than today (a "future payment"), a similar logging procedure is followed, except that the payment (along with certain secured PIN information) is routed to a payment transaction pending file instead of being processed for immediate payment. On the appropriate day of payment, the transaction pending file is accessed and the information necessary to affect an account debit of a user's bank account is retrieved and a corresponding POS debit message is generated and sent over the ATM network at that time.

Information on the amount, payee, banking institution, user account and authorization number are transmitted through the interchange to user's bank. Once the debit has been completed, an acceptance of the account debit transmitted by the bank back to the central processor through the ATM interchange.

After a payment has been made, a confirmation is received for electronic payments, a confirmation entry is placed on the customers file and the transactions file. Similarly, another confirmation is entered upon sending paper payments. When the user views his statement of transactions (his online statement), the data and amount of payment is available for his information.

Pre-authorized recurring payments are processed in much the same manner as future payments. On the appropriate day, the user's payment information is transmitted through the ATM interchange to his bank where his account is debited and a confirmation returned that is posted on the user's online statement.

When payments that have been scheduled are not processed due to insufficient funds in the user's account, a message is posted to the user's online statement file and a message is presented on his screen for viewing at the beginning of the next session. In addition, the terminal user is notified by mail.

The central processor system keeps logs of all session payments scheduled currently or for future dates. This permits a terminal user to review and correct the amount, date or payee for the current session or for future dated transactions.

The transfer of funds function permits the transfer of funds within a single bank or between cooperating banks. When the transfer funds function is initiated, a menu of accounts is presented, the user selects the account from which the funds are to be transferred and the amount of the transfer (the user may also be asked to enter a new PIN if his current PIN is not tied to the applicable account). The account number and PIN are transmitted through the ATM interchange 66 by the central processor 52 to the customer's bank where a balance is obtained. A menu is then presented of the user's other accounts and he selects the account to which he wants funds transferred (again, if necessary, he is asked the PIN of the account if not tied to his main transaction account). A transfer confirmation message is displayed on the terminal screen after entry of the necessary information indicating that the transfer has been accepted by the central processor. The central processor system keeps logs of all session transfers scheduled currently or for a future date. This permits a terminal user to review and correct the amount, date or amount of transfer for the current session or for future dates. The central processor then transmits through the interchange a debit to the source account and then transmits a credit to the receiving account.

If the transfer attempt should fail because of PIN acceptance, inadequate funds or communications problems, the terminal user is notified while online. In the case where the transfer has been scheduled for the future or periodically, the PINs, amounts and dates must be held in a pending transaction file. Should the transfers not take place when scheduled, a message is posted to the use's online statement file and a message is mailed to the user and a message is presented on his screen next time he turns on his terminal. At the completion of the transfer debit and credits, confirmation messages are transmitted by the bank to the central processor through the ATM interchange.

The "account balance" menu selection provides information on account balances for the user's indicated transaction account and for other user bank accounts. In addition, there is a statement of online activity which summarizes the transactions that were entered during a desired historical period (e.g., the last 45 days including the current session), an opening balance (using the oldest balance stored in the central processor for over the post 45 days) and the ending balance (current balance adjusted for any transactions processed during a terminal session).

In addition, information on other bank services is also available such as, CD rates, mortgage and loan rates, special promotions, lists of services, etc. A terminal user may then request further information. In certain cases, the user may also request a service (e.g., apply for loans, order new checks, and potentially perform certain non-banking functions). Any service request is passed to the bank directly for service attention similar to the way the central processor treats a user response to directed advertising at SIGNON. The central processor only accesses the interchange when seeking to obtain an account balance, perform a debit or credit, submit adjustments stop payments and reversals; otherwise, transaction activity is limited to the central processor and its databases.

The final selection permits the user to SIGNOFF the terminal, or move to another account at the same bank or a different bank. If the terminal session is ended, a session number and message is transmitted to the terminal (the session number is stored by the central processor and is used for customer servicing and reference). Actual bank debit and credit processing that was not initiated during the session is completed after the terminal session ends. The terminal detects an end of session code and the modem is commanded to break the communications. If the terminal session ends abnormally due to a failure in the communications link, those transactions that were not entered up to the point of confirmation are not executed by the central processor. The terminal user, once receiving indications that the communications link is down, must push the ON key to reestablish a communications link and continue with his remaining transactions. He can review his online statement of transactions to conform what transactions have been accepted by the central processor.

If the user wishes to sign onto other accounts at his current bank or his accounts in other banks, he signs on the new account (using a new PIN) and conducts business in his new account or new bank.

Figure 9:
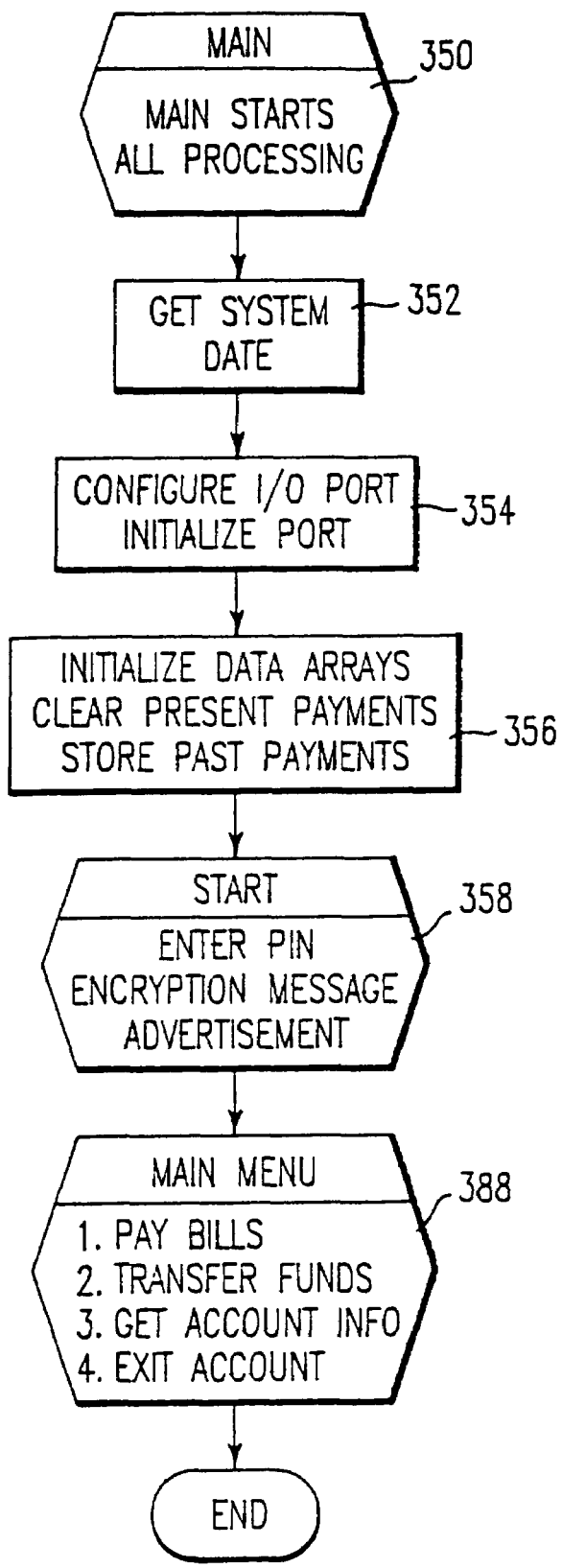
FIGS. 9-22 are schematic flow charts of exemplary program control steps performed by the CPU shown in FIG. 1.

FIG. 9 is a flow chart of exemplary program control steps of a main routine performed by central computer 52 to distribute financial services to remote terminal 54 and to communicate with such remote terminals. Preferably, central computer 52 provided a multitasking environment and a version of the main routine shown in FIG. 9 executes for each of a plurality of remote terminals 54 in communication with central computer 52.

Calling the FIG. 9 main routine of block 350 starts all processes. Upon beginning execution, the main routine first gets the system date at block 352. The main routine then configures an I/O port assigned to it (preferably, central computer 52 includes a plurality of I/O ports for communication with a corresponding plurality of remote terminals 54) and initializes this port (block 354). The main routine then initializes data arrays and other associated data structures stored in the memory of CPU 80, clears a "present payment" temporary storage data structure, and stores past payment information in the database(s) maintained on mass storage device 84 (block 356). The main routine then waits for a remote terminal 54 to contact central computer 52—and upon such contact, performs the start routine which establishes a communication interchange with the calling remote terminal, solicits the user's personal identification encrypted and encryption initialization message, and controls the calling remote terminal to display an advertisement (block 358). A flow chart of exemplary control steps performed by start routine 358 is shown in FIG. 10.

Figure 10:
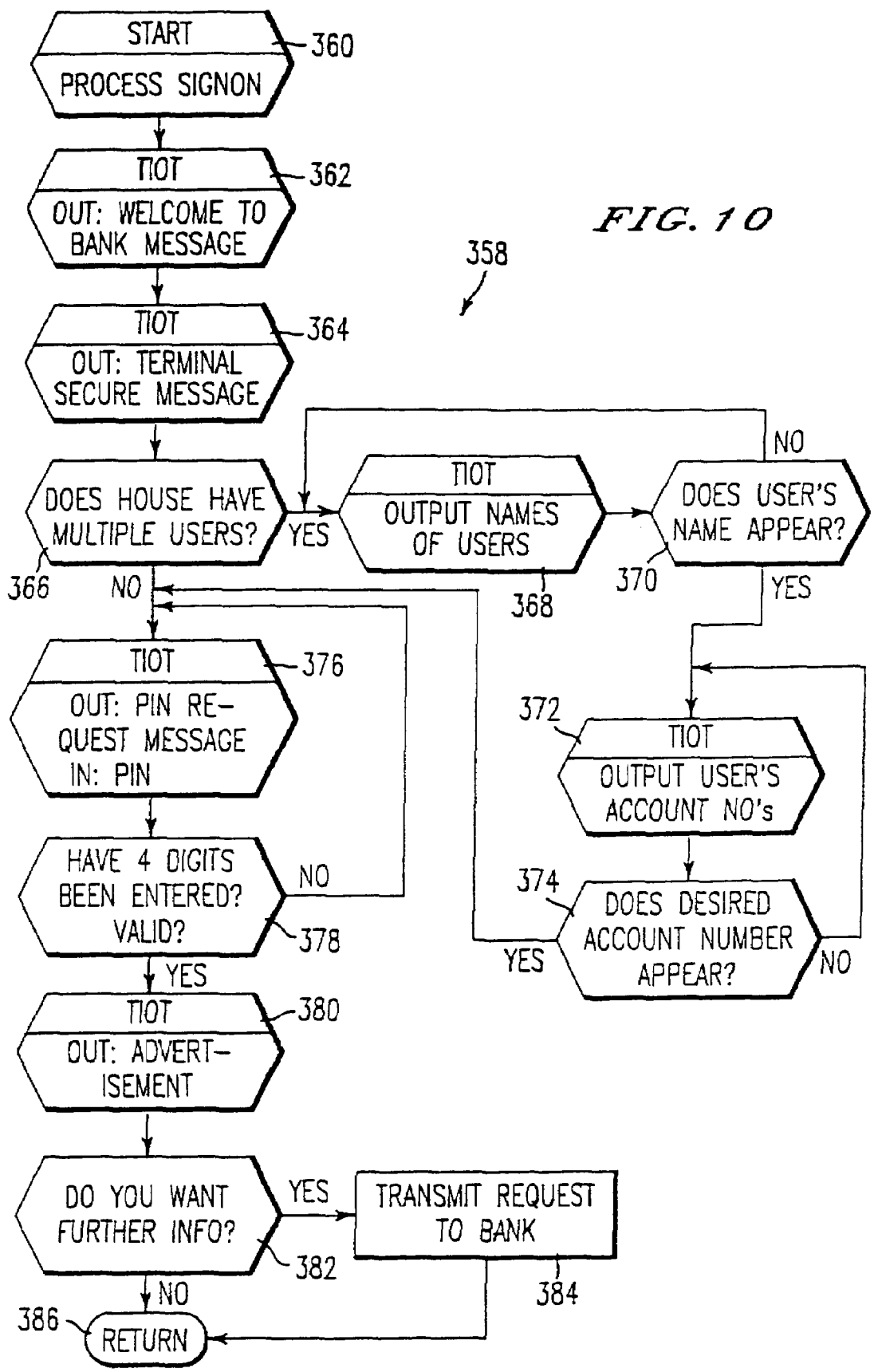

Referring now more particularly to FIG. 10, start routine 358 receives initial information transmitted by terminal 54 and preferably identifies the terminal as corresponding to a particular user or group of users (block 360). In the preferred embodiment, when remote terminal 54 contacts central computer 52, the remote terminal transmits an internally stored identification number which identifies a particular terminal. Central computer 52 in the preferred embodiment associates that unique terminal identification it receives with that particular user (or collection of users), accesses the database stored on mass storage device 84 to determine which bank or other financial institution that user(s) is a customer of, and then transmits a string of characters to the remote terminal 54 which causes the terminal to display a "welcome" message in the name of the user's bank (block 362). This is an important feature of one aspect of the present invention, since the user's remote terminal 54 greets the user with a welcome message appearing to come from the user's own bank rather than from the service provider operating system 52—giving the bank "control" with its user relationship and giving the user the familiarity and confidence in dealing with his bank.

Central computer 52 transmits signals to remote terminal 54 using a routine called "TIOT". Flow chart of exemplary program control steps included in this TIOT routine is shown in FIGS. 11A-11D. This TIOT routine is the communications routine in the preferred embodiment that transmits signals to remote terminal 54 and receives signals transmitted by the remote terminal. The TIOT routine first determines whether only display is required (as is in the case of block 362 of FIG. 10) or whether central computer 52 is to receive numeric inputs from terminal 54 as well as provide a display. In the case of the FIG. 10 block 362 call to the TIOT routine, only a display is required and accordingly, the TIOT routine calls a further routine called TDISPLAYM to build an output a block of data which when received by terminal 54 will cause the terminal to display a desired display screen (in this case, the display will display the message "Welcome to First National Bank" or the like along with copyright message in the preferred embodiment) (block 402).

Figure 11A:
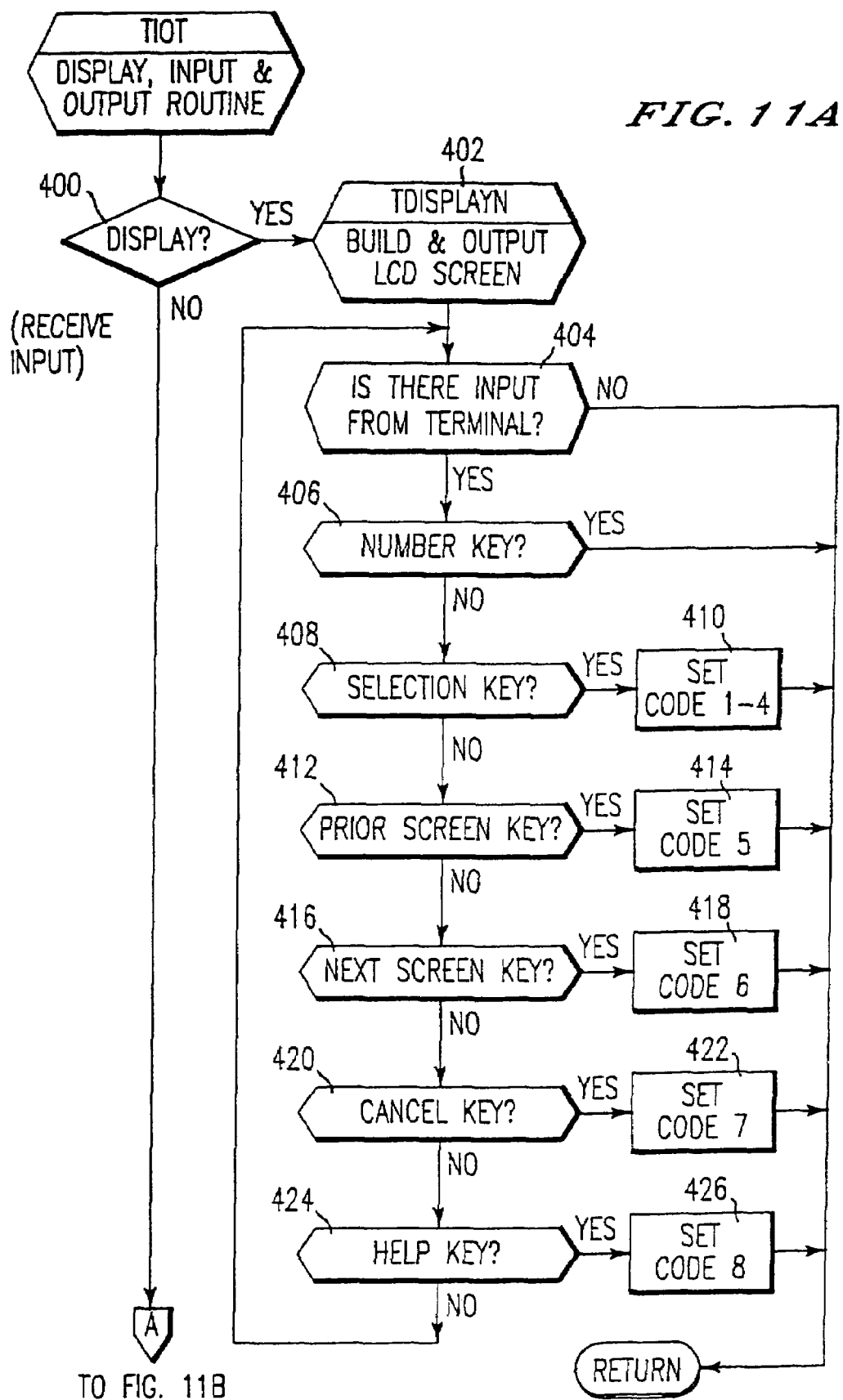
Figure 11B:
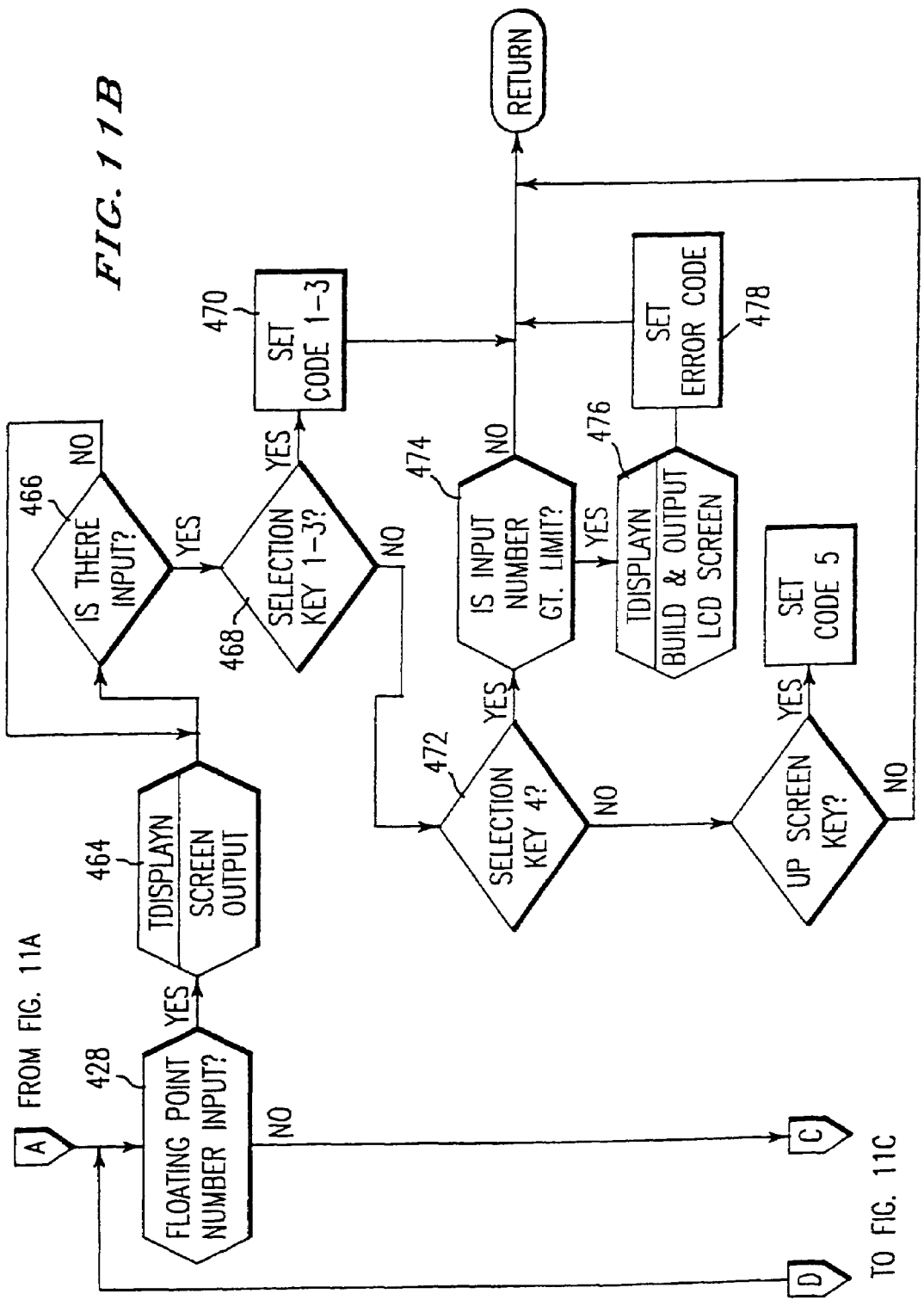
Figure 11C:
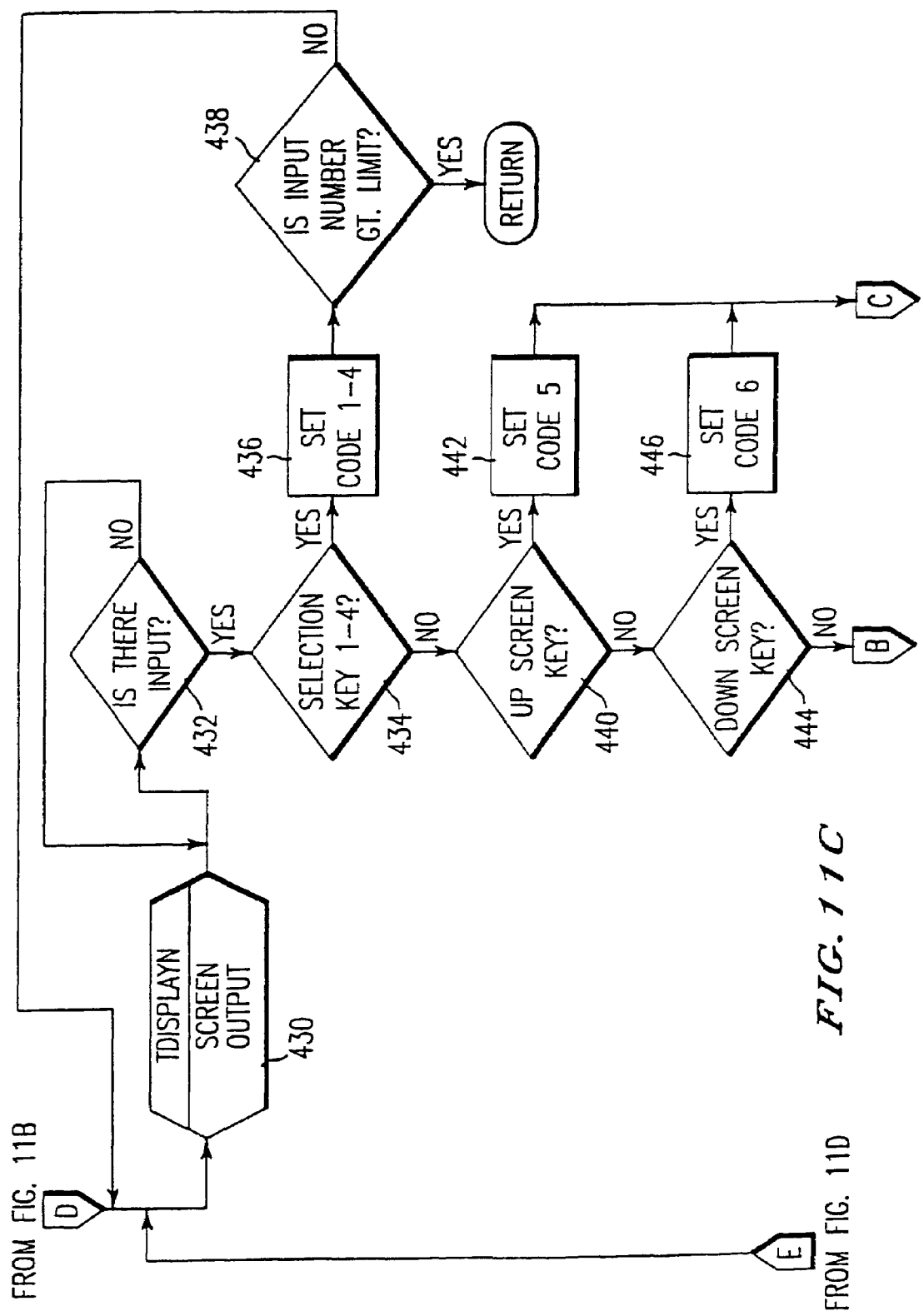
Figure 11D:
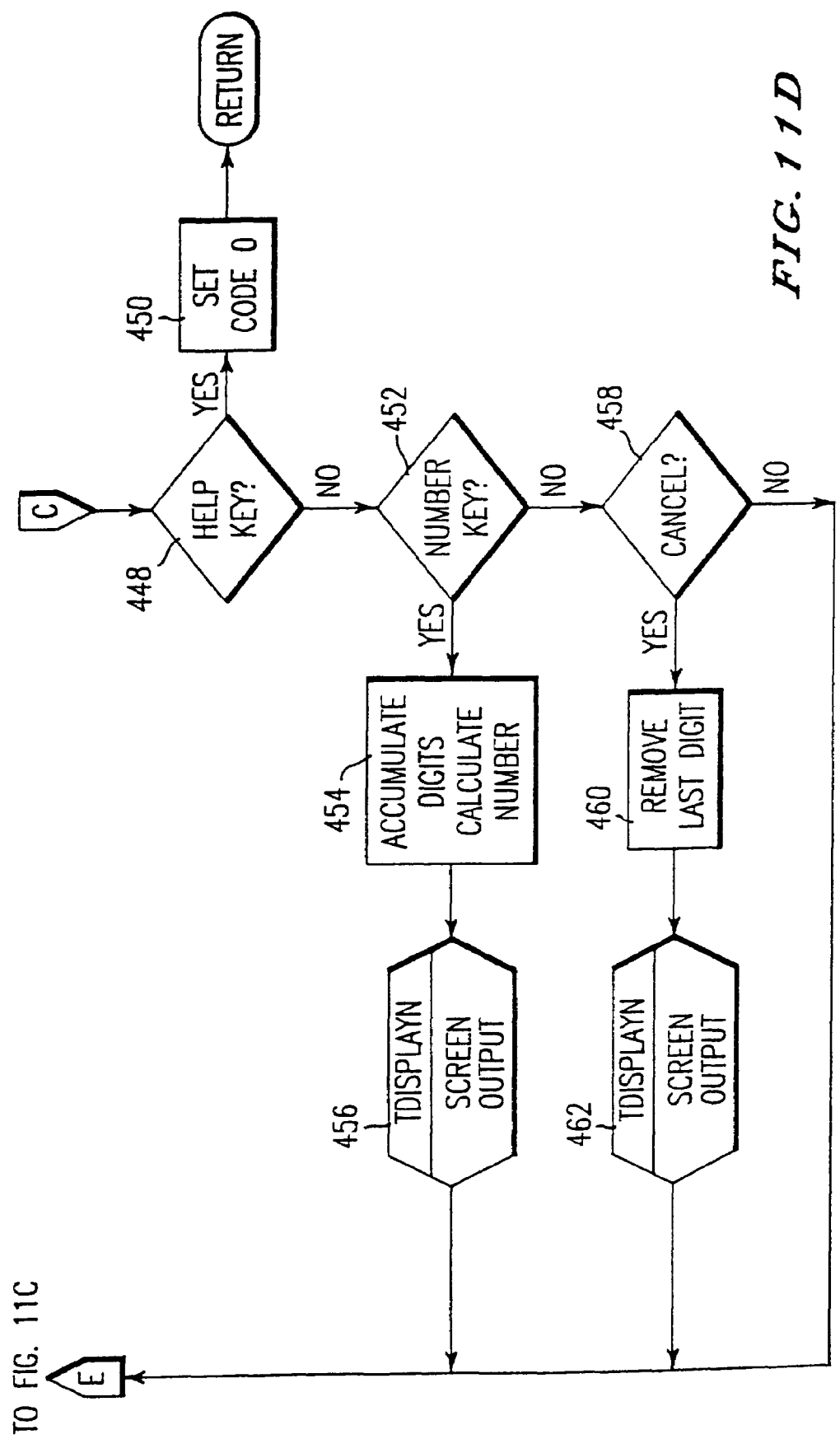
Figure 11E:
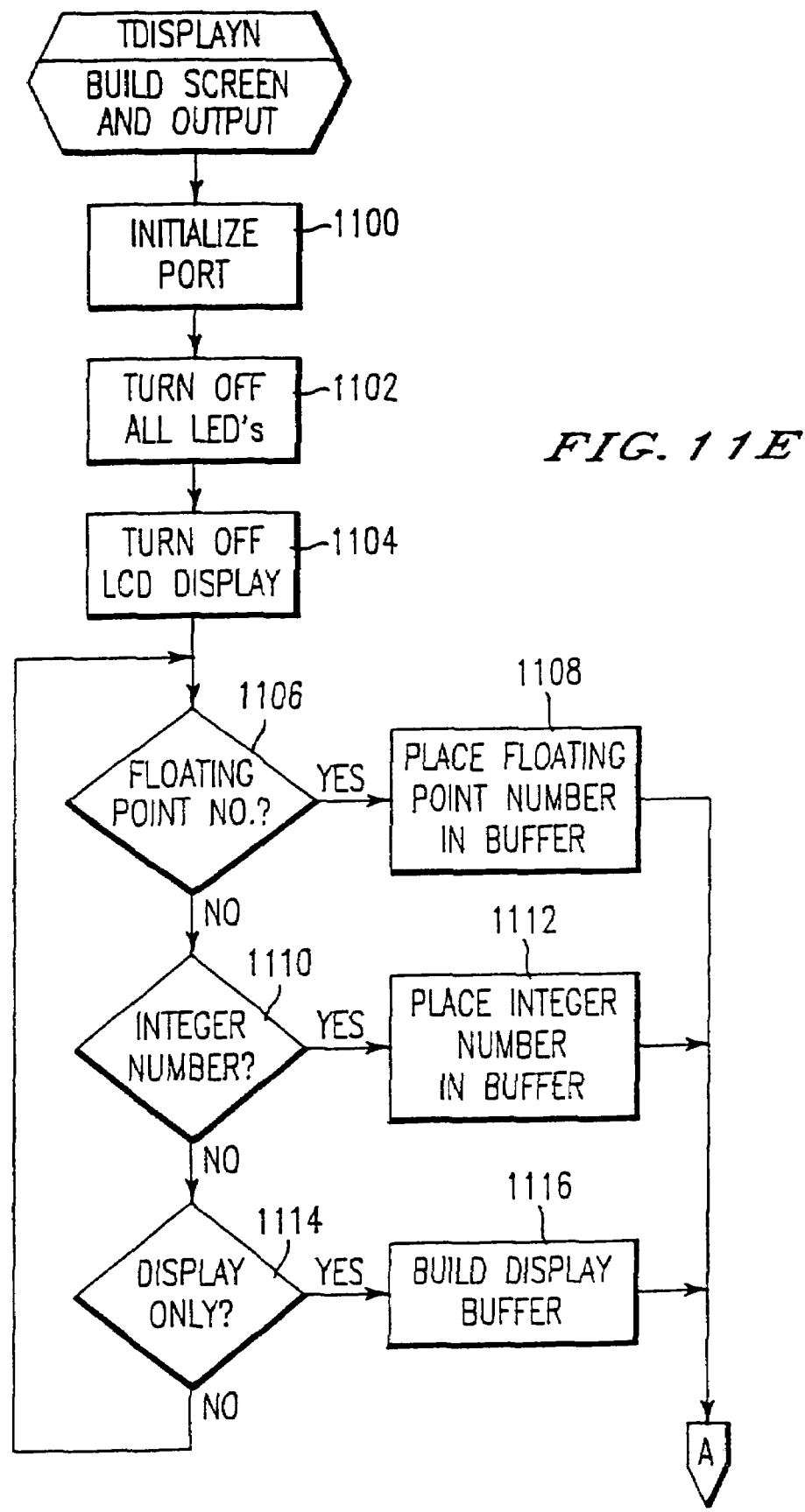
Figure 11F:
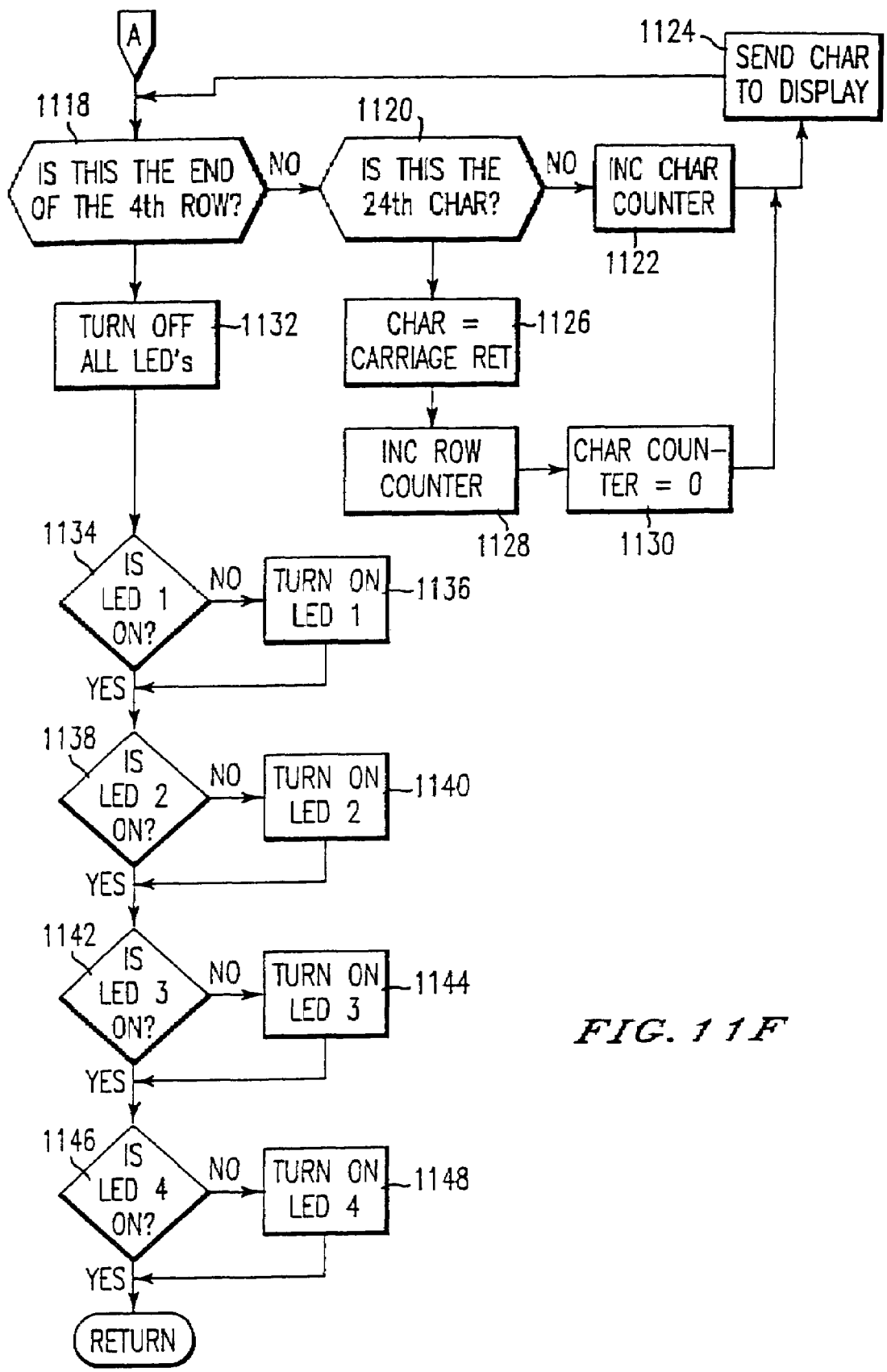

FIGS. 11E-11F are together a flow chart of an exemplary program steps performed by the TDISPLAYM routine in the preferred embodiment. This routine, which may be called directly from other portions of the central computer software (although it is typically called by the TIOT routine shown in FIGS. 11A-11D at, for example, block 402 of FIG. 11A) permits central computer 52 to control exactly what is displayed at any given time by remote terminal display 102. Briefly, central computer 52 fills a display buffer having the exact character length of the 4×24-character display 102 of terminal 54, and then communicates this buffer content through the PDN network 56 to the remote terminal 54. The contents of this buffer constructed by central computer 52 thus completely describes the status of display 102 (as well as LED prompt indicators 102a-102d) of remote terminal 54).

The following parameters are provided to the TIOT routine in the preferred embodiment:
Floating point/integer/display only;
State of LED 102a;
State of LED 102b;
State of LED 102c;
State of LED 102d;
Line 1 of text, first line displayed;
Line 1 of text, successive lines displayed;
Line 2 of text, first line displayed;
Line 2 of text, successive lines displayed;
Line 3 of text, first line displayed
Line 3 of text, successive lines displayed;
Line 4 of text, first line displayed;
Line 4 of text, successive lines displayed
Inhibit/enable pointer key 1;
Inhibit/enable point key 2;
Inhibit/enable pointer key 3;
Inhibit/enable pointer key 4;
Inhibit/enable CANCEL key;
Inhibit/enable HELP key;
Inhibit/enable NEXT key; and
Inhibit/enable PRIOR key.

To display a new display format on terminal display 102, central computer 52 first reinitializes formats the output for communication with the terminal 54 via PDN network 56 (block 1100), and then transmits appropriate control signals to remote terminal 54 controlling the remote terminal to blank LCD display 102 and to de-illuminate all LEDs 102a-102d (blocks 1102, 1104). In the preferred embodiment, central computer 52 transmits two types of characters to remote terminal 54 "characters to be displayed" and "control characters". In the preferred embodiment, the control characters may be preceded by an "escape sequence" to alert terminal 54 that the following character is a control character rather than a display character—or alternatively, control characters may all have formats different from displayable characters to permit terminal 54 to readily distinguish between the two types of characters. In the preferred embodiment, whenever remote terminal microcontroller 116 receives a control character, it interprets the control character rather than sending it to LCD display 102.

Central computer 52 then preferably obtains a template for the desired screen format to next be displayed (the name of this screen format is preferably passed to the display routine as a parameter either directly or indirectly and may be obtained from mass storage device 84) and stores this template contents in a screen display buffer having the exact length required to fully define all characters on the 4×24-character LCD display 102 of remote terminal 54. Certain templates have variable names embedded within them—and central computer 52 recognizes these variable names according to type (floating point or integer) and in response to the presence of these variables determines that the corresponding information must be "filled in" to complete the buffer contents. Preferably, the variable contents are already defined externally from the display routine, although the variable contents may be passed to the display routines in the form of additional parameters. Some exemplary templates are depicted in the APPENDIX, which shows an exemplary "script" of various remote terminal transactions using the remote terminal user interface provided by the system of the present invention.

If an embedded variable requires a floating point number to be filled in to the display format template (decision block 1106), central computer 52 obtains the appropriate value (depending upon the context in which a display routine was called) and inserts that information into the appropriate positions of the display buffer (block 1108) before transmitting the display buffer. Similarly, if an integer number needs to be filled in (decision block 1110), central computer 52 obtains the integer value and inserts that into the display buffer (block 1112). If no variables are embedded into the corresponding template, the screen format is termed "display only" format (decision block 1114) and central computer 52 simply builds the display buffer without inserting any additional variable information (block 1116).

Central computer 52 then transmits the buffer contents to remote terminal 54 beginning with the first character in the buffer and ending with the last buffer character in the preferred embodiment. Referring to FIG. 11F, the buffer is preferably structured as four rows with each row including 24 characters (and thus buffer thus constitutes a memory "image" of what is to be displayed on display 102).

Assuming that last row has not yet been transmitted (decision block 1118) and that the last character in the current row has not yet been transmitted (decision block 1120), a character count is incremented (block 1122) and the "next" character within the display buffer is transmitted to remote terminal 54 (block 1124). This process continues until the last character in the current row is reached (decision block 1120), at which time central computer 52 inserts a carriage return (block 1126), increments a row counter (block 1128) and resets the character counter (block 1130). When the end of the last row has been transmitted (decision block 1118), central computer 52 preferably generates commands for each of the four LEDs 102a-102d and transmits those commands to specify the states (on or off) of these LEDs (blocks 1132-1148). Preferably, such LED state information is stored with each display screen template (and/or may be provided at run time based on the current state of the program) so that the transmitted information fully specifies the states of the LEDs.

Referring once again to FIG. 11A, once the LCD display screen block is outputted (block 402), central computer 52 always checks the communications port to determine whether the user has depressed an input key (block 404). If an input key has been depressed, the TIOT routine decodes the data transmitted by remote terminal 54 to central computer 52 to determine which key was depressed (for example, number key depression is tested for by decision block 406, depression of selection keys 108 is tested for by decision block 408, depression of the NEXT key 106 is tested for by decision block 412, depression of the PRIOR key is tested for by decision block 416, depression of the CANCEL key is tested for by decision block 420, and depression of the HELP key 110 is tested for by decision block 424). A temporary storage location called "code" is set to an appropriate value corresponding to the key depressed by block 410, 414, 418, 422, 426 in the preferred embodiment, and the TIOT routine then returns to the calling routine (FIG. 10 block 364 in this case).

In the preferred embodiment, the user input decoding is simplified by specifying enabled and inhibited user inputs at the time block 402 causes terminal 54 to build a display (such specifying function may be performed, for example, by passing parameters to the TIOT routine specifying which user input key strokes are to be recognized and which key strokes are to be ignored). For example, certain display formats call upon the user to provide numerical data—and upon displaying such display formats central computer 52 may enable decoding of number keys by block 406 but disable decoding of all other (or certain other) keys. In the preferred embodiment, user depression of a temporarily disabled input key simply causes block 402 to control the terminal 54 to again display the same display format.

Referring once again to FIG. 10, once central computer 52 controls remote terminal 54 to display the "welcome" message it causes the terminal to display a further message indicating that the terminal is now secure (block 364). In the preferred embodiment, DES or RSA encryption techniques (or comparable) are used to secure the communications between remote terminal 54 and central computer 52. Upon successful securing of the communications stream in this manner, central computer 52 provides an output message to remote terminal 54 controlling the remote terminal display 102 to indicate to the user that the terminal is now secure.

Central computer 52 then determines from the terminal identification sent to it by the remote 54 whether the remote location at which the remote terminal is located has more than one user (decision block 366). For example, remote terminal 54 may be located in a household or business location including several individuals each having their own separate bank account. If the database information stored on mass storage device 84 indicates that the remote terminal 54 is assigned to more than one user (as tested for by decision block 366), central computer 52 solicits the identity of the particular user using the remote terminal by, for example, outputting a list of user names and controlling the remote terminal to display that name list on LCD display 102 (preferably also with appropriate control characters to cause the "select one" prompt to be illuminated on the remote terminal) (block 368). Central computer 52 then waits for the user to select one of the options listed. If the user responds with depression of one of select keys 108, the TIOT routine 408, 410 decodes the depression of these select keys. If the user does not depress one of these select keys 108 within a certain time period (or depresses one of keys 104, 106 instead), then central computer 52 concludes that the user does not appear on display 102 and that further user names need to be displayed) (decision block 370, block 368). The user may depress the NEXT key for display of other names.

On the other hand, if the user selects one of the listed names, central computer 52 determines whether the selected user has more than one bank account (e.g., by accessing the database stored on mass storage device 84) and if so, controls remote terminal display 102 to display a list of accounts (block 372), Central computer 52 then once again waits for the user to select once of those displayed accounts and/or displays further accounts corresponding to the same user if the user is unable to make a selection (decision block 374, 372).

Once central computer 52 has identified a user's bank account, the TIOT routine is called to request the user to either his or her ATM (PIN) number (and preferably also lights up the "Enter Number" prompt at this time). The TIOT routine then receives the user input from terminal 54. Referring once again to FIGS. 11A-11D, if input is to be received (the "No" branch decision block 400), central computer 52 determines whether a floating number input is desired (e.g., dollars and cents such as $301.26) (block 428). Upon this call to the TIOT routine, however, no floating point number input is desired and therefore the routine TDISPLAYM is called to display the PIN number user prompt (block 430). Central computer 52 then waits for user input from remote terminal 54 (decision block 432) and decodes the response of user input at decision block 432, 434, 440, 444, 448, 452, 458. Upon the current call of the TIOT routine, the respective input (and in fact, the only valid input) is depression of number keys of keypad 114 (decision block 452). As the user depresses keys to keypad 114 indicating his PIN number, central computer accumulates the digits and calculates the received number (block 454). A validity check is preferably also included in block 454 at least in some context (e.g., to ensure that the desired value is of the proper length). In some situations, a further block 456 may control terminal 54 to display an appropriate positive feedback message acknowledging receipt of the entered number so that the user is satisfied that the number he has keyed in was received by central computer 52.

Referring once again to FIG. 10, decision block 378 tests whether four PIN digits have been entered and may also performs a validity check to ensure that the 4-digit (or other prearranged number greater or less than four digits) PIN number entered corresponds to the identified account number (block 378; or alternatively, this validity check may be performed by the bank when an ATM/POS message is sent to the user's bank affecting this account). If the inputted PIN number does not correspond, one or more retries may be permitted before central computer 52 disconnects telephone connection with remote terminal 54.

On the other hand, if the inputted number is valid, central computer 52 transmits advertising or messaging text to remote terminal 54—this advertising text preferably being targeted to a specific user or user group (block 380). Specifically, in the preferred embodiment, the user database stored on mass storage device 84 includes demographic and other information about each user, and central computer 52 may be appropriately programmed to transmit different advertising text to different users. Thus, for example, all users having a bank account with a particular bank and who owned homes (detected by mortgage payments or a lack of rental payments in the database) may be sent advertising text pertaining to home equity loans, while users renting apartments (detected from the rental payments in the database) may be sent advertising pertaining to personal loans or automobile loans instead. Of course, the content of the advertising is arbitrary and might be used to advertise any good or service. Moreover, the advertisement can be communicated and targeted to particular users without release of confidential user information to the advertiser (until the user authorizes such release as described below).

Central computer 52 then preferably sends an additional display screen to remote terminal 54 asking the user whether he wants additional information (block 382) via an additional call to the TIOT routine. Preferably a 3-second time response is initiated at this point so that if the user does not respond within three seconds the central computer goes on and executes return 386 to the FIG. 9 main routine. If the user responds with a "yes" response (i.e., by depressing the appropriate one of select keys 108 "pointing to" a line of information displayed on display 102 indicating "yes" response), central computer 52 stores the user address and other appropriate information into a file which is sent (e.g., electronically via a dialup line) to the user's bank (or other advertiser) so that the advertiser can directly contact the user by mail, telephone (perhaps using autodial to get immediate access to the user after he terminates his terminal session) or otherwise to provide additional information about the advertised service or merchandise (block 384). On executing return block 386, the main menu routine is called to permit the user to select financial transactions to be performed (see FIG. 9, block 388). A flow chart of exemplary program control steps included in this main menu routine is shown in FIG. 12.

Figure 12:
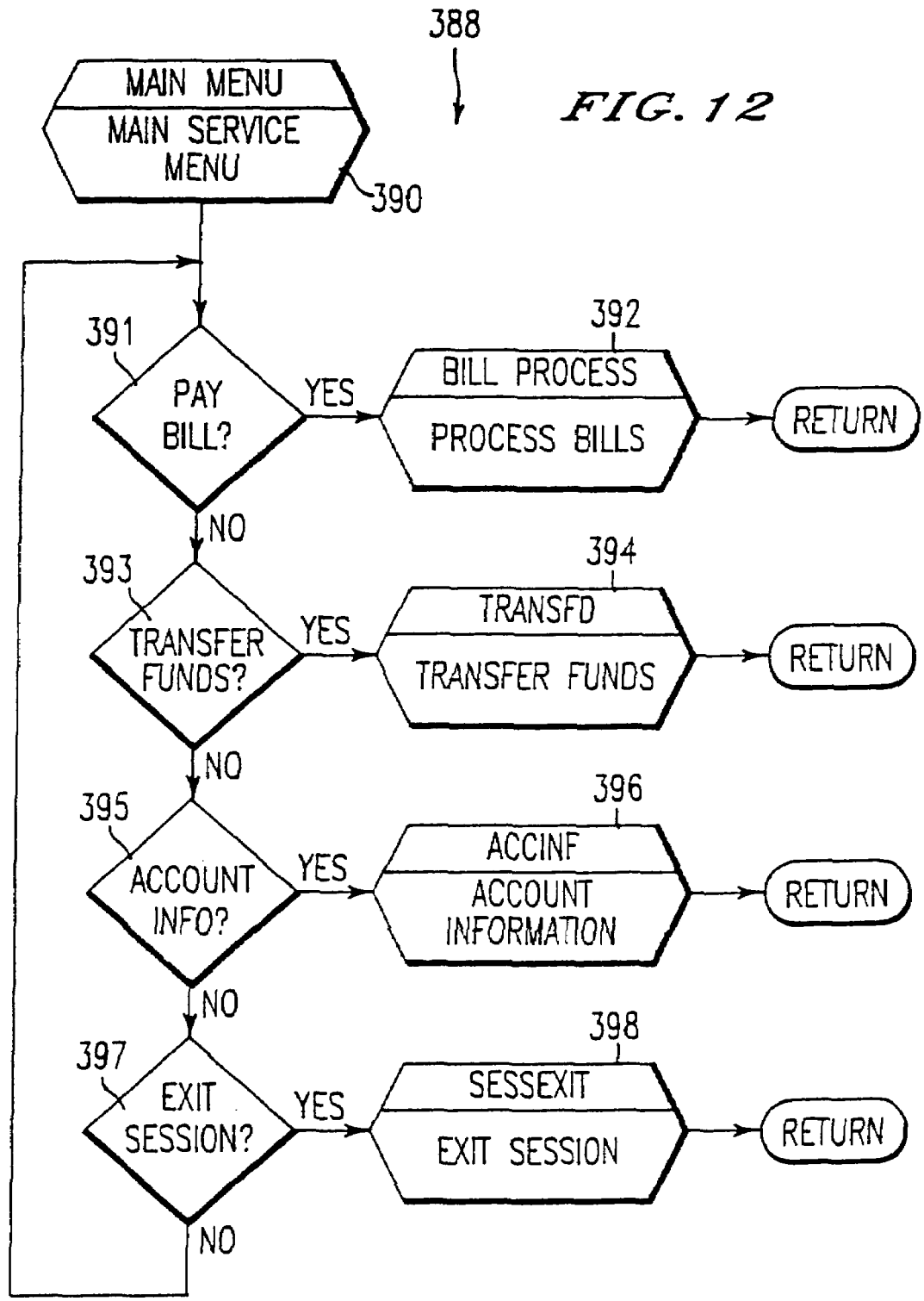

Main menu routine 388 causes remote terminal 54 to display a "main menu" (preferably using via a call to the TIOT routine) (block 390, FIG. 12). This main menu display screen lists four options in the preferred embodiment: pay bills; transfer funds; get account information; and exit account session (see FIGS. 3 and 4, which each depict preferred embodiment terminal displaying the main menu). The main menu provides some options of the type users are used to seeing at ATMs (e.g., transfer funds, get account information) as well as additional options not available on an ATM (e.g., pay bills). The user is then expected to press one of select keys 108 to select one of the four displayed options (the "Select One" prompt is preferably illuminated to prompt the user to depress one of pointer keys 108 pointing to the displayed option he would like to select). User selections are received using the TIOT routine and decoded with main menu routine 388 (decision blocks 391, 393, 395, 397). In the preferred embodiment, the number of main menu options available for user selection is limited to four—that is, by the number of different lines of text that may be simultaneously displayed by display 102. Each main menu option then has additional "suboptions" which are displayed sequentially after the user selects the desired main menu option (as will be explained shortly).

Figure 13:
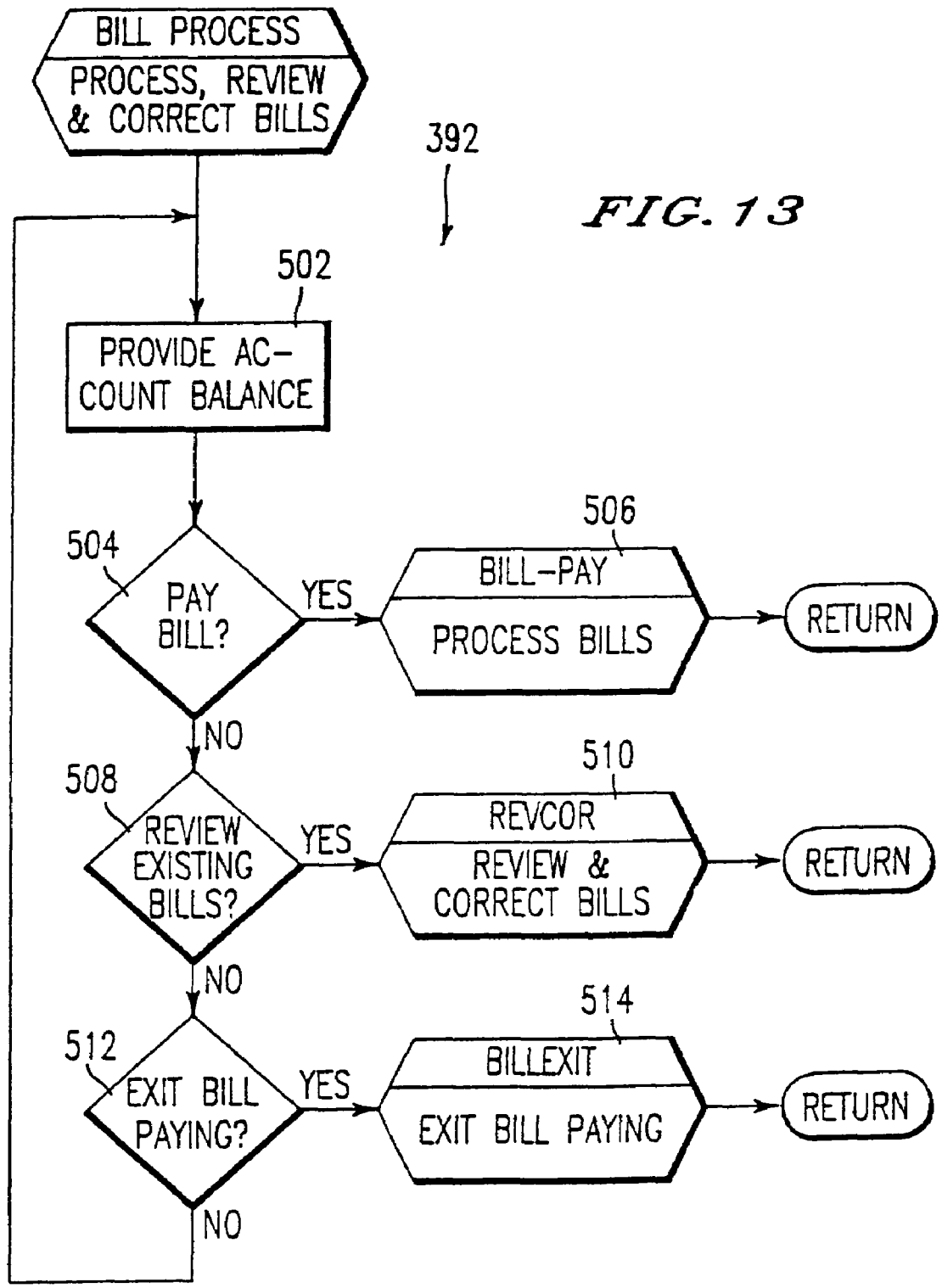

If the user selects the "pay bill" option (decision block 391), central computer 52 executes the "bill process routine" (block 392), a flow chart of which is shown in FIG. 13.

Referring now to FIG. 13, the "bill process" routine 392 performs the function of processing, reviewing and correcting billing information—and also permitting the user to electronically request funds to be debited from his bank account and used to pay bills to particular desired creditors on specified dates. Upon selecting the "pay bill" main menu option, bill process routine 392 may provide account balance information to the user by forming a standard account balance ATM or POS type message (or possibly using a "null" POS debit message) containing the user's account number and PIN and transmitting this request over the ATM network to the user's bank; receiving the user's account balance from the user's bank over the ATM network in the form of a return ATM message; reformatting this received account balance information; and transmitting the account balance to the remote terminal 54 using the TIOT routine discussed earlier (block 502). Central computer 52 may also temporarily store this account balance in the preferred embodiment for purposes of keeping a running total, as will be explained.

In the preferred embodiment, central computer 52 appears on the ATM network as simply another ATM machine or POS node—and uses the same standard messaging formats used by ATM machines and POS terminals to obtain and receive information from the user's bank. Included in the ATM/POS communications format/protocol standard used by the ATM interchange network described previously is a command format to request account balance information. Central computer 52 generates such an account balance request using the account number (and preferably also the user PIN number) provided by the user earlier, then receives from the ATM network a response containing the account balance pertaining to the user's bank account. Since this account inquiry request generated by central computer 52 "looks like" a request generated by any ordinary ATM or POS device, the user's bank's data processing system and the ATM network are capable of handling this request in a routine, ordinary way (and no software changes at the bank's end are required to respond to such messages).

In the preferred embodiment, the account balance information obtained from the ATM network is provided to the user in the form of a display on remote terminal display 102 and is also stored in the memory of central computer 52 to enable the central computer to automatically inhibit the user from attempting to disburse more funds than he has available. The bill process routine 392 then controls remote terminal 54 to display a "submenu" providing the user with three options: pay new bill; review and correct payments; and exit bill paying. Bill process routine 392 then waits for the user to select one of the three options by depressing one of terminal select keys 108.

The user selections are decoded by decision blocks 504, 508, 512 and corresponding routines 506, 510, 514 are called in response. For example, if the user depresses the upper selection key 108 in the preferred embodiment (pointing to the option "pay new bill" or "pay another bill"), bill process routine 392 calls a further routine 506 called "bill pay" a detailed flow chart of exemplary program steps of which is set forth in FIGS. 14A-14C.

Figure 14A:
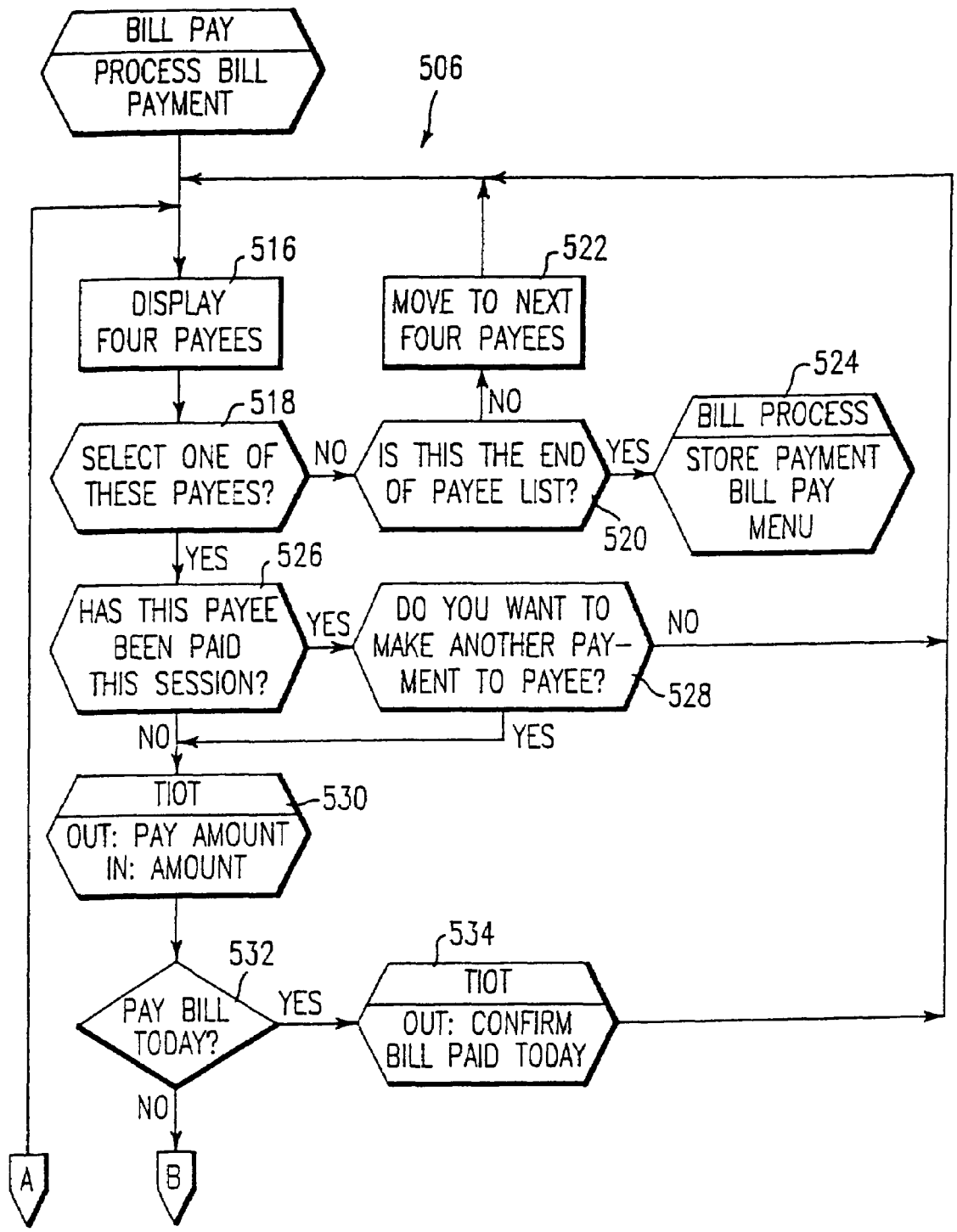
Figure 14B:
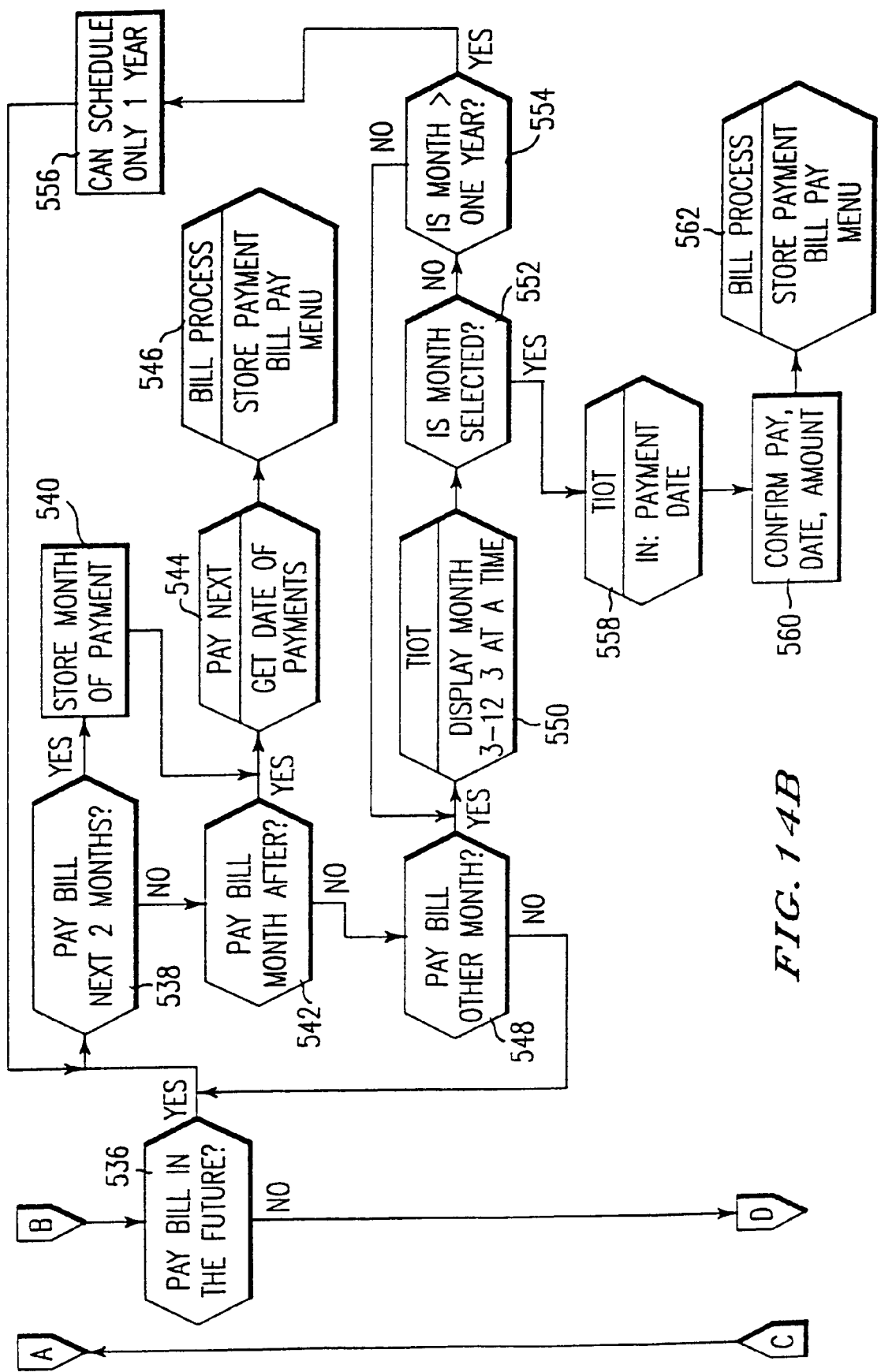
Figure 14C:
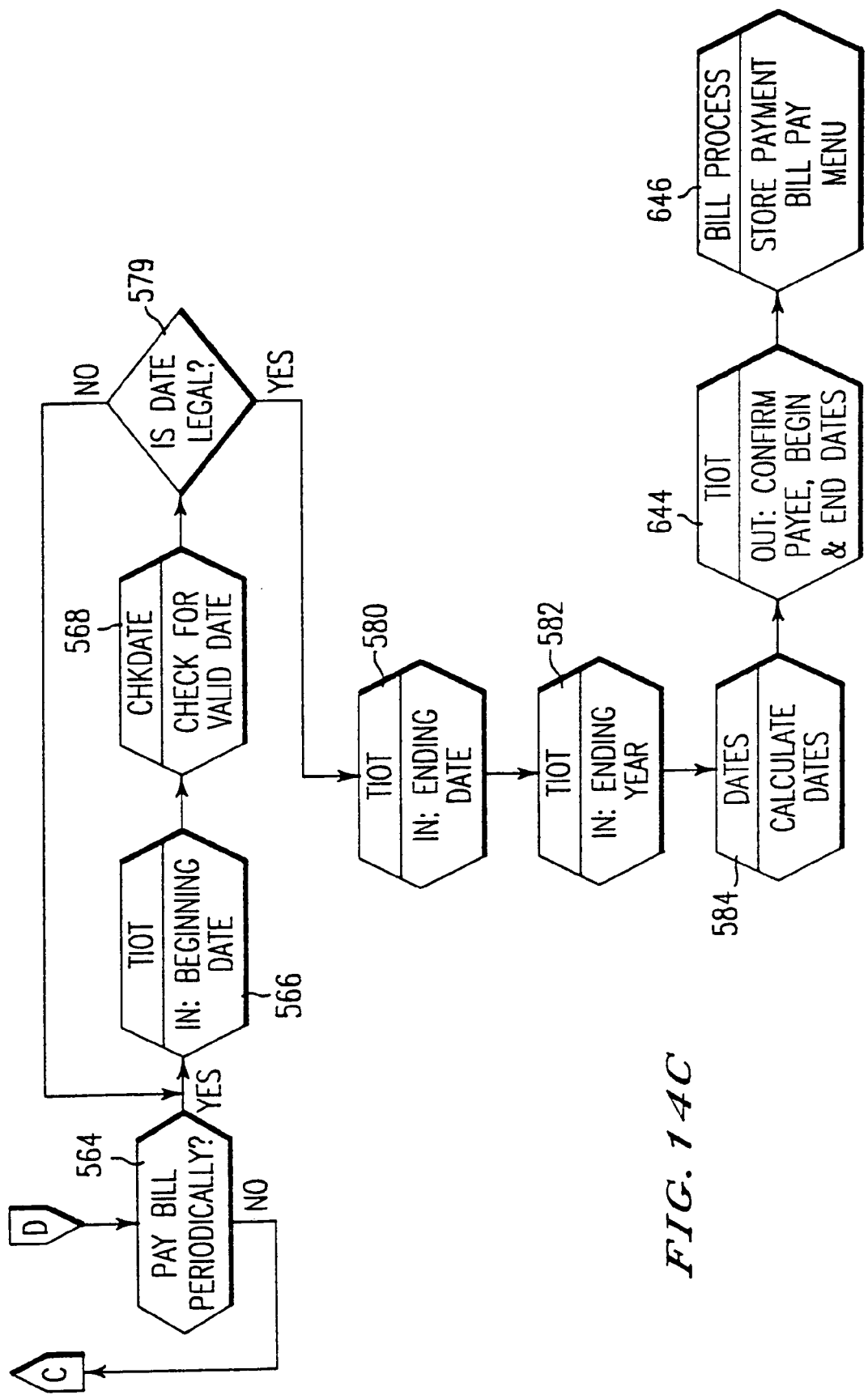
Figure 14D:
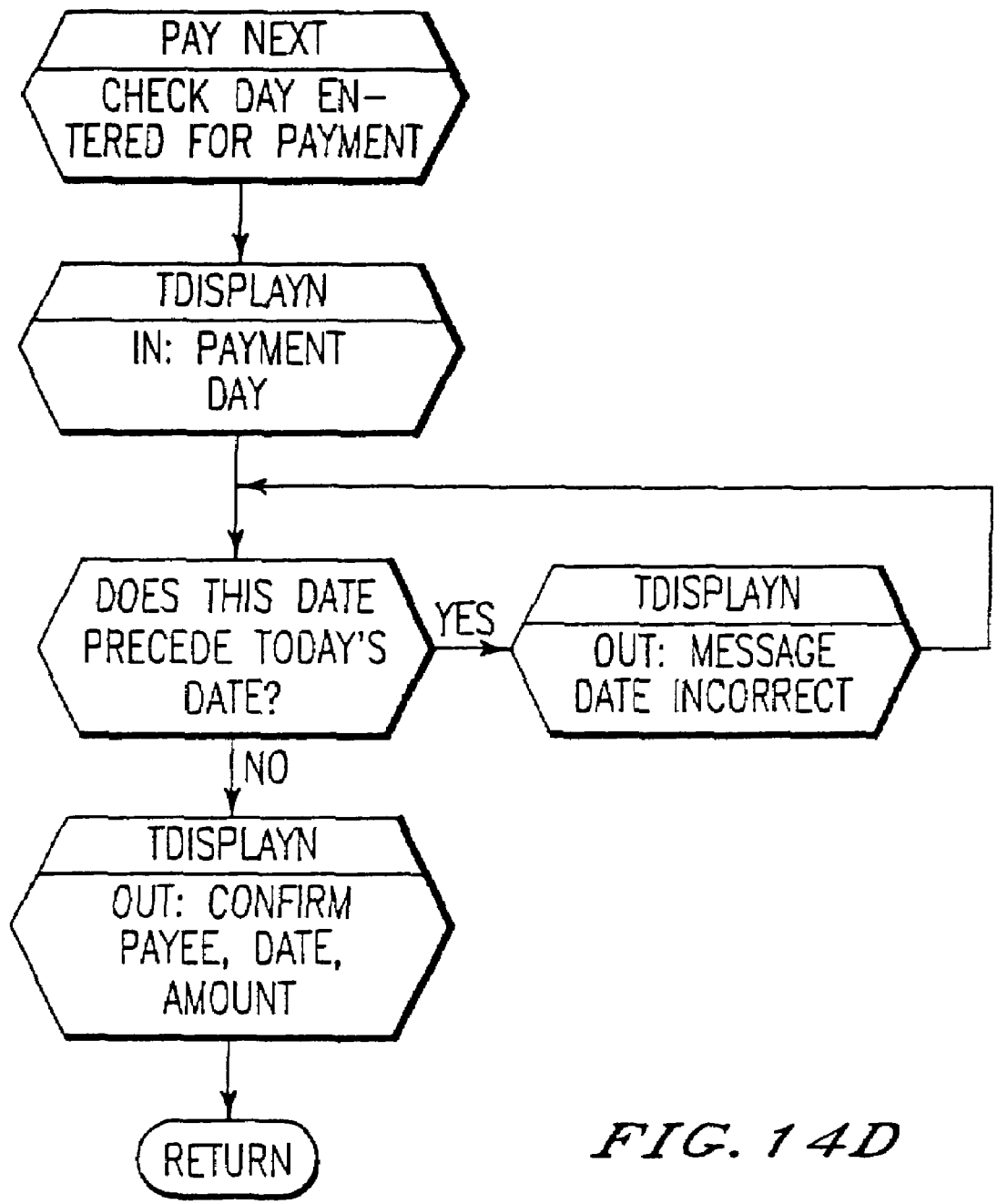

Referring now more particularly to FIGS. 14A-14C, the "bill pay" routine 506 processes bill payments by controlling remote terminal 54 to display a list of payees and also controlling the remote terminal to light up the prompts, the "Select One" prompt "Or" prompt, and the "Change Screen" (i.e., by sending appropriate control characters to remote terminal 54 to cause those various prompts to become illuminated simultaneously). In the preferred embodiment, the user is asked through direct mailings (or in certain cases by telephone) to provide, ahead of time, the names, addresses, account numbers, and other information specifying payees he wishes to pay bills to electronically (the user is also asked for other relevant account information for other services such as funds transfers). Generally, most people pay a vast majority of their monthly bills to the same payees every month. For example, recurring monthly bills are typically received from utility companies (gas, telephone, electric), the mortgage company or landlord, lenders, credit card companies (AMEX, Mastercard, Visa), department stores, state and local government authorities (e.g., city or county taxing authorities), etc. Therefore, the user is typically able to define beforehand the dozen or two dozen payees to which he sends recurring payments on a monthly or other periodic basis. Such user-specific payee information is stored by central computer 52 on mass storage device 84 and is accessed by FIG. 14A block 516 to display a list of payees. If desired, the initial listing displayed by block 516 may constitute a listing of categories of payees rather than individual payees (although in the preferred embodiment an actual listing of payees is displayed initially).

As mentioned previously, the preferred embodiment remote terminal display 102 is only capable of displaying a limited number of lines of text simultaneously (e.g., four). In the preferred embodiment, a different payee is displayed on each of these lines to permit the user to select a desired payee by depressing one of select keys 108 pointing to the displayed payee name. Generally, then, a particular user will have a longer list of payees than may be displayed on display 102 simultaneously. If the user does not select one of the displayed payees (e.g., by either not depressing one of select keys 108 or by pressing the PRIOR or NEXT key 104, 106) (as tested for by decision block 518), central computer 52 attempts to display the "next" or "previous" 4-payee sublist of the user's payee list (decision block 520, 522, 516). Thus, blocks 516-522 may be visualized as defining a 4-line long "window" scrolling up and down through a user payee list that may be of any desired length. If the user reaches the end of his payee list without making a payee selection, block 524 is programmed to return to the beginning of the bill process routine 392 shown in FIG. 13.

When decision block 518 determines that the user has selected one of the displayed payees, central computer 52 determines whether the user has already paid a bill to this same payee in the current remote terminal session (block 526). In the preferred embodiment, the result of a given remote terminal bill paying session is an output file containing all of the requested financial and other transactions generated during the terminal session. Only after the session is complete in the preferred embodiment is the output file processed by central computer 52 to effect the various user requests. In the preferred embodiment, decision block 526 scans through the output file to determine whether the user has already requested a transaction with respect to the currently selected payee, and if so, controls remote terminal 54 to display a prompt asking the user whether he wishes to make another payment to the same payee (block 528). In this way, the user must consciously decide to make multiple payments to the same payee and central computer 52 thus prevents the user from inadvertently making a double payment he did not wish to make.

The "bill pay routine" then requests further information from the user regarding the amount to be paid to the selected payee by calling the TIOT routine (block 530). referring now once again to FIG. 11B, central computer 52 may control display terminal 54 to display a prompt or other information (e.g., a prescheduled amount or information regarding the last payment made to this particular payee), and then awaits user input (blocks 464, 466). The user is permitted to enter the amount to be paid (the user inputs this value without the decimal point by striking keys or keypad 114 in the style of ATM data entry). When the user has entered an amount he depresses selection key number 4 (block 472) and the number is compared to a maximum permissible limit (block 474). If the amount entered is within limits (central computer 52 expects a floating point value, generally at least three numerical digits) the routine returns; otherwise, the display is output (block 476) with a blank line and an error code is set (block 478) and then the routine returns. During number entry, the user may depress the CANCEL key at any time to "delete" or "undo" the last number keyed in, and central computer 52 will in response send a new screen showing the numerical value the user has keyed in minus the deleted digit.

Referring once again to FIG. 14A, the central computer 52 then causes remote terminal 54 to display to the user a prompt asking whether the user wishes the bill to be paid today or in the future (decision block 532). If the user responds affirmatively (e.g., by depressing an appropriate one of select keys 108 pointing to a "Today" dataline displayed on display 102), this information along with the amount of information required by block 530 is logged to the temporary output file and a confirmation message is sent for display by terminal display 102 (preferably indicating the date, the payee and the amount along with the message "confirmed for today") (block 534). If, on the other hand, the user responds "Future" to the question, central computer 52 asks the user whether the bill is to be paid in the future (decision block 536). Through successive such user prompts (some prompts possibly providing multiple options to reduce the total number of prompts that must be displayed by terminal display 102), decision blocks 538, 542, 548 determine the time period the user wishes the bill to be paid. For example, in the preferred embodiment, if the user wants the bill to be paid in the future, computer 52 may cause remote terminal 54 to display a listing of the succeeding two months (e.g., if the current month is September, terminal display 102 may display the month of October and November along with additional options such as "other months" and "periodically"). The user may select one of the displayed options by depressing the appropriate one of select keys 108 "pointing to" the displayed option he desires.

If the user selects one of the displayed months, central computer 52 logs the payment in its output file which it will eventually add to a scheduled transaction log so that the payment will automatically be processed on the appropriate day (blocks 538-546). If the user wants to schedule bill payment for some other month, on the other hand, (decision block 548), central computer 52 may prompt the user by displaying month names three at a time until the user selects one of the displayed months (blocks 550-552). If the user selects a month that is more than a year away, the instruction is ignored and terminal display 102 displays a message that system 50 can only schedule initial payments within the current year (decision block 554, 556). The preferred embodiment does, however, permit users to schedule non-initial (i.e., periodic) payments beyond one year into the future. Otherwise, central computer 52 causes terminal display 102 to display a confirmation message indicating the amount, payee and month, and then obtains the day of the month from the user at block 560. Control then returns to bill process routine 392 so the user may either pay another bill, review existing bills constructed to be paid, or exit the bill paying function (block 562).

Referring now to FIG. 14C, if the user wants the bill to be paid but does not want the bill to be paid today or at a date in the future, then central computer 52 permits the user to schedule periodic bill payment (decision block 564). To schedule periodic bill payment, central computer 52 controls terminal display 102 to display a prompt "start paying bill on" and then expects the user to fill in the month day and year that periodic bill paying is to begin (block 566).

Figure 15:
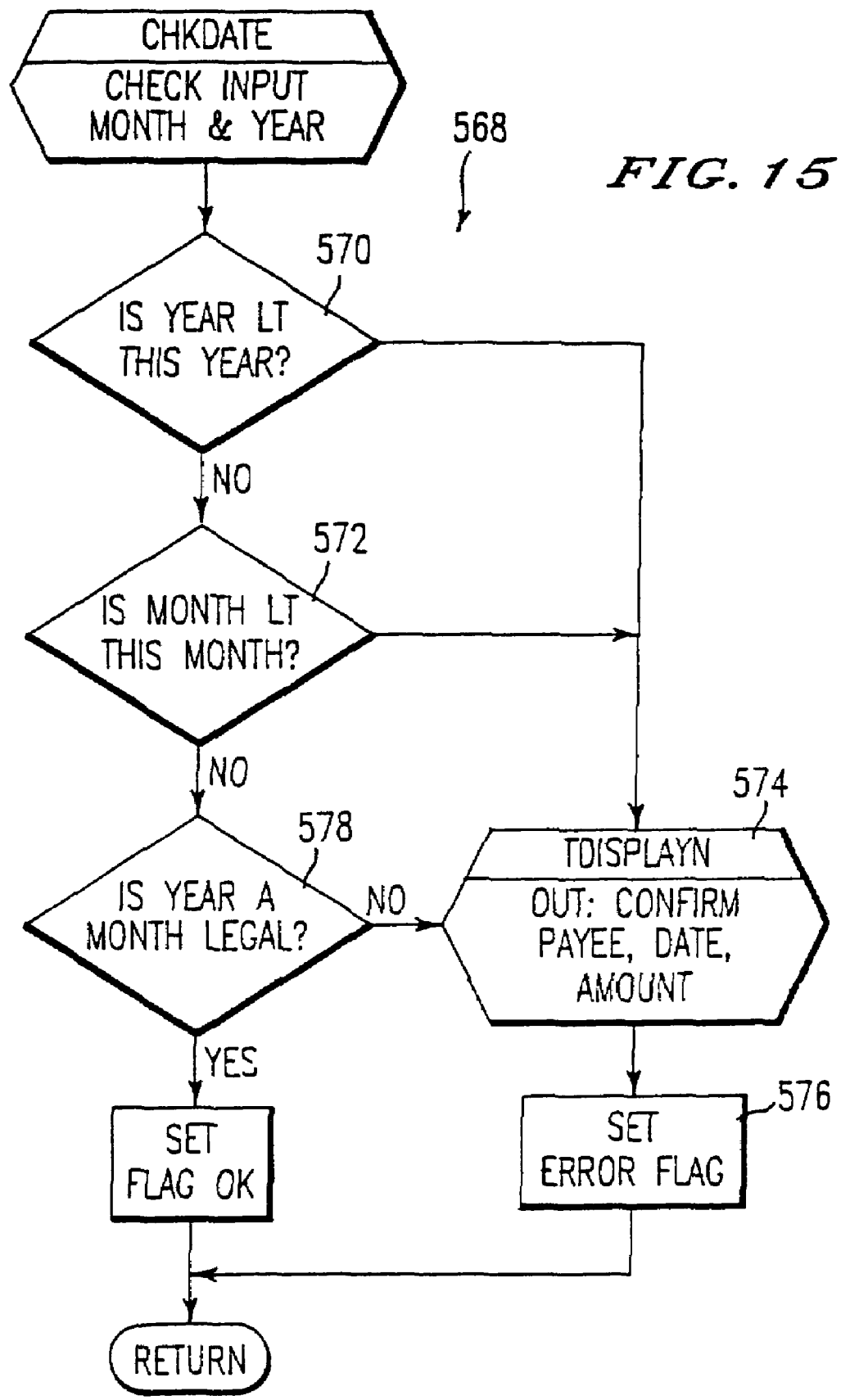

A routine called CHKDATE is then called at block 568 to check for a valid user inputted date (e.g., a date that is equal to or later than today). FIG. 15 is a flow chart of exemplary program control steps included within the CHKDATE routine 568.

Referring now more particularly to FIG. 15, central computer 52 determines whether the inputted year is later than the current year and also checks whether the inputted month is later than the current month if the year is the current year (decision blocks 570, 572). In the preferred embodiment, scheduled bill payments can begin in any month of any year but cannot begin in the past. If the user requests an invalid data to begin periodic payments, central computer 52 controls terminal display 102 to display an error message (block 574) and sets an error flag (block 576). Similarly, block 574 displays an error message if a subsequent validity check on the year and month inputted indicates that the year and month are not "legal" (as tested for by decision block 578). A flag is set upon entry of such an "illegal" date (i.e., a date in the past) and the user is given the opportunity to enter a correct date upon return to calling routine.

Thus, the results returned by the CHKDATE is a date flag (which indicates whether or not a valid date was inputted or not) and a date to begin periodic payments.

Once a valid start date for scheduling periodic payments has been received by central computer 52 (decision block 579 of FIG. 14C checks the flag returned by the CHKDATE routine to ensure the date is legal), the central computer controls terminal 54 to provide a prompt indicating an ending date in terms of day and year (block 500, 502). In addition, central computer 52 requests the user for additional information regarding the recurrence of the scheduled payments (e.g., weekly, semi-monthly, monthly or other; block 584). Once the required information has been obtained by central computer 52, the central computer calculates each date on which a scheduled payment is to be made (block 584) calling the DATES routine a detailed flow chart of which is shown in FIGS. 16A-16B.

Figure 16A:
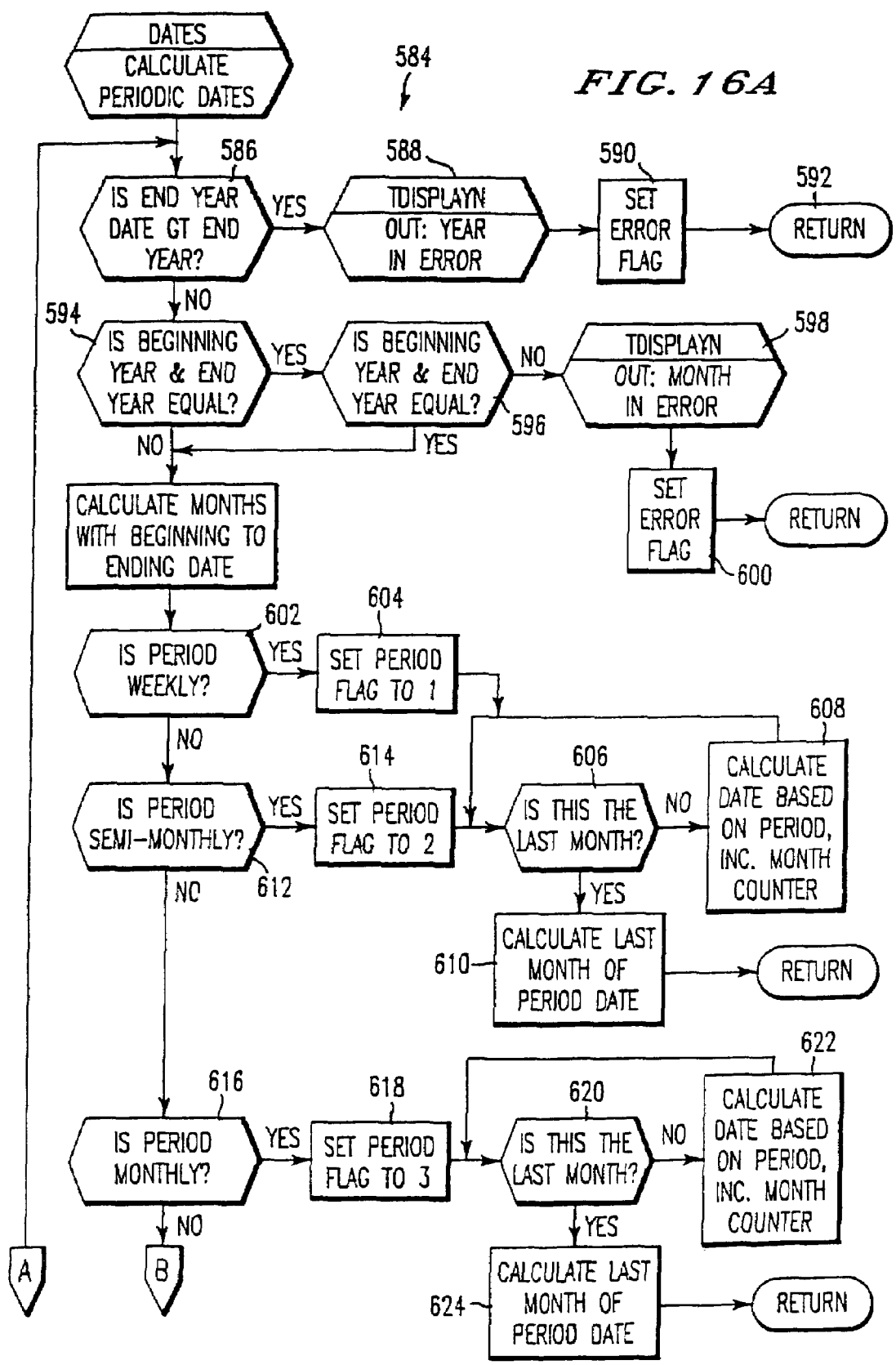
Figure 16B:
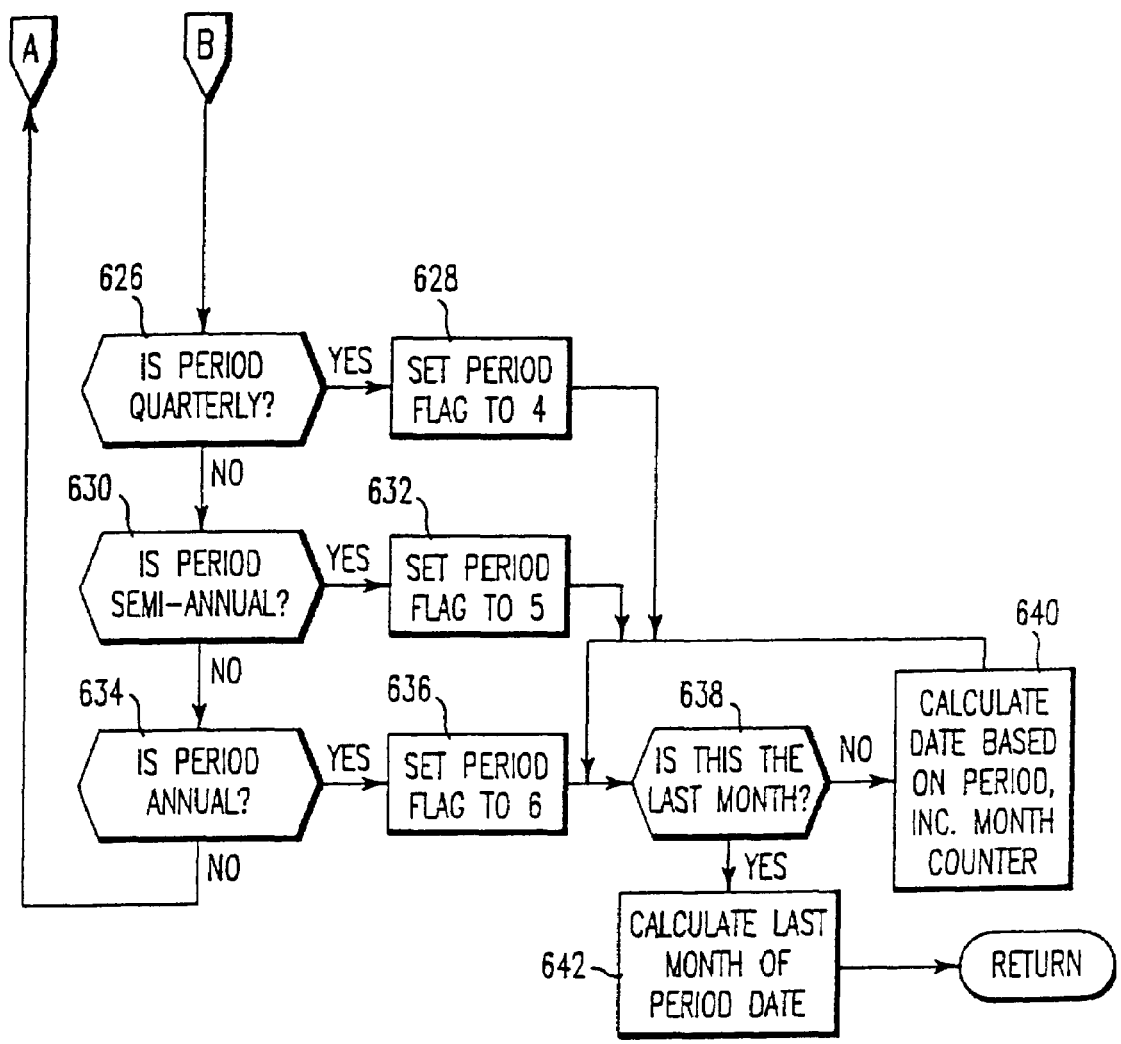

Referring now more particularly to FIGS. 16A and 16B, dates routine 574 calculates periodic dates based upon user-inputted data—and thus allows the user to schedule recurring payments (e.g., loan or mortgage payments, installment payments, etc.).

As mentioned previously, FIG. 14C blocks 556, 580 and 582 obtain from the user the beginning to start the periodic payments and the ending date for ending payments. Routine 584 shown in FIGS. 16A-16B calculates each of the scheduled periodic payments from this inputted information along with a further input solicited from the user specifying the frequency of the periodic payment (e.g., monthly, weekly, semi-monthly or other periodicity). Decision 586 first confirms that the end data is later then the beginning date (decision block 586). If this validity check fails, an error message is displayed on terminal display 102 (block 588), an error flag is set (590) and a return to the calling program is performed (block 592). Assuming the end date is valid, then routine 584 determines whether the beginning year and the ending year are equal to one another (decision block 594) and if so, whether the beginning month is before the ending month (decision block 596). If the beginning and ending year are equal and the beginning month is not prior to the ending month, then the user has attempted to schedule payments beginning later than they end and an error message is output and an error flag set (block 598, 600). Assuming the beginning day-month-year and the ending day-month-year dates are correct, routine 584 then calculates each payment date within that time span based on whether the payments are scheduled weekly, semi-monthly, quarterly, semi-annually or annually (blocks 602 and on).

The manner in which the schedule of payments is calculated is similar regardless of the frequency of occurrence of the payments. For example, if the period is weekly (as tested for by decision block 602), a flag is set to indicate the periodicity (block 604) and then each of the individual payments are calculated (blocks 606-610). Routine 504 determined whether the current month/week is the last month/week scheduled for payment (decision block 606), and if not it calculates the next payment date by incrementing a date based on the beginning payment date by the number of days specified in the period (block 608). Blocks 606, 608 are performed repetitively until the end date is approached, at which point the last payment date is calculated (blocks 610). The counting is performed using calendar information stored on mass storage device 84 so that payments are not scheduled on invalid days (e.g., the 31st of February or on bank holidays). Blocks 612-614, 606-610 similarly calculate biweekly payments; blocks 616-624 calculate monthly payments; and blocks 626-642 calculate quarterly, semiannual and annual payments as will be understood.

Referring once again to FIG. 14C, after the dates have been calculated a confirmation message is generated confirming the payee begin and end dates that have been encrypted (block 644) and the bill process routine shown FIG. 13 is called (block 646) to provide the user with the option of paying an additional bill, reviewing the existing bills, or exit the bill paying function.

Referring once again to FIG. 13, the user may select to review and correct bills by selecting an option from the "bill process" menu described earlier. This user selection (tested for by decision block 508) causes central computer 52 to call the REVCOR routine 510 a flow chart of which is shown in FIGS. 17A-17C.

Figure 17A:
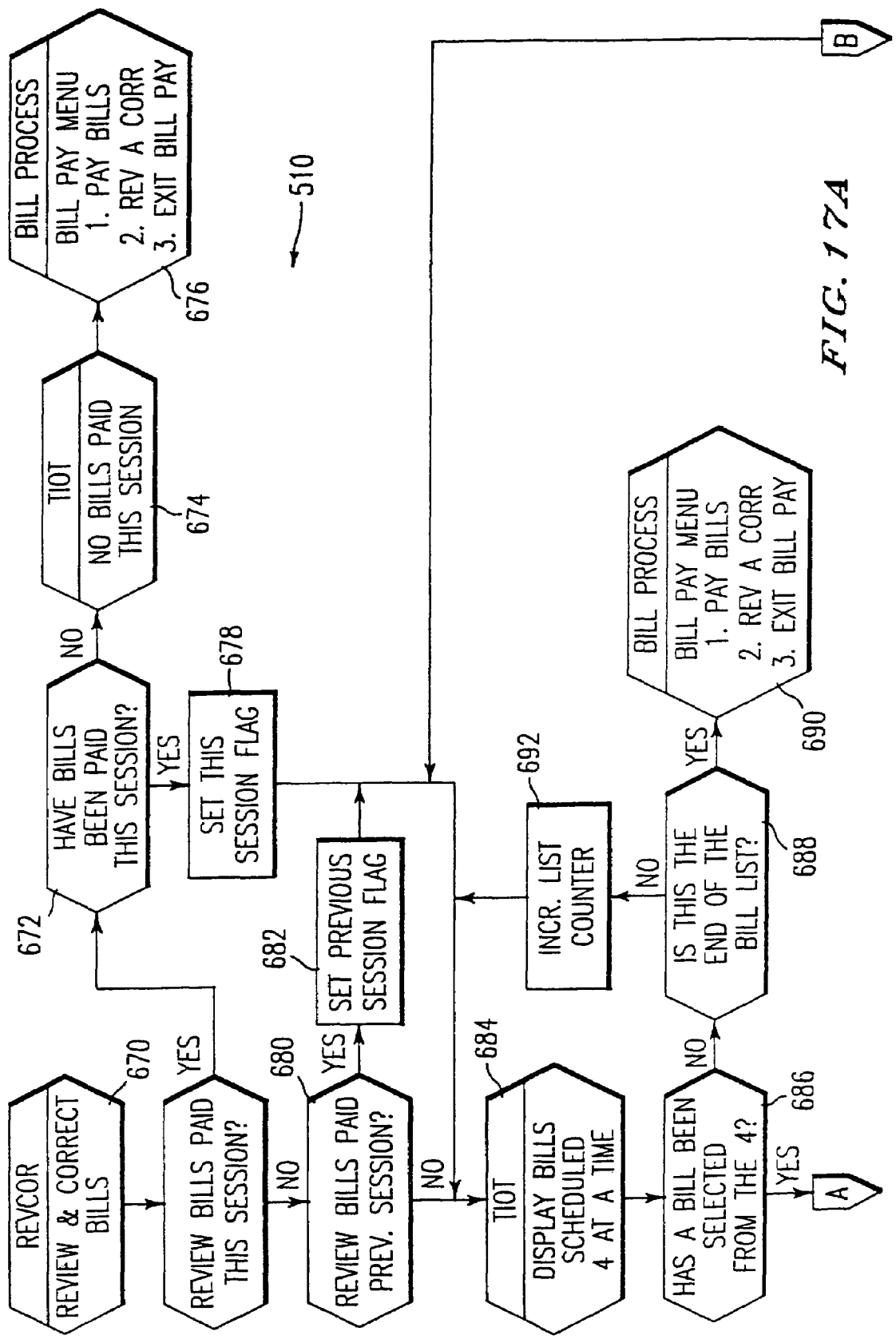
Figure 17B:
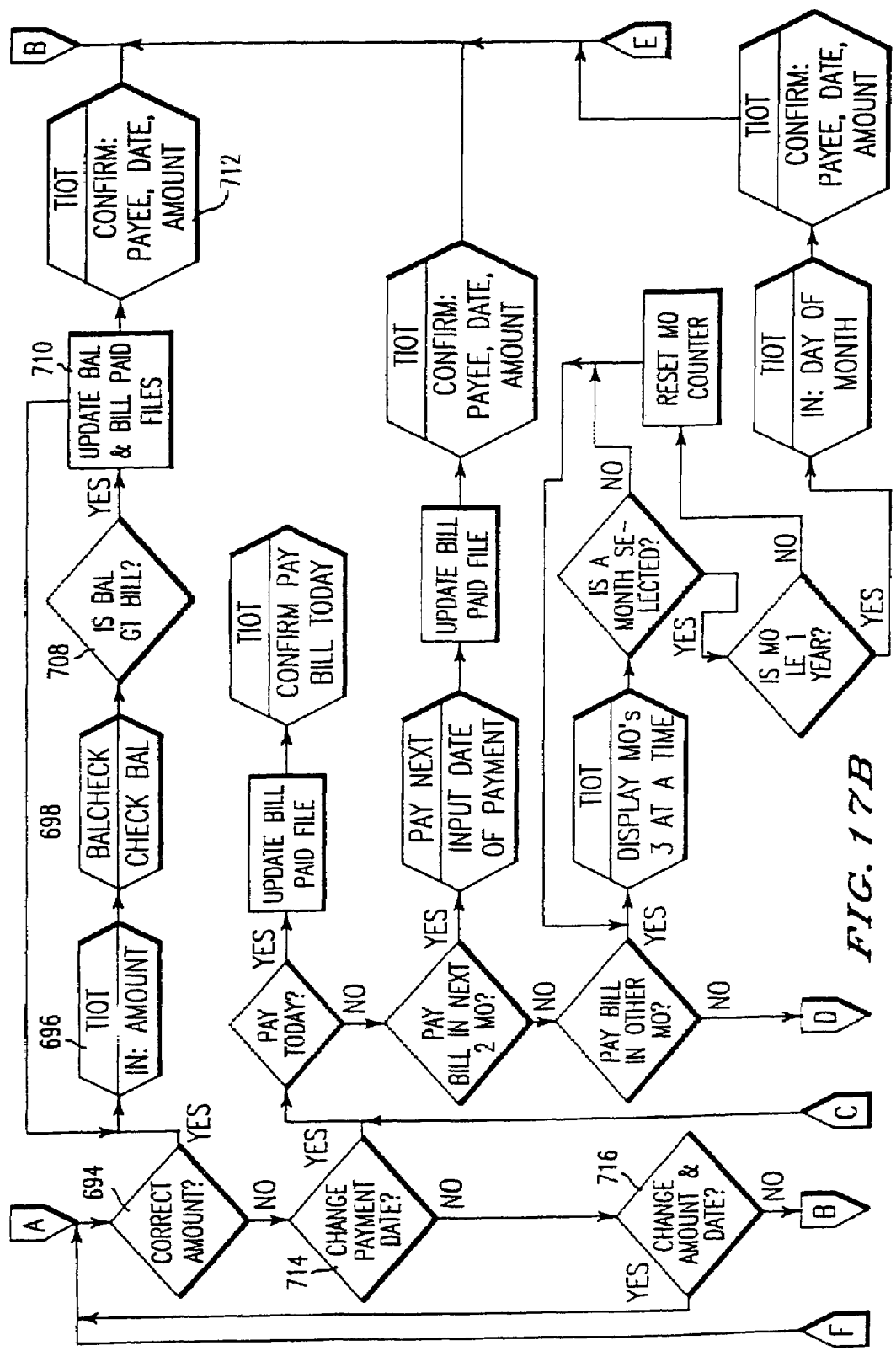
Figure 17C:
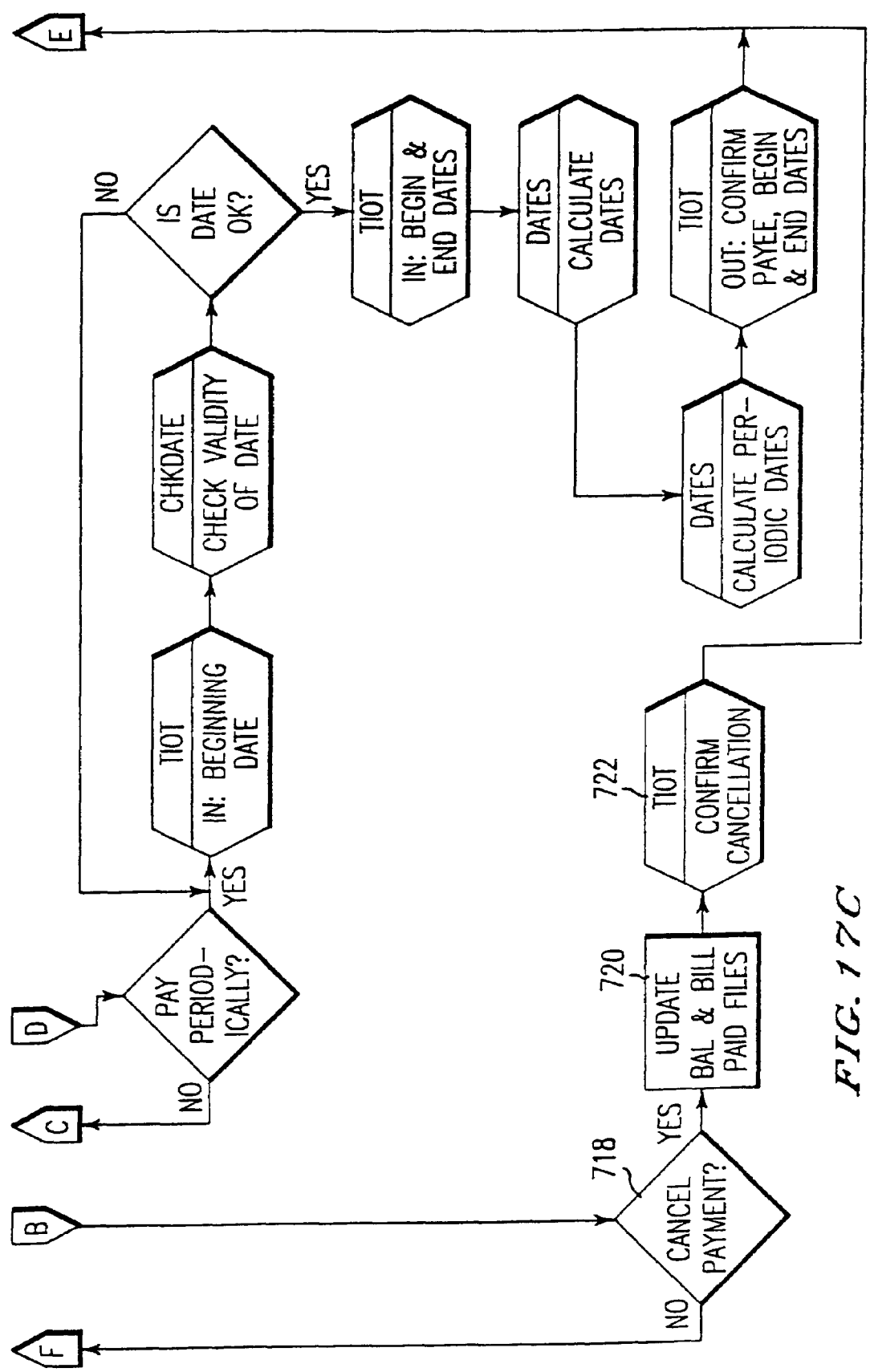

Referring now to FIGS. 17A-17C, the REVCOR routine allows the user to review and correct bill paying instructions inputted via the "billpaying" routine 506 described above. Upon selecting this review and correct option, central computer 52 sends a display to remote terminal 54 providing the user with options to select between (a) reviewing or correcting payment schedules in the current terminal session, and (b) reviewing or correcting payments scheduled in a previous terminal session. As discussed above, payments scheduled in a current terminal session are stored in an output file that is not acted upon by central computer 52 until after the current terminal billpaying session has terminated. Once the current terminal session has terminated, all requested payments are processed—and payments requested to occur are immediately acted upon. Thus, the user cannot view and correct and correct payments that have already been transacted in response to his previous requests. However, the user is able to review and/or correct payments he has scheduled in the current session, and may also review and/or correct payments he scheduled during a previous terminal session to occur after the date of the current terminal session.

If the user responds that he wishes to review payments scheduled during the current session (as tested for by decision block 670), central computer 52 first determines whether the user has in fact scheduled any payments during the current session (decision block 672). If no payments have been scheduled for the current session, a message to that effect is sent to remote terminal 54 (block 674) and returned to the bill process routine 392 as performed (block 676). If bills have been paid during the current session, on the other hand, a "this session" flag is set (block 678). On the other hand, if the user requests review of payments scheduled during a previous session (as tested for by decision block 680), then a "previous session" flag is set and is otherwise not set (blocks 680, 682).

Central computer 52 then accesses appropriate data (depending upon whether previous session or current session flags are set by block 682, 678, respectively) sorts the scheduled payments by date, and displays a list of scheduled payments (in the preferred embodiment this list specifies month and day, abbreviated payee name, and payment amount) (block 684). Preferably, the first such screen displayed has a header stating "payments this session that you may correct" or "prior scheduled payments that you may correct" on the top two lines of terminal display 102—but further screens list a different scheduled payment on each line of the display (so that few such payments may be listed on each screen in the preferred embodiment). The user may select any one of the displayed scheduled payments by depressing the corresponding selection key 108 (tested for by decision block 686). If the end of the list of scheduled payments has been reached and no selections remain (tested for by decision block 688), program control returns to the bill process routine 392 shown in FIG. 13 (block 690). Otherwise, if no selections have been made but the end of the payment list has not yet been reached (the "no" exit of decision block 688), a list counter is incremented to display the next few entries in the list (block 692), and those entries are then displayed by block 684 for user selection.

Referring now to FIG. 17B, once the user selects one of the scheduled payments from the displayed list, central computer 52 transmits a display screen to the terminal 54 presenting the user with the following options in the preferred embodiment: "correct amount", "correct payment date", "correct both amount and payment date", and "cancel payment". The user may select one of these options by depressing the corresponding one of select keys 108. If the user requests correction of the amount (as tested for by decision block 694), the preferred embodiment central computer 52 transmits a display format for display on terminal display 102 specifying the available funds remaining in the user's bank account (not including the previously scheduled payment amount), the name of the payee, and a user request to enter desired payment amount (block 696). The user then is expected to use keypad key 114 to enter the desired corrected amount of the payment. Once the user has inputted such information, central computer 52 calls a routine called BALCHECK which checks the user's bank account balance before the scheduled payment to ensure that the user does not inadvertently overdraw his account (block 698).

Figure 18:
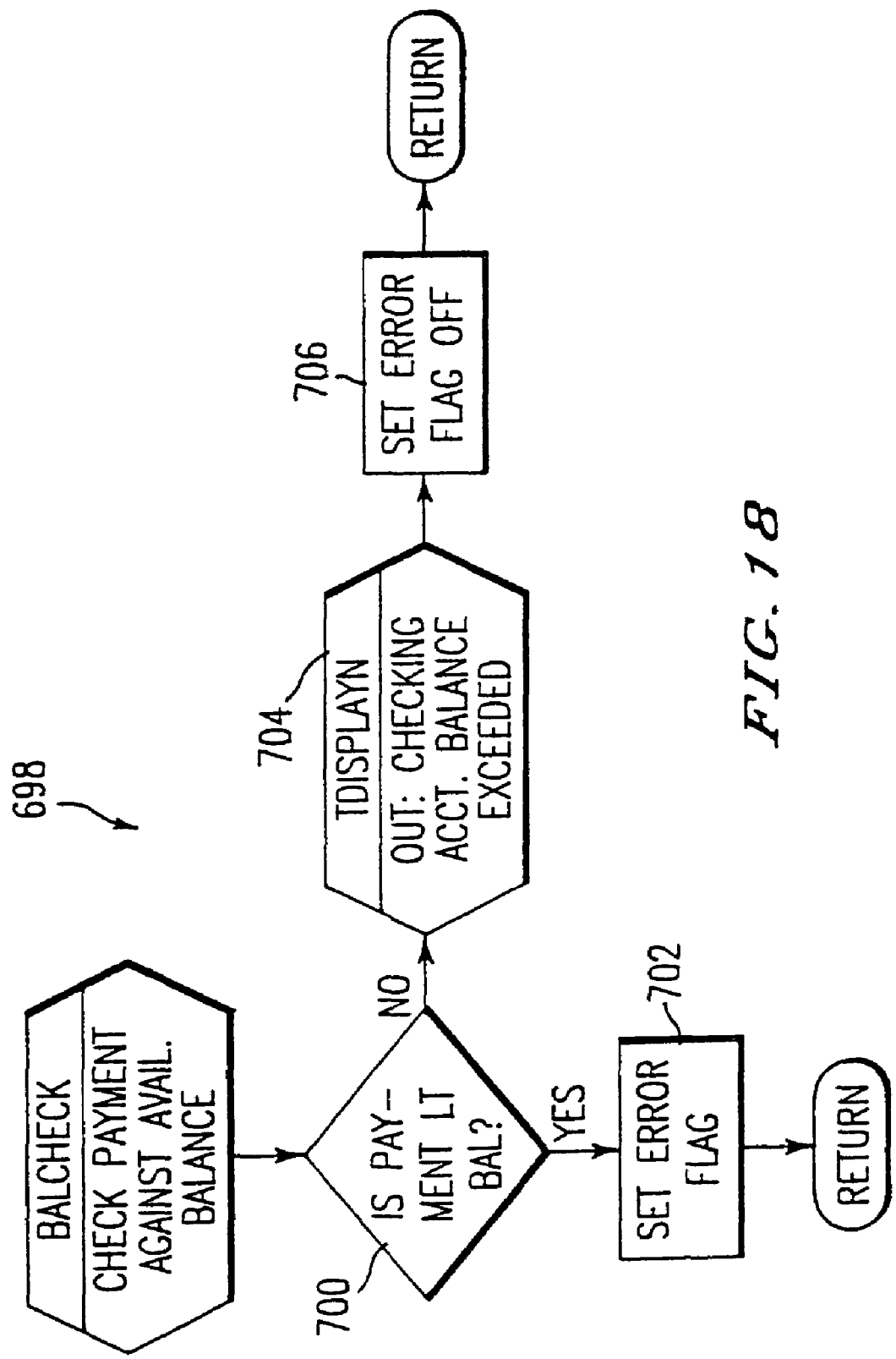

Referring to FIG. 18, a flow chart of exemplary program control steps performed as part of the BALCHECK routine 698, central computer 52 compares the requested payment amount with the balance remaining in the user's bank account assuming all immediately scheduled payments are processed (decision block 700). As described previously, in the preferred embodiment central computer 52 obtains the user's current bank account balance via a "account inquiry" request transmitted over the ATM network 66. Central computer 52 progressively debits the amount of this balance as the user schedules payments to be processed immediately—so that the central computer maintains a running balance of the user's account without yet actually debiting the user's account electronically. If the desired payment exceeds the user's remaining balance, an error flag is set (block 702). Otherwise, an error message will be sent (block 704) and the error flag is set (block 706) before a return to FIG. 17 block 708 is performed.

Referring once again to FIG. 17B, decision block 708 tests the value of the error flag returned by balance check routine 698. If the user's account will become overdrawn by the current payment, then the user is requested to reenter the amount (block 696). Otherwise, the running account balance maintained by central computer 52 is updated and the corrected payment information is placed into the output file (block 710) before a confirmation message is sent to be displayed by terminal 54 (block 712).

If the user selects a change in payment date (as tested for by decision block 714), central computer 52 controls terminal 54 to display the earlier-described screen display specifying when bill payment is to be scheduled and performs steps similar or identical to the steps described in connection with blocks 532-560 of FIGS. 14A-14B. The updated scheduled payment date information replaces the earlier schedule payment information stored in the output file and a confirmation message embodying the updated information is displayed on terminal display 102.

If the user wishes to change both the amount and the date (block 716), then the combination of the steps performed in response to positive results of decision blocks 694, 714 are performed. If the user wishes to change both amount and date, a flag is set and he is passed back through the block 694 and 714 coding. He then passes through both sets of coding making the appropriate changes.

Referring now to FIG. 17C, if the user decides to cancel a scheduled payment (tested for by decision block 718), central computer 52 updates the running user account balance it maintains (e.g., by merely adding the payment amount being cancelled to the user balance amount) and also updates the output file to remove the scheduled payment (block 720). Central computer then controls terminal display 102 to display a confirmed cancellation message (block 722) so the user is assured the scheduled payment has been cancelled.

Figure 19:
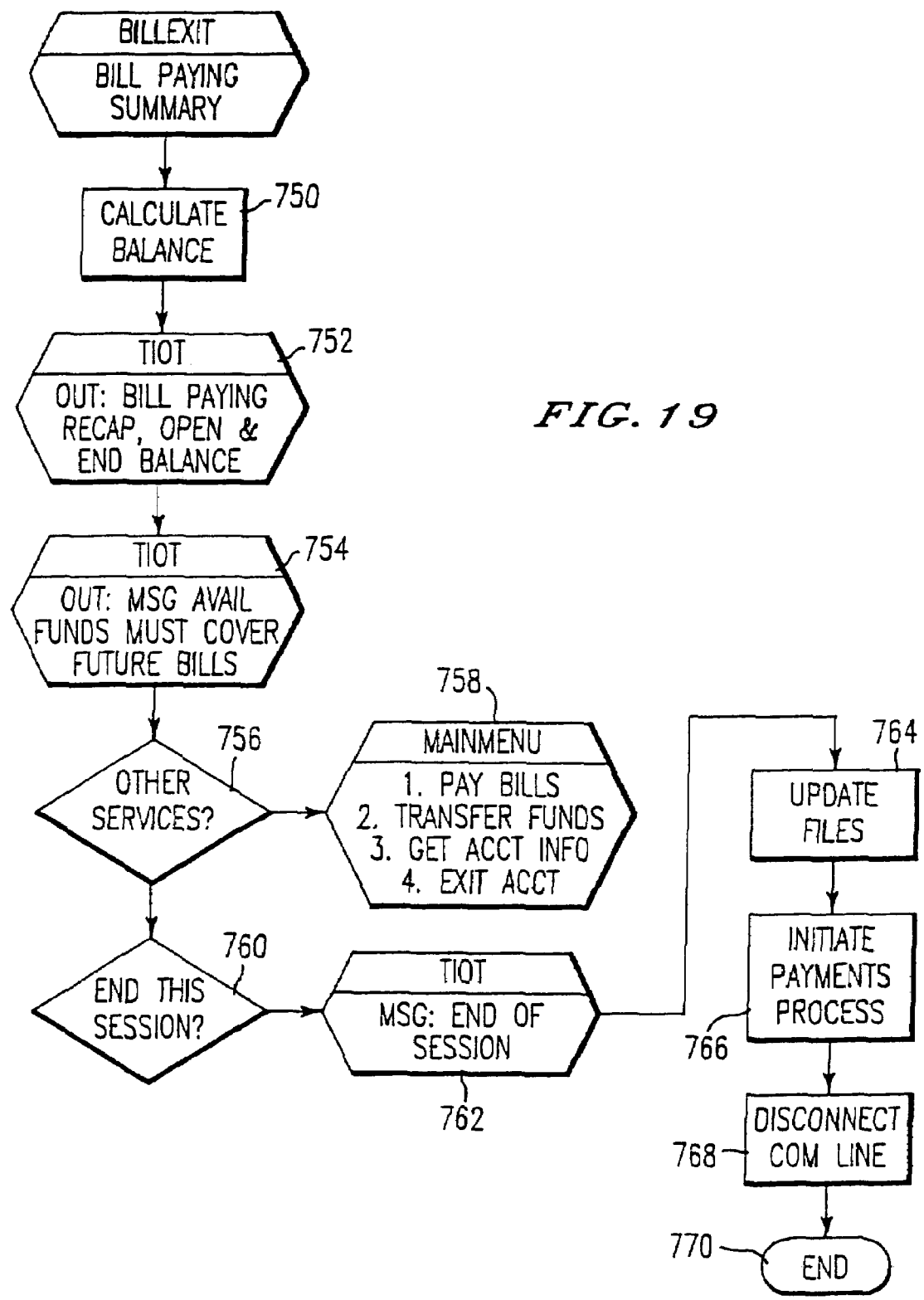

Referring once again to FIG. 13, if the user selects to exit billpaying (as tested for by decision block 512), a bill exit routine 514 is performed. This "bill exit" routine 514 (shown in more detail in FIG. 19) is responsible for processing the payment entries in the output file scheduled for immediate payment. Referring to FIG. 19, such processing involves calculating the total amount represented by the bills scheduled for immediate payment (block 750) and then providing a display or summary information to the user (blocks 752, 754). Assuming the user requests no other services (blocks 756-760), a debit request is generated in real-time by central computer 52 and transmitted over the ATM network 66. This request may be in the form of a POS debit message specifying the user's PIN and bank account and the amount of the bill to be paid and requests the calculated total amount to be debited from the user's bank account and credited to a holding account maintained by the service provider at the service provider's or the user's bank (perhaps even debiting the funds directly to the ultimate bill payee in an account at the user's bank). Central computer 52 then writes the output file to appropriate databases maintained on mass storage device 84 for payment processing. Thus, in the preferred embodiment, a single real-time user account debit request is generated, and that debit request representing the amount of the immediately scheduled bill payment. Central computer 52 then activates additional processes which make payments in the user-selected amount to the user-selected payees using electronic funds transfers (e.g., ACH), generation of paper checks using check printer 86, and the like as appropriate. The communications link with terminal 54 may be disconnected at this time (block 768).

Once the billpaying function has terminated (and if the user requests additional services; block 756), control returns to the main menu routine 388 shown in FIG. 12. At this point, central computer 52 once again transmits the "main menu" display format for display on terminal display 102. On this main menu, the user may decide to pay additional bills, if desired (tested for by decision block 391), or he may decide to take advantage of other services such as transferring funds between accounts or obtaining information about specific accounts. If the user requests funds transfer (as tested for by decision block 393), the routine called TRANSFD is called (block 394). A flow chart of this routine 394 is set forth in FIGS. 20A-20D.

Referring now to FIGS. 20A-20D, central computer 52 first controls terminal 54 to display a listing of the user's bank accounts (block 800), which the user had previously submitted to the service provider (along with payments information as described above). The user may then select one of the displayed accounts by depressing the corresponding selection keys 108 (as tested for by decision block 802). If the user does not select one of the displayed accounts, central computer 52 increments an account table pointer (block 804) and then tests whether the end of the user's account list has been reached (decision block 806). If the end of the list has been reached, central computer 52 returns to the main menu routine 388 (block 808).

If the user selects one of the displayed accounts, central computer 52 controls terminal display 102 to display a screen format identifying the account and the account balance (a request over the ATM network 66 to obtain this account balance may be generated at this point if central computer 52 has not already obtained this account balance information previously) and prompting the user to enter the amount to be transferred (block 806). The user is then expected to enter a dollar amount using keypad 114, which central computer 52 receives (block 808) and compares with the account balance (decision block 810). If the transfer amount exceeds the account balance ("yes" exit of decision block 810), an error message is generated for display by terminal display 102 (block 812) and blocks 808, 810 are performed again. If, on the other hand, the transfer amount is less than the account balance, a list of user accounts (preferably minus the account from which money is to be transferred) is displayed (block 818) and the user selects a further account to which the funds are to be transferred (blocks 816, 822) in a similar manner to the first account selection (blocks 802-808).

Central computer 52 then controls terminal display 102 to display a confirmation message (block 824) specifying the account selected for funds to be transferred into and requesting user confirmation. If the user fails to confirm this information (the "no" exit of decision lock 826), central computer 52 preferably controls terminal 54 to display an error menu presenting the user with the options "Retry the transfer", "access other services", or "end this session", (block 828). If the user requests a retry (as tested for by decision block 830), a return to the top of the TRANSFD routine 394 is performed. If the user wants to access other services (tested for by decision block 832), a return to the main menu routine 388 shown in FIG. 12 is performed (block 834). If the user selects the "end session" option (decision block 836), then a routine called "session exit" to be described in greater detail shortly is performed.

Figure 20A:
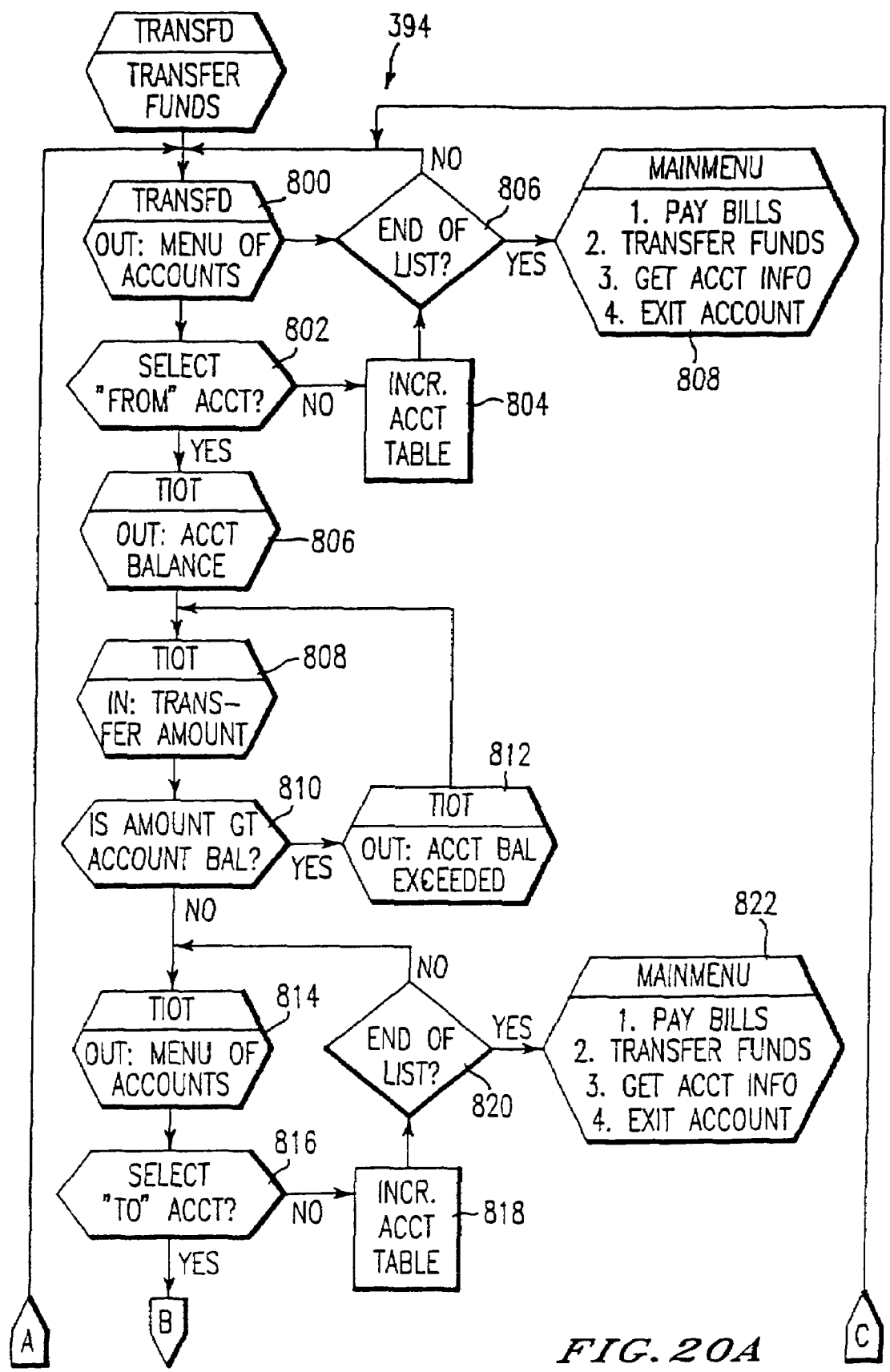
Figure 20B:
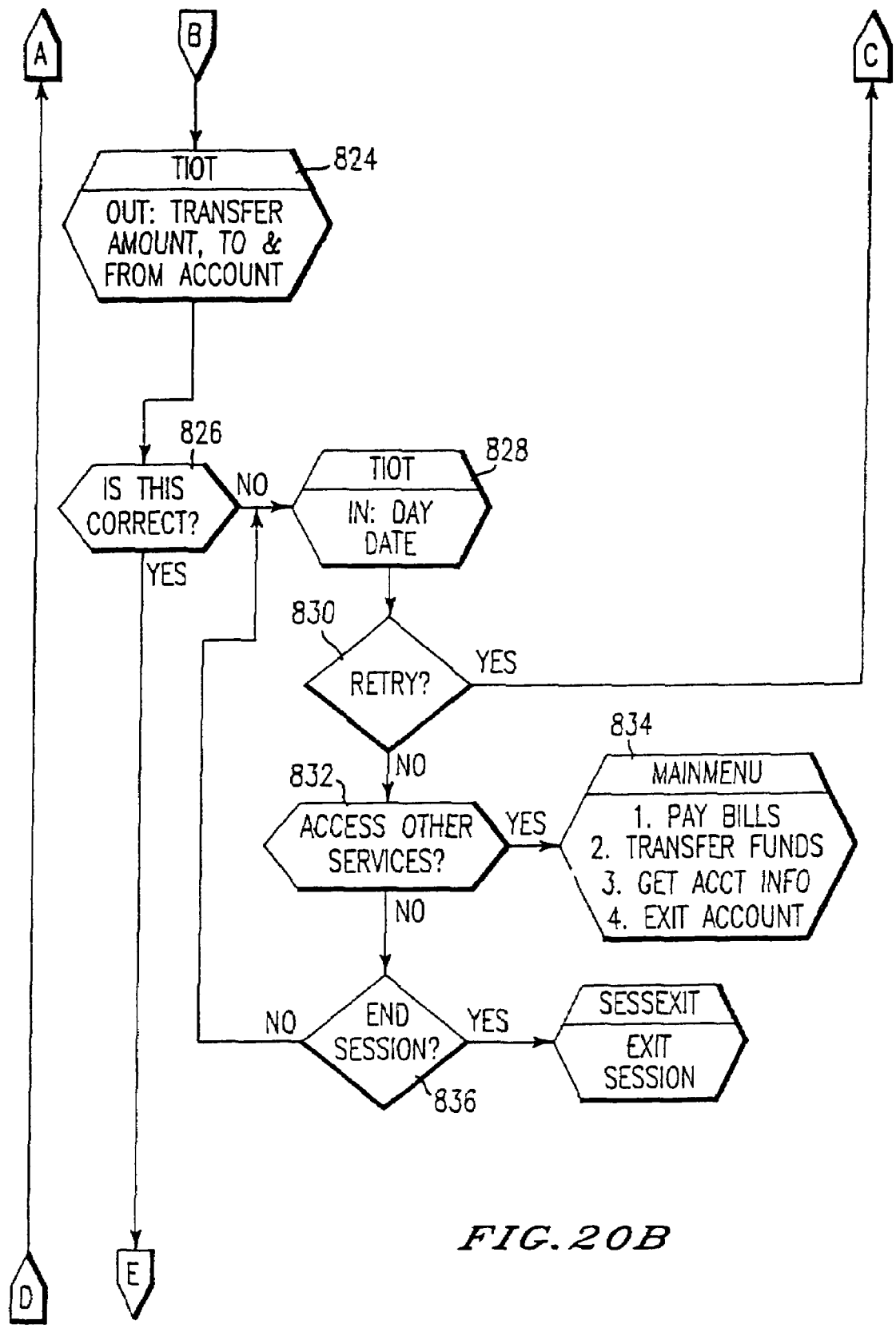
Figure 20C:
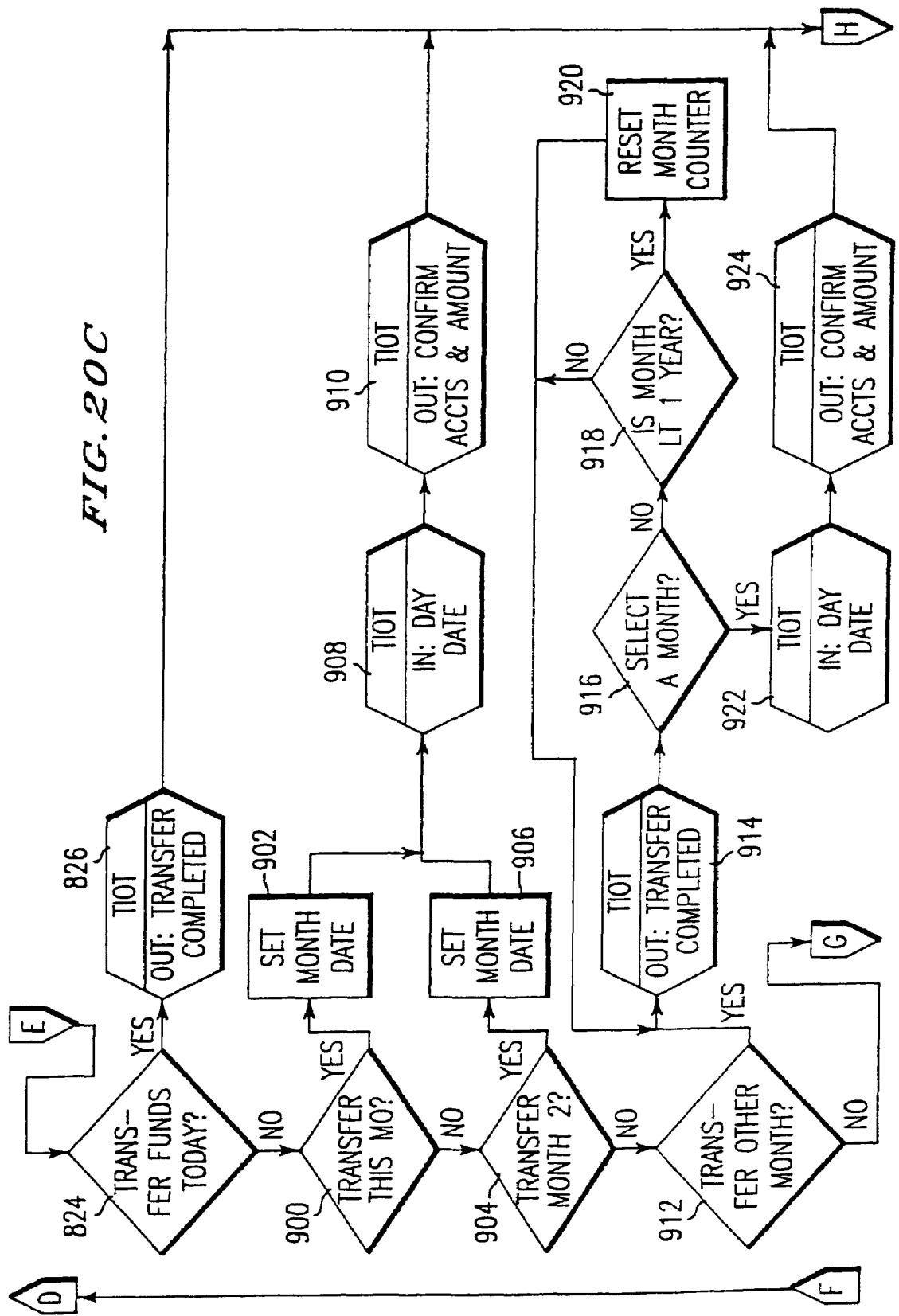

Referring now to FIG. 20C, if the user confirms the account transfer request ("yes" exit of decision block 826 of FIG. 20B), central computer 52 prompts the user whether transfer is to be performed immediately and receives the user's response. If the user requests an immediate transfer (the "yes" exit of decision block 824), the confirmation message is transmitted to remote terminal 54 (block 826). The user may be asked to input the PIN of the account to transfer money into at this time. Central computer 52 then generates a pair of messages to be applied to the ATM network 66: a POS debit to the account to transfer money from and POS credit to the account to transfer money into. These two accounts need not be in the same bank, since central computer 52 may reach any bank on the ATM network with the messages. In effect, the real-time transaction is to: (a) debit the user's first bank account and credit the services provider's account; and (b) credit the user's second bank account and debit the service provider's account (the net result being a funds transfer). In the case where this methodology is not appropriate or feasible, debits are processed as normal ATM/POS transactions and credits are made by ACH, magnetic tape or other electronic means to the user's bank.

If, on the other hand, the user responds that the fund transfer is not to be performed immediately (the "no" exit of decision block 824), the preferred embodiment central computer 52 transmits a further display to terminal 54 prompting the user as to which month the transfer is to be performed. For example, if the current month is November, the preferred embodiment central computer 52 will transmit a screen for display by terminal display 102 specifying November, December, January and (other month) for selection by the user. If the user selects the current month (tested for by decision block 900), a month/date field is set accordingly (block 902). Similarly, if the user selects another displayed month (tested for by decision block 904), the same month field is set in accordance with the month specified by the user (block 906). Either way, central computer 52 then prompts the user to specify a day (block 908). In response to receipt of such a date, central computer 52 transmits a confirmation message for display by terminal display 102 (block 910) and then schedules the transfer to account in the future at the date specified by logging to the output file (and eventually updating the database files stored on mass storage 84).

If the user wishes the account transfer to occur in some other month (decision block 912), central computer 52 displays a list of months three-at-a-time (block 914) and permits the user to scroll through this list for month selection (blocks 916-920). In the preferred embodiment, central computer 52 does not permit the user to schedule a payment more than one year in advance (decision block 918) (although this may be changed depending upon the application). Once the user selects a valid month, central computer 52 obtains a desired payment date from the user (block 922) and transmits a corresponding confirmation message (block 924).

Figure 20D:
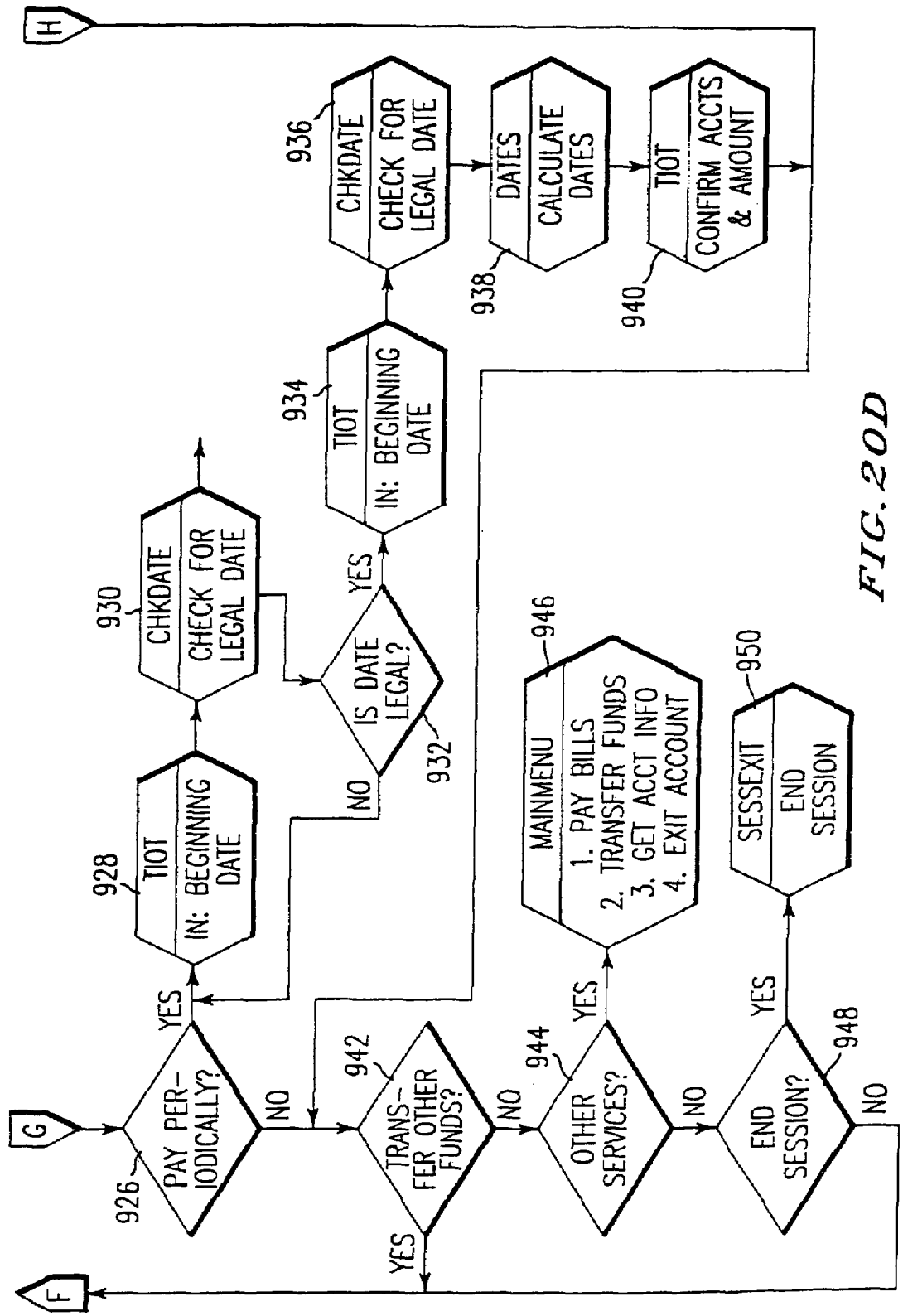

Referring now to FIG. 20D, in the preferred embodiment it is possible to schedule periodic account transfers (this user selection is tested for by decision block 926). As described previously, central computer 52 obtains a beginning valid date (blocks 928-932) and an ending valid date (blocks 934-936), calculates all of the periodic payment dates by calling the DATES routine shown in FIGS. 16A and 16B (block 938), and then transmits a confirmation message (block 940). The resulting calculated transfers are then logged to the output file for processing on the dates specified. This permits users, for example, to time transfers between accounts in order to maximize interest (such as moving funds into a non-interest bearing checking account at the latest possible date in order to meet a periodic mortgage payment).

Blocks 942-950 permit the user to select different ways to exit the TRANSFD routine 394 (e.g., by starting the routine from the beginning, block 942; by returning to the main menu routine, blocks 944, 946; and by ending the terminal session, blocks 948-950).

Referring once again to FIG. 12, another option provided for user selection by main menu routine 388 is the "account information" option, decision block 395). In response to this selection, central computer 52 calls a routine called ACCINF (block 396). A detailed flow chart of this routine is shown in FIGS. 21A-21C.

Figure 21A:
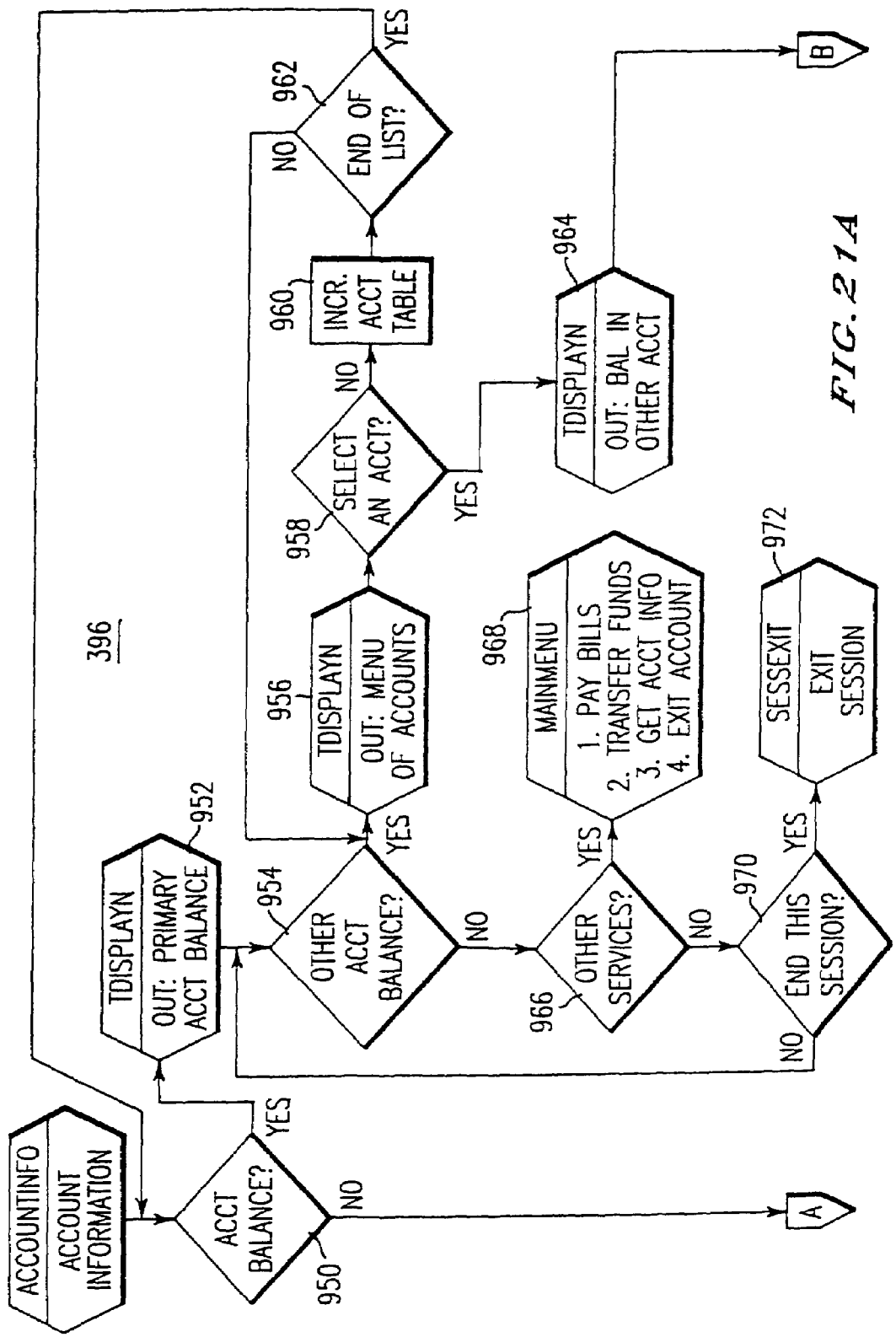
Figure 21B:
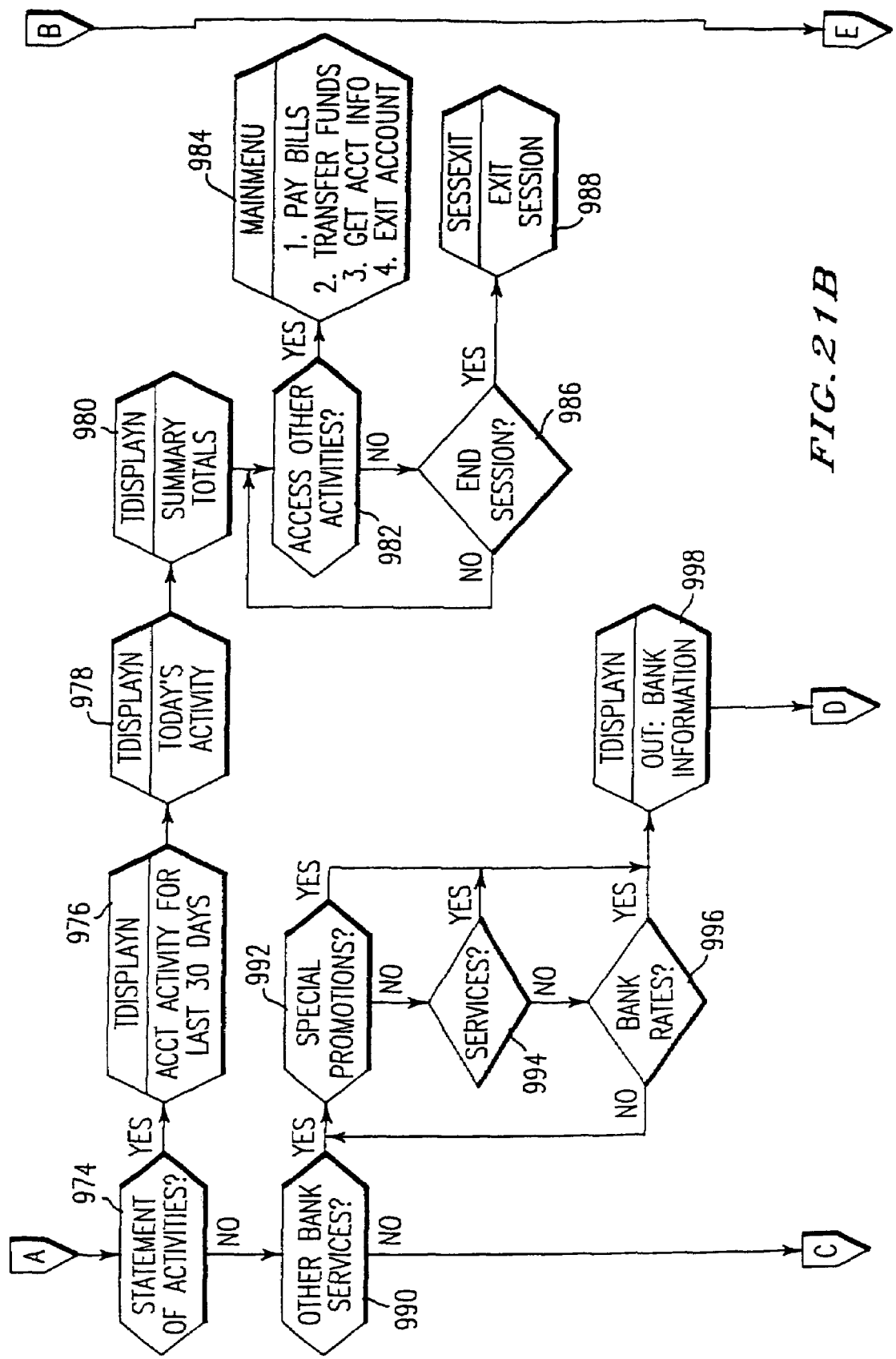
Figure 21C:
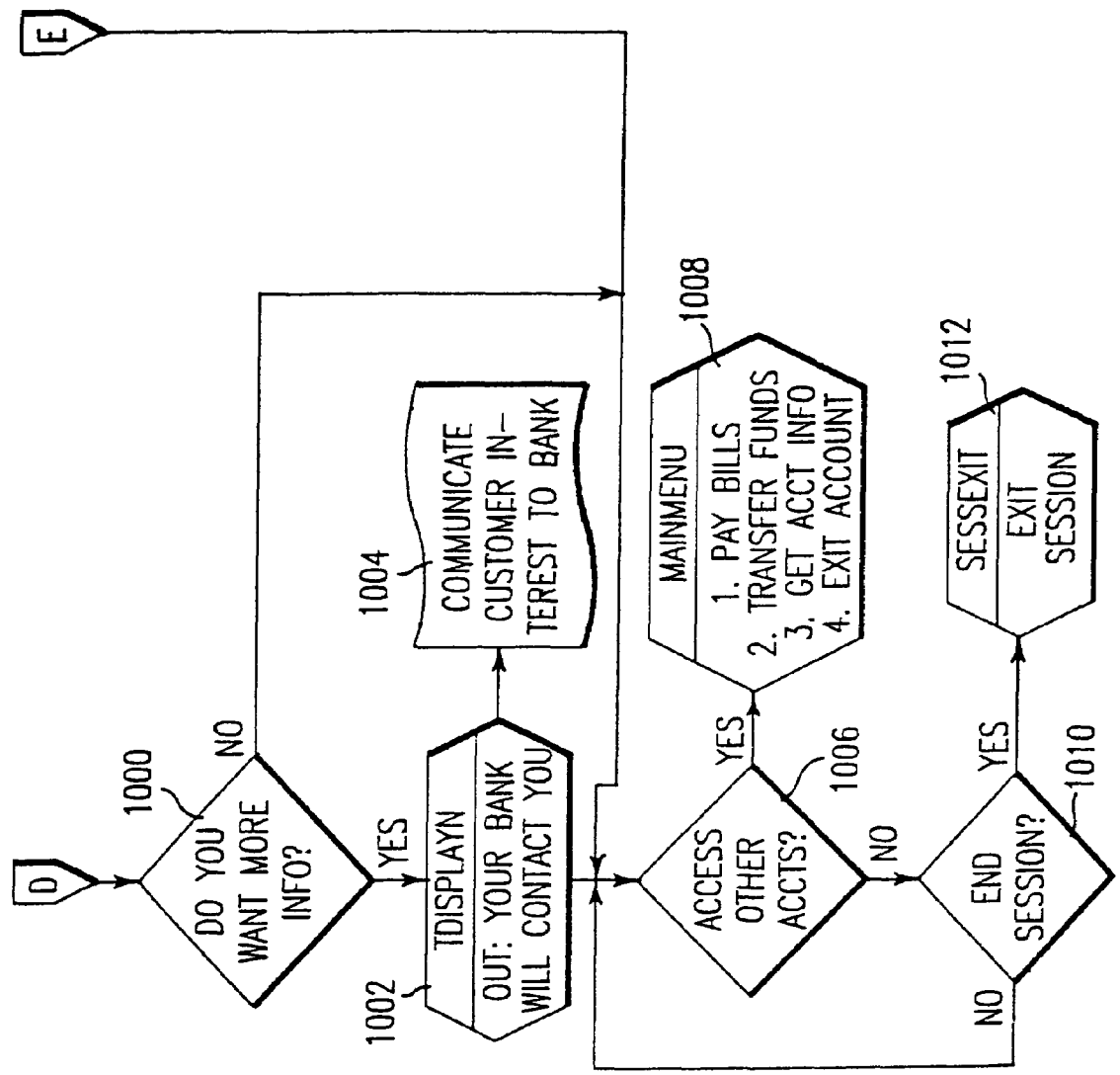
Figure 21C:
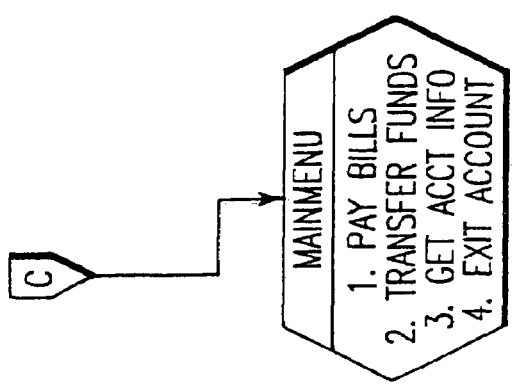

Referring now more particularly to FIG. 21A-21C, central computer 52 sends to terminal 54 a display format announcing that "account information service" is being provided and then present the user with various options to select (e.g., "account balance", "statement of activity", and "other bank information"). If the user selects the account balance option (as tested for by decision block 950), the preferred embodiment central computer 52 transmits the balance of the "primary" account (block 952). This "primary" account designated by the user in advance (i.e., when he first subscribes to the remote financial distribution service or when he logs onto his remote terminal at the beginning of the current session) and is probably the account the balance of which the user is interested in. Following this account balance display, central computer 52 transmits an additional display screen to terminal 54 presenting the user with the following additional options: "balance for other account", "access other services" and "end this online banking session". If the user then selects the "other account balance" option (tested for by decision block 954), central computer 52 controls terminal display 102 to display a listing of the user's other accounts (block 956) and permits the user to scroll through the list to select another account (blocks 958-962). If the end of the list is reached (tested for by decision block 962), control is returned to the "account balance" prompt (block 950). If the user selects another account, on the other hand, central computer 52 transmits a designation of this account along with its balance (and, if necessary, generates a request on ATM's network 66 obtaining this account balance) (block 964). A request for "other services" in the preferred embodiment is handled by returning the user to the main menu routine 388 (blocks 966-968), while an "end session" request is handled by calling the SESSEXIT routine to be discussed shortly (blocks 970, 972).

Referring now to FIG. 21B, if the user selects "statement of activities" (decision block 974), then central computer 52 begins controlling terminal 54 in the preferred embodiment to display a list of all payment transactions beginning with the oldest payment within a "30-45 day lookback" from the current date (block 976). The user may scroll through this listing by depressing the PRIOR and NEXT navigational keys 104 and 106 as previously described. Following the history of payments processed during the last month (which, incidentally are obtained from the database stored on mass storage device 84), central computer 52 accesses the output file and displays a list of the current session activities (block 978) beginning with the first payment. Such list includes the date, the payee and the amount. Finally, central computer 52 calculates a summary including the following information: the closing balance on the date of the oldest payment (central computer 52 stores the closing balance at the end every session on mass storage device 84 in the preferred embodiment), the total online banking activity, the total representing all other activity, and the current balance after all the transfers and payments requested in the current terminal session have been processed (block 980). The user may then access other activities via the main menu (blocks 982, 984) or may end the current terminal session (blocks 986, 988).

If the user selects the option for "other bank services" in the preferred embodiment (block 990), central computer 52 controls terminal display 102 to display an additional submenu presenting the user with the options "other promotions", "service information" and "rate offerings" (as will be understood, various additional or different services may be presented to the user at this point). In response to user selection of one of these options (decision blocks 992, 994, 996 decode the user selection), central computer 52 obtains the appropriate responsive information from mass storage device 84 and controls terminal display 102 to display such information (block 998). Similar to earlier described advertising routines, the central computer 52 then prompts the user whether he wishes to obtain additional information on the selected service (block 1000). If the user responds in the affirmative, central computer 52 controls terminal display 102 to a message that the bank or other appropriate entity contact the user directly (block 1002) and then creates a request on database 84 for transmission of the user's name, address, telephone number and the subject matter the user is interested in for immediate or later transmission to the bank or other appropriate entity via dialup line 70 or interface/multiplexer 82 or the like (block 1004). The user may then select to return to the main menu (blocks 1006, 1008) or may decide to end the current terminal session (blocks 1020, 1012).

One of the "other services" offerings may, for example, be completing a loan application. Central computer 52 already stores sufficient personal and financial information about the user to complete most of the loan application form automatically and may need to ask the user only a few questions (e.g., loan amount, type of loan, etc.) to complete the application (to which the user may respond with numeric or alphabetical information as appropriate by depressing keys or keypad 108). Such completed loan applications may then be forwarded electronically or in hard copy form to lending institutions for further processing.

Figure 22:
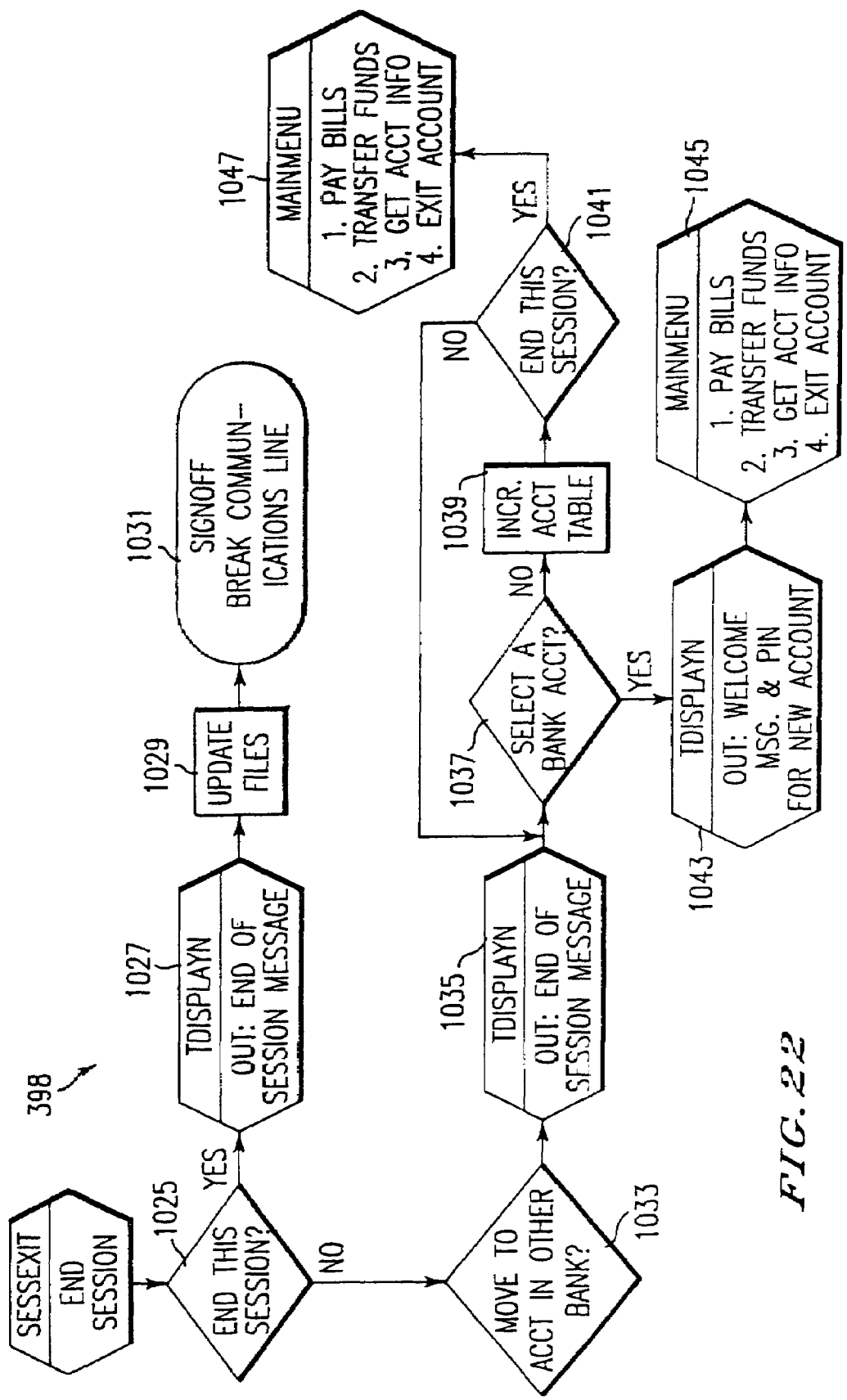

Referring once again to the main menu routine 388 shown in FIG. 12, the user at any point may decide to terminate the current terminal session (decision block 397). In response to this user selection, central computer 52 executes a routine called SESSEXIT (block 398), a detailed flowchart of which is shown in FIG. 22. Referring now to FIG. 22, central computer 52 preferably first controls terminal display 102 to display a confirmation screen presenting the user with the options to either end this online banking session or to "move to account in another bank" (block 1025). If the user decides to end the terminal session, a confirmation screen is transmitted for display (block 1027), the files maintained in mass storage device 84 are updated by the central computer 52 (block 1029) and the communications link via PDN network 56 and asynchronous communications interface 60 is terminated (block 1031). If, on the other hand, the user decides to move to another account (as tested for by decision block 1033), central computer 52 transmits a listing of other accounts maintained by the user (block 1035) and permits the user to scroll through this listing to select another bank account (blocks 1037, 1039, 1041). If the user selects an account (tested for by decision block 1037), the steps describe previously in connection with FIG. 9 blocks 358, 388 are performed again (blocks 1043, 1045). If, on the other hand, the end of the user account list has been reached, control returns to the main menu routine shown in FIG. 9 (block 1047).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of paying bills using a telecommunications line connectable to at least one remote payment computer network via a payee's agent's computer system, wherein a caller begins session using a telecommunications line to initiate a spontaneous payment transaction to a payee, the method comprising:

sending a prompt from the remote payment computer network via the telecommunications line to the caller to enter an account number identifying an account of a payor with the payee in connection with the payment transaction;

sending a prompt from the remote payment computer network via the telecommunications line to the caller to enter a payment number selected from one or more choices of debit forms of payment;

sending a prompt from the remote payment computer network via the telecommunications line to the caller to enter a payment amount for the payment transaction;

upon a payment amount being entered and during the session, the payee's agent's computer system (i) accesses a remote payment network associated with the entered payment number, (ii) sends a message to the accessed remote payment network determining, during the session, inquiring whether sufficient available funds exist in an account associated with the entered payment number to complete the payment transaction, (iii) responsive to the notification indicating that sufficient available funds exist in the associated account, sends to the remote payment network an authorization to charge the entered payment amount against the account associated with the entered payment number, (iii) adds the entered payment amount to an account associated with the entered account number, (iv) sends a notice via the telecommunications line to the caller indicating that the payment transaction has been authorized, and (v) stores the account number, payment number and payment amount are to be stored in a transaction log file of the payee's agent's computer system.

2. The method of claim 1 wherein said entered payment number corresponds to a PIN-less form of payment.

3. The method of claim 1 further comprising the steps of prompting the caller to select a credit or debit option, and prompting the caller to enter a payment amount.

4. The method of claim 1 further comprising prompting the caller to indicate the type of payment.

5. A method of paying bills using a telecommunications network line connectable to at least one remote payment card computer network via a payee's agent's computer system, wherein a session begins when a caller using a telecommunications network line initiates a spontaneous payment transaction to a payee, the method comprising:

sending via the telecommunications network line a prompt to the caller to enter a payment number selected from one or more choices of debit forms of payment;

sending via the telecommunications network line a prompt to the caller to enter a payment amount for the payment transaction;

accessing a remote payment computer network associated with the entered payment number, receiving, during the session, a response from accessed remote payment computer network confirming that sufficient available credit or funds exist in an account associated with the entered payment number to complete the payment transaction, and upon receiving the confirmation that sufficient available funds exist in the associated account, sending an authorization message to the accessed remote payment computer network to charge the entered payment amount against the account associated with the entered payment number, adding the entered payment amount to an account associated with the entered account number, and storing the account number, payment number and payment amount in a transaction file of the payee's agent's computer system.

6. The method of claim 5 wherein said payment number is a PIN-less form of payment.

7. The method of claim 5 further comprising the steps of prompting the caller to select a debit option, and prompting the caller to enter a payment amount.

8. A method of paying bills using a telecommunications line connectable to at least one remote payment computer network, wherein a caller begins a session using a telecommunications line to initiate a payment transaction to a payee, the method comprising:

sending a message from the remote payment computer network prompting the caller to identify a payor account of a payor with the payee in connection with the payment transaction;

sending a message from the remote payment computer network prompting the caller to identify a payment account selected from a one or more choices of forms of payment;

sending a message from the remote payment computer network prompting the caller to designated a payment amount for the payment transaction;

upon the payment amount being designated and during the session, the payee's agent's computer system (i) sending an inquiry message to the remote banking network which determines, during the session, inquiring whether sufficient available funds exist in the payment account to complete the payment transaction, (ii) receiving a confirmation message from the remote banking network, during the session, responsive to the inquiry message, wherein the confirmation message indicates that sufficient available funds exist in the payment account, (iii) charging the payment amount against the payment account, (iv) adding the payment amount to the payor account, (v) sending a message to the caller indicating that the payment transaction has been authorized, and (vi) storing the payor account number, payment number and payment amount in a transaction log file of a payee's agent's computer system.

9. The method of claim 8 further comprising the steps of prompting the caller to select a debit option, and prompting the caller to enter a payment amount.

10. A method of paying bills using a telecommunications line connectable to at least one remote payment network via a payee's agent's system, wherein a caller begins a session using a telecommunications line to initiate a spontaneous payment transaction to a payee, the method comprising:

the payee's agent's system prompting the caller to enter or select an account number identifying an account of a payor with the payee in connection with the payment transaction;

the payee's agent's system prompting the caller to enter or select a payment account selected from one or more payment accounts;

the payee's agent's system prompting the caller to enter or select a payment amount for the payment transaction;

upon a payment amount being entered and during the session, the payee's agent's system (i) sending an inquiry to a remote payment network determining as to whether sufficient available funds exist in the selected payment account to complete the payment transaction, (ii) responsive to a message received from the remote payment network indicating that sufficient available credit or funds exist in the selected payment account, sending a message to the remote payment network authorizing the debiting of the entered payment amount against the payment account, (iii) adding the entered payment amount to the payor account, and (iv) storing the account number, payment number and payment amount in a transaction log file of the system.

11. The method of claim 10 wherein said payment number is a PIN-less account.

12. A method of paying bills using a telecommunications network line connectable to at least one remote payment network via a payee's agent's computer system, wherein a caller begins session using a telecommunications network line to initiate a spontaneous payment transaction to a payee, the method comprising:

prompting the caller to enter or select a payment number from one or more payment account choices;

prompting the caller to enter a payment amount for the payment transaction;

the payee's agent's computer system (i) accessing a remote payment network associated with the entered payment number, (ii) requesting the accessed remote payment network to determine, during the session, whether sufficient available funds exist in the payment account to complete the payment transaction, and (iii) upon receipt of notice of a determination that sufficient available funds exist in the payment account, charging the entered payment amount against the payment account, adding the entered payment amount to an account associated with a payor account number, and storing the payor account number, payment number and payment amount in a transaction file of the system.

13. The method of claim 12 wherein said payment number corresponds to a checking account.

14. The method of claim 12 further comprising the steps of prompting the caller to select a debit option, and prompting the caller to enter a payment amount.

15. The method of claim 12 further comprising the step of prompting the caller to indicate the type of payment.

16. A method of paying bills using a telephone connectable to at least one remote payment card network via a payee's agent's system, wherein a caller places a call using said telephone to initiate a spontaneous payment transaction to a payee, the method comprising:

prompting the caller to enter or select an account number using the telephone, the account number identifying an account of a payor with the payee in connection with the payment transaction;

prompting the caller to enter a payment account number using the telephone, the payment account number being selected at the discretion of the caller from any one of a number of debit forms of payment;

prompting the caller to enter a payment amount for the payment transaction using the telephone;

accessing a remote payment network associated with the entered payment number, requesting the accessed remote payment network to determine, during the call, whether sufficient available funds exist in an account associated with the entered payment account number to complete the payment transaction;

responsive to receiving notice of a determination that sufficient available funds exist in the associated account, charging the entered payment amount against the account associated with the entered payment number, adding the entered payment amount to an account associated with the entered account number, informing the caller that the payment transaction has been authorized, and storing the account number, payment number and payment amount in a transaction log file of the system during the call; and responsive to receiving a notice of a determination that sufficient available credit or funds do not exist in the associated account, informing the caller during the call that the current payment transaction has been declined and terminating the current payment transaction.

17. The method of claim 16 wherein adding the entered payment amount to an account associated with the entered account number and informing the caller that the payment transaction has been authorized utilizes an approval code issued by the accessed remote payment card network.

18. The method of claim 16 further comprising:

responsive to a determination that sufficient available funds do not exist in the associated account, informing the caller during the call that the current payment transaction has been declined and terminating the current payment transaction.

19. The method of claim 16 further comprising periodically performing a settlement process, said settlement process comprising:

accessing a computer billing system of said payee; and transmitting to said payee's computer billing system said stored access code, account number, payment card number and payment amount from said transaction log file.

20. The method of claim 16 further comprising informing said caller of results of said determination of said payee's agent's system.

21. The method of claim 16 further comprising periodically performing a settlement process, said settlement process comprising accessing a computer billing system of said payee.

22. A method of paying bills using a telephone device connectable to at least one remote payment network via a payee's agent's computer system, wherein a connection is made using the telephone device to initiate a payment transaction, the method comprising:

prompting for entry or selection of a valid account number using the telephony device, the account number identifying an account of a payor in connection with the payment transaction;

prompting for entry of a valid payment number using the telephony device, the payment number being selected from any one of a number of forms of payment;

prompting for entry of a payment amount using the telephony device;

responsive to entry of a payment number and payment amount, sending an inquiry to the remote payment network requesting a determination, during the connection, as to whether sufficient available funds exist in an account associated with the entered payment number to cover the entered payment amount; and responsive to response from the payment network of a determination that sufficient available funds exist in the associated account, debiting the entered payment amount from the account associated with the entered payment number, crediting the entered payment amount to an account associated with the entered account number, and storing the account number, payment number and payment amount in a transaction log file of the system during the connection.

23. The method of claim 22 wherein adding the entered payment mount to an account associated with the entered account number and informing the caller that the payment transaction has been authorized utilizes an approval issued by the accessed remote payment card network.

24. A method of paying bills using a telecommunications line connectable to at least one remote payment card network via a payee's agent's computer system, wherein a caller begins session using a telecommunications line to initiate a spontaneous payment transaction to a payee, the method comprising the steps of:

prompting the caller to enter an account number identifying an account of a payor with the payee in connection with the payment transaction;

prompting the caller to enter a payment number selected from one or more choices of credit or debit forms of payment;

prompting the caller to enter a payment amount for the payment transaction;

upon a payment amount being entered and during the session, accessing a remote payment network associated with the entered payment number, the payee's agent's computer system sending an inquiry to the remote payment network requesting a determination, during the session, as to whether sufficient available credit or funds exist in an account associated with the entered payment number to complete the payment transaction, and responsive to a notification from the remote payment network of a determination that sufficient available credit or funds exist in the associated account, the payee's agent's computer system charging the entered payment amount against the account associated with the entered payment number, adding the entered payment amount to an account associated with the entered account number, informing the caller that the payment transaction has been authorized, and storing the account number, payment number and payment amount in a transaction log file of the system.

25. A method of paying bills using a telecommunications network line connectable to at least one remote payment card network via a payee's agent's computer system, wherein a caller begins session using a telecommunications network line to initiate a spontaneous payment transaction to a payee, the method comprising the steps of:

prompting the caller to enter a payment number selected from one or more choices of credit or debit forms of payment;

prompting the caller to enter a payment amount for the payment transaction;

the payee's agent's computer system (i) accessing a remote payment network associated with the entered payment number, (ii) requesting the accessed remote payment network to determine, during the session, whether sufficient available credit or funds exist in an account associated with the entered payment number to complete the payment transaction, and (iii) upon receipt of a notice during the session of a determination that sufficient available credit or funds exist in the associated account, charging the entered payment amount against the account associated with the entered payment number, adding the entered payment amount to an account associated with the entered account number, and storing the account number, payment number and payment amount in a transaction file of the system.

26. A method of paying bills using a telephone connectable to at least one remote payment card network via a payee's agent's computer system, wherein a caller places a call using said telephone to initiate a spontaneous payment transaction, to a payee, the method comprising the steps of:

prompting the caller to enter an account number using the telephone, the account number identifying an account of a payor with the payee in connection with the payment transaction;

responsive to entry of an account number, determining whether the entered account number is valid;

prompting the caller to enter a payment number using the telephone, the payment number being selected at the discretion of the caller from any one of a number of credit or debit forms of payment;

responsive to entry of the payment number, determining whether the entered payment number is valid;

prompting the caller to enter a payment amount for the payment transaction using the telephone;

responsive to a determination that a payment amount has been entered and further responsive to a determination that the entered account number and payment number are valid, and during the call:

the payee's agent's computer system (i) accessing a remote payment network associated with the entered payment number, (ii) requesting the accessed remote payment network to determine, during the call, whether sufficient available credit or funds exist in an account associated with the entered payment number to complete the payment transaction;

responsive to a notice received from the remote payment network that sufficient available credit or funds exist in the associated account, charging the entered payment amount against the account associated with the entered payment number, adding the entered payment amount to an account associated with the entered account number, informing the caller that the payment transaction has been authorized, and storing the account number, payment number and payment amount in a transaction log file of the system; and responsive to a notice received from the remote payment network that sufficient available credit or funds do not exist in the associated account, informing the caller during the call that the current payment transaction has been declined and terminating the current payment transaction.

27. A method of paying bills using a telephone device connectable to at least one remote payment network via a payee's agent's computer system, wherein a connection is made using the telephone device to initiate a payment transaction, the method comprising the steps of:

prompting for entry of a valid account number using the telephony device, the account number identifying an account of a payor in connection with the payment transaction;

prompting for entry of a valid payment number using the telephony device, the payment number being selected from any one of a number of forms of payment;

prompting for entry of a payment amount using the telephony device;

responsive to entry of a payment number and payment amount, the payee's agent's computer system (i) accessing a remote payment network associated with the entered payment number, (ii) requesting the accessed remote payment network to determine, during the connection, whether sufficient available credit or funds exist in an account associated with the entered payment number to cover the entered payment amount; and (iii) in response to receipt of a determination that sufficient available credit or funds exist in the associated account, debiting the entered payment amount from the account associated with the entered payment number, crediting the entered payment amount to an account associated with the entered account number, and storing the account number, payment number and payment amount in a transaction log file of the system during the connection.

28. A system for enabling a payor to pay bills using a telephone connectable to at least one remote payment network via a payee's agent's computer system, wherein a caller places a call using the telephone to initiate a payment transaction, the system comprising:

means for prompting the caller to enter a valid account number using the telephone, the account number identifying an account of the payor with the payee in connection with the payment transaction;

means for prompting the caller to enter a valid payment number using the telephone, the payment number being selected at the discretion of the caller from any one of a number of forms of payment;

means for prompting the caller to enter a payment amount using the telephone;

means for responsive to entry of a payment number and payment amount, accessing a remote payment network associated with the entered payment number, the accessed remote payment network determining, during the call, whether sufficient available credit or funds exist in an account associated with the entered payment number to cover the entered payment amount; and means responsive to a determination that sufficient available credit or funds exist in the associated account, for debiting the entered payment amount from the account associated with the entered payment number, crediting the entered payment amount to an account associated with the entered account number, and means responsive to a determination that sufficient available credit or funds exist in the associated account, for debiting the entered payment amount from the account associated with the entered payment number, crediting the entered payment amount to an account associated with the entered account number, and storing the account number, payment number and payment amount in a transaction log file of the system during the call.

29. The system of claim 28 wherein said payment number is a debit account.

30. The system of claim 28 wherein said payment number is a bank account number.

31. The system of claim 28 wherein the means for adding the entered payment amount to an account associated with the entered account number and informing the caller that the payment transaction has been authorized utilizes an approval issued by the accessed remote payment card network.

32. The system of claim 28 wherein storing the account number, payment number and payment amount in the transaction log file also includes an approval code stored in the transaction log file.

* * * * *